United States Patent
Hyde et al.

(10) Patent No.: US 8,660,672 B1
(45) Date of Patent: Feb. 25, 2014

(54) SYSTEMS AND METHODS FOR MANAGING EMISSIONS FROM AN ENGINE OF A VEHICLE

(71) Applicants: Roderick A. Hyde, Redmond, WA (US); Muriel Y. Ishikawa, Livermore, CA (US); Jordin T. Kare, Seattle, WA (US); Thomas A. Weaver, San Mateo, CA (US); Lowell L. Wood, Jr., Bellevue, WA (US)

(72) Inventors: Roderick A. Hyde, Redmond, WA (US); Muriel Y. Ishikawa, Livermore, CA (US); Jordin T. Kare, Seattle, WA (US); Thomas A. Weaver, San Mateo, CA (US); Lowell L. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 0 days.

(21) Appl. No.: 13/729,317

(22) Filed: Dec. 28, 2012

(51) Int. Cl.
*G05B 21/00* (2006.01)
*G06F 17/00* (2006.01)
*G06F 19/00* (2011.01)

(52) U.S. Cl.
USPC .............. 700/90; 700/274; 701/1; 701/29.1; 705/1.1; 705/14.1

(58) Field of Classification Search
USPC .......... 423/212, 213.2, 220; 422/108; 60/272, 60/274, 276, 282; 700/90, 274; 701/1, 701/29.1; 705/1.1, 14.1
See application file for complete search history.

(56) References Cited

U.S. PATENT DOCUMENTS

| | | | |
|---|---|---|---|
| 6,146,603 | A | 11/2000 | Chakravarti et al. |
| 6,165,433 | A | 12/2000 | Chakravarti et al. |
| 6,174,506 | B1 | 1/2001 | Chakravarti et al. |
| 6,387,845 | B1 | 5/2002 | Masahiro et al. |
| 6,866,702 | B2 | 3/2005 | Mitsuda |
| 6,890,497 | B2 | 5/2005 | Rau et al. |
| 6,925,821 | B2 | 8/2005 | Sienel |
| 6,962,681 | B2 | 11/2005 | Maganas et al. |
| 7,043,920 | B2 | 5/2006 | Viteri et al. |
| 7,065,962 | B2 | 6/2006 | Boncodin |
| 7,073,348 | B2 | 7/2006 | Clodic et al. |
| 7,556,673 | B2 | 7/2009 | Schubert et al. |
| 7,588,630 | B2 | 9/2009 | Imada et al. |
| 7,601,315 | B2 | 10/2009 | Ouimet |
| 7,637,983 | B1 | 12/2009 | Liu et al. |
| 8,138,380 | B2 | 3/2012 | Olah et al. |
| 8,527,335 | B1 | 9/2013 | MacArthur |
| 2007/0068389 | A1 | 3/2007 | Yaghi |
| 2008/0276804 | A1 | 11/2008 | Sayari et al. |

(Continued)

FOREIGN PATENT DOCUMENTS

| | | |
|---|---|---|
| CN | 2851592 Y | 12/2006 |
| CN | 200989229 Y | 12/2007 |

(Continued)

OTHER PUBLICATIONS

An et al.; "High and Selective $CO_2$ Uptake in a Cobalt Adeninate Metal-Organic Framework Exhibiting Pyrimidine- and Amino-Decorated Pores"; J. Am. Chem. Soc.; 2010; pp. 38-39; vol. 132; The American Chemical Society.

(Continued)

*Primary Examiner* — Timothy Vanoy

(57) ABSTRACT

Disclosed embodiments include methods of removing carbon dioxide from combustion gas from an engine of a vehicle, systems for removing carbon dioxide from combustion gas from an engine of a vehicle, vehicles, methods of managing carbon dioxide emissions from an engine of a vehicle, and computer software program products for managing carbon dioxide emissions from an engine of a vehicle.

41 Claims, 96 Drawing Sheets

(56) References Cited

U.S. PATENT DOCUMENTS

| | | | |
|---|---|---|---|
| 2009/0130321 A1 | 5/2009 | Liu | |
| 2009/0211899 A1 | 8/2009 | Niioka | |
| 2009/0263296 A1 | 10/2009 | Taques | |
| 2009/0266230 A1 | 10/2009 | Radosz et al. | |
| 2009/0301297 A1 | 12/2009 | Littau | |
| 2009/0305388 A1 | 12/2009 | Dressler et al. | |
| 2009/0320682 A1 | 12/2009 | Wagner et al. | |
| 2010/0332241 A1* | 12/2010 | Boss et al. | 705/1.1 |
| 2011/0185705 A1* | 8/2011 | Shaw et al. | 60/274 |
| 2012/0054086 A1* | 3/2012 | Choi | 705/37 |
| 2012/0173293 A1* | 7/2012 | Motley et al. | 705/7.11 |
| 2013/0133308 A1* | 5/2013 | Wei et al. | 60/274 |

FOREIGN PATENT DOCUMENTS

| | | |
|---|---|---|
| DE | 10 2004 054 609 A1 | 10/2006 |
| EP | 1 992 799 A2 | 11/2008 |
| JP | 2007-177684 A | 7/2007 |
| JP | 2007-224792 A | 9/2007 |
| WO | WO 2007/128994 A1 | 11/2007 |
| WO | WO 2008/137092 A2 | 11/2008 |
| WO | WO 2009/121135 A1 | 10/2009 |
| WO | WO 2009/143376 A2 | 11/2009 |
| WO | WO 2010/002404 A1 | 1/2010 |
| WO | WO 2010/027335 A1 | 3/2010 |

OTHER PUBLICATIONS

Atsumi et al.; "Direct photosynthetic recycling of carbon dioxide to isobutyraldehyde"; Nature Biotechnology; Dec. 2009; vol. 27 No. 9; pp. 1177-1182; Nature America Inc.
Bara et al.; "Room-Temperature Ionic Liquids and Composite Materials: Platform Technologies for $CO_2$ Capture"; Accounts of Chemical Research; Jan. 2010; pp. 152-159; vol. 43; No. 1; American Chemical Society.
Bates et al.; "$CO_2$ Capture by a Task-Specific Ionic Liquid"; J. Am. Chem. Soc.; 2002; pp. 926-927; vol. 124; No. 6; American Chemical Society.
Barton et al.; "Selective Solar-Driven Reduction of CO2 to Methanol Using a Catalyzed p-GaP Based Photoelectrochemical Cell"; J. Am. Chem. Soc.; 2008, vol. 130; pp. 6342-6344; American Chemical Society.
Belmabkhout et al.; "Adsorption of $CO_2$-Containing Gas Mixtures over Amine-Bearing Pore-Expanded MCM-41 Silica: Application for Gas Purification"; Ind. Eng. Chem. Res.; 2010; pp. 359-365; vol. 49; American Chemical Society.
Bilger et al.; "Carbon Capture for Automobiles Using Internal Combustion Rankine Cycle Engines"; J. Eng. Gas Turbines and Power; May 2009; pp. 034502-1-034502-4; vol. 131; American Society of Mechanical Engineers.
Blomen et al.; "Capture technologies: Improvements and Promising Developments"; Energy Procedia I; 2009; pp. 1505-1512; Elsevier Ltd.
Britt et al.; "Highly efficient separation of carbon dioxide by a metal-organic framework replete with open metal sites"; PNAS; Dec. 8, 2009; pp. 20637-20640; vol. 106; No. 49.
Brooks et al.; "Anion-binding modes in a macrocyclic amidourea"; Chem. Commun.; 2006; pp. 4344-4346; The Royal Society of Chemistry.
Chen et al.; "Amine-impregnated silica monolith with a hierarchical pore structure: enhancement of $CO_2$ capture capacity"; Chem. Commun.; 2009; pp. 3627-3629; The Royal Society of Chemistry.
Choi et al.; "Highly Selective $CO_2$ Capture in Flexible 3D Coordination Polymer Networks"; Angew. Chem. Int. Ed.; 2009; pp. 1-6; vol. 48; Wiley-VCH-Verlag GmbH & Co. KGaA, Weinheim.

Chueh et al.; "Ceria as a Thermochemical Reaction Medium for Selectively Generating Syngas or Methane from H2O and CO2"; ChemSusChem; 2009; pp. 735-739; vol. 2; Wiley InterScience.
Dang et al.; "$CO_2$ Absorption Rate and Solubility in Monoethanolamine/Piperazine/Water"; First National Conference on Carbon Sequestration, Washington, DC; May 14-17, 2001; pp. 1-17.
Demessence et al.; Strong $CO_2$ Binding in a Water-Stable, Triazolate-Bridged Metal-Organic Framework Functionalized with Ethylenediamine; J. Am. Chem. Soc.; 2009; pp. 8784-8786; vol. 131; American Chemical Society.
Dorner et al.; "Influence of Gas Feed Composition and Pressure on the Catalytic Conversation of CO2 to Hydrocarbons Using a Traditional Cobalt-Based Fischer-Tropsch Catalyst"; Energy and Fuels; 2009; vol. 23; pp. 4190-4195; American Chemical Society.
Furukawa et al.; "Storage of Hydrogen, Methane, and Carbon Dioxide in Highly Porous Covalent Organic Frameworks for Clean Energy Applications"; J. Am. Chem. Soc. 2009; pp. 8875-8883; vol. 131; American Chemical Society.
Greenlime; "The Greenhouse Gas Buster"; located at http://www.greenlime.com.au/THE-Zero-Emissions-Vehicle.php; 2008 and printed on May 19, 2010; pp. 1-3; Graham Dixon.
Herzog et al.; "Advanced Post-Combustion $CO_2$Capture"; Clean Air Task Force; Apr. 2009; pp. 1-39.
Hicks et al.; "Designing Adsorbents for $CO_2$ Capture from Flue Gas-Hyperbranched Aminosilicas Capable of Capturing $CO_2$ Reversibly"; J. Am. Chem. Soc.; 2008; pp. 2902-2903; vol. 130; No. 10; American Chemical Society.
Ma et al.; "Gas storage in porous metal-organic frameworks for clean energy applications"; Chem. Commun.; 2010; pp. 44-53; vol. 46; The Royal Society of Chemistry 2010.
Maiti, Amitesh; "Theoretical Screening of Ionic Liquid Solvents for Carbon Capture"; ChemSusChem; pp. 628-631; 2009; vol. 2; Wiley-VCH Verlag GmbH & Co. KGaA, Weinheim.
Munoz et al.; "New liquid absorbents for the removal of $CO_2$ from gas mixtures"; Energy & Environmental Science; 2009; pp. 1-18; The Royal Society of Chemistry.
Pera-Titus et al.; "Nanocomposite MFI-Alumina Membranes: High-Flux Hollow Fibers for $CO_2$ Capture from Internal Combustion Vehicles"; Ind. Eng. Chem. Res.; 2009; Abstract Only; American Chemical Society.
Phan et al.; "Synthesis, Structure, and Carbon Dioxide Capture Properties of Zeolitic Imidazolate Frameworks"; Accounts of Chemical Research; bearing dates of Apr. 6, 2009 and Oct. 30, 2009; pp. A-J (10 pages total); American Chemical Society.
Shibata et al.; "Enabling Electrocatalytic Fischer-Tropsch Synthesis from Carbon Dioxide Over Copper-based Electrodes"; Catal Lett; 2008; vol. 123; pp. 186-192; OpenAccess; Springer.
Tossell, J.A.; "Catching $CO_2$ in a Bowl"; Inorg. Chem.; 2009; pp. 7105-7110; vol. 48; American Chemical Society.
Toyokuni, Tatsushi; "Possible Methods (excluding the use of NaOH, methylethylamine and zeolite)"; bearing a date of Apr. 10, 2009 and printed on May 19, 2010; 4 pages total.
Vaidhyanathan et al.; "An amine-functionalized metal organic framework for preferential $CO_2$ adsorption at low pressures"; Chem. Commun.; 2009; pp. 5230-5232; The Royal Society of Chemistry.
Varghese et al.; "High-Rate Solar Photocatalytic Conversion of CO2 and Water Vapor to Hydrocarbon Fuels"; Nano Letters; 2009; vol. 9 No. 2; pp. 731-737; American Chemical Society.
Yave et al.; "$CO_2$-Philic Polymer Membrane with Extremely High Separation Performance"; Macromolecules; 2010; pp. 326-333; vol. 43; American Chemical Society.
Zhang et al.; "Sustainable chemistry: imidazolium salts in biomass conversion and $CO_2$ fixation"; Energy & Environmental Science; 2010; pp. 1-20; The Royal Society of Chemistry.

* cited by examiner

SYSTEMS AND METHODS FOR MANAGING EMISSIONS FROM AN ENGINE OF A VEHICLE

BACKGROUND

This patent application relates to managing emissions from an engine of a vehicle.

SUMMARY

Disclosed embodiments include methods of removing carbon dioxide from combustion gas from an engine of a vehicle, systems for removing carbon dioxide from combustion gas from an engine of a vehicle, vehicles, methods of managing carbon dioxide emissions from an engine of a vehicle, and computer software program products for managing carbon dioxide emissions from an engine of a vehicle.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIGS. 1B-1AK are flowcharts of details of the method of FIG. 1A.

The use of the same symbols in different drawings typically indicates similar or identical items.

DETAILED DESCRIPTION

Initial Considerations

Figure 1A:
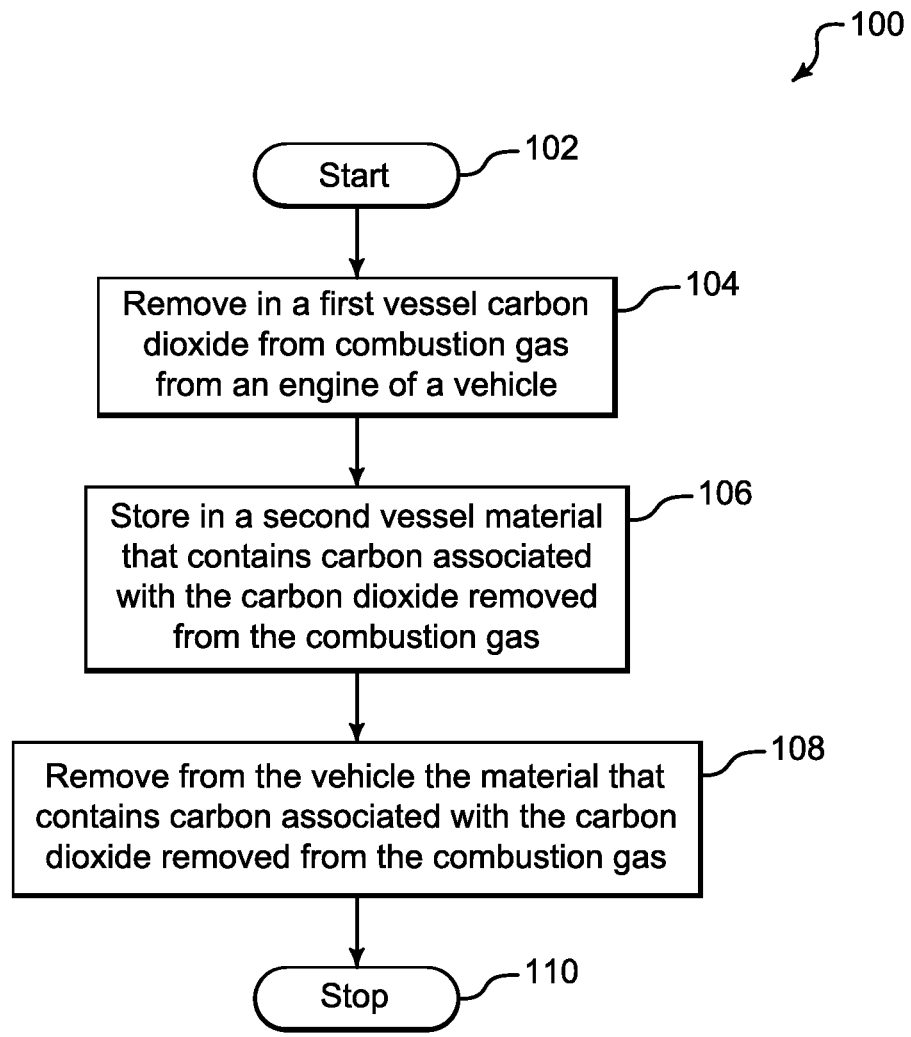
FIG. 1A is a flowchart of an illustrative method of removing carbon dioxide from combustion gas from an engine of a vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application uses formal outline headings for clarity of presentation. However, it is to be understood that the outline headings are for presentation purposes, and that different types of subject matter may be discussed throughout the application (e.g., devices/structures may be described under processes/operations headings and/or processes/operations may be discussed under structures/processes headings; and/or descriptions of single topics may span two or more topic headings). Hence, the use of the formal outline headings is not intended to be in any way limiting.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/ or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Overview

Given by way of overview, disclosed embodiments include methods of removing carbon dioxide from combustion gas from an engine of a vehicle, systems for removing carbon dioxide from combustion gas from an engine of a vehicle, vehicles, methods of managing carbon dioxide emissions from an engine of a vehicle, and computer software program products for managing carbon dioxide emissions from an engine of a vehicle.

In one or more various embodiments, related systems include but are not limited to circuitry and/or programming for effecting the herein-referenced method embodiments; the circuitry and/or programming can be virtually any combination of hardware, software, and/or firmware configured to effect the herein-referenced method embodiments depending upon the design choices of the system designer.

These and other embodiments will be discussed in turn below and explained by way of examples that are given by way of illustration and not of limitation.

Removing Carbon Dioxide from Combustion Gas from an Engine of a Vehicle

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 3:
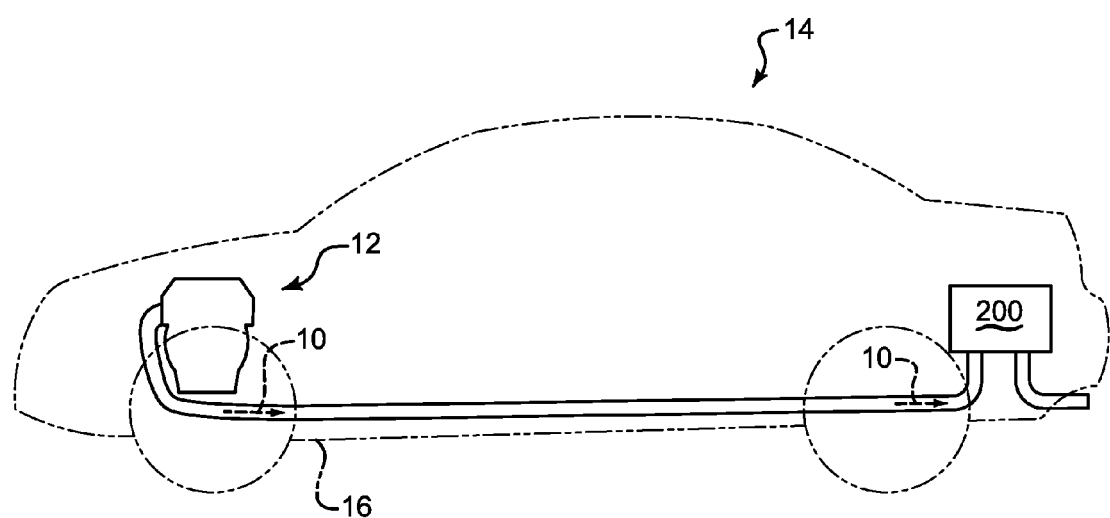
FIG. 3 is an illustration in partial schematic form of an illustrative vehicle.

Referring to FIGS. 1A and 3 and given by way of overview, an illustrative method 100 (FIG. 1A) is provided for removing carbon dioxide from combustion gas 10 (FIG. 3) from an engine 12 (FIG. 3) of a vehicle 14 (FIG. 3). The method 100 starts at a block 102. At a block 104, carbon dioxide is removed from the combustion gas 10 in a first vessel. At a block 106, material that contains carbon associated with the carbon dioxide removed from the combustion gas 10 is stored in a second vessel. At a block 108, the material that contains carbon associated with the carbon dioxide removed from the combustion gas is removed from the vehicle 14. The method 100 stops at a block 110.

The method 100 will be explained first. An illustrative system 200, including its components, will be explained next and the vehicle 14 then will be explained. Illustrative details will be set forth below by way of non-limiting examples.

It will be appreciated that the vehicle 14 may include any type of vehicle whatsoever that includes an engine 12 which produces carbon dioxide emissions that are present in the combustion gas 10 that is exhausted from the engine 12. Accordingly, no limitation to the type of vehicle 14 is intended and is not to be inferred. Thus, the vehicle 14 may include, by way of illustration only and not of limitation: a land conveyance such as an automobile, a car, a truck, a van, a train, a farm implement such as a tractor or the like, a military vehicle such as a tank or a personnel carrier or the like; a water-borne conveyance, such as a surface ship like a maritime vessel or a pleasure craft or a naval vessel, or a submarine (with a diesel engine); or an aerial conveyance such as a fixed-wing aircraft or a rotary wing aircraft.

The engine 12 may be any type of internal combustion engine as desired for a particular application. For example, the engine 12 may be an internal combustion engine that uses a hydrocarbon fuel, such as gasoline or diesel fuel. In some embodiments, the engine 12 may be disposed in an internal combustion engine in a hybrid vehicle in which fuel may be switched between a hydrocarbon fuel for the engine 12 and electricity to power an electric motor. In some applications, fuel for the engine 12 may be determined by the vehicle 14 in which the engine 12 is disposed. For example, in embodiments in which the vehicle 14 is embodied as a submarine, the engine 12 is a diesel engine.

Referring additionally to FIG. 1AK, in some embodiments storing in a second vessel material that contains carbon associated with the carbon dioxide removed from the combustion gas 10 at the block 106 may include storing in a removably replaceable second vessel material that contains carbon associated with the carbon dioxide removed from the combustion gas 10 at a block 182.

Figure 1B:
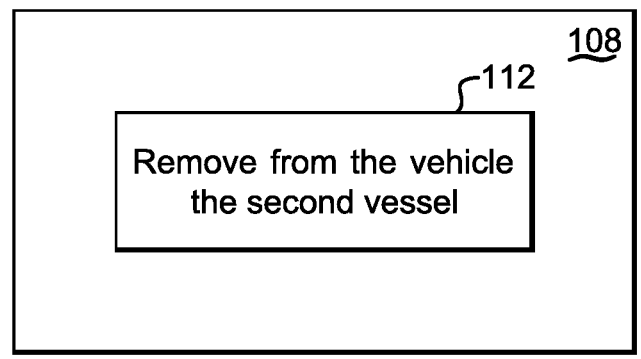

In a related aspect and referring additionally to FIG. 1B, in some embodiments removing from the vehicle 14 the material that contains carbon associated with the carbon dioxide removed from the combustion gas 10 at the block 108 may include removing from the vehicle 14 the second vessel.

Given by way of non-limiting example for illustration purposes only, the second vessel (that contains carbon associated with the carbon dioxide removed from the combustion gas 10) may be removed from the vehicle 14 and brought to a collection or exchange facility that accepts containers (such as the second vessel) that contain carbon associated with the carbon dioxide removed from the combustion gas 10. However, it will be appreciated that, in other applications, the second vessel need not be brought to such a collection or exchange facility.

Figure 1C:
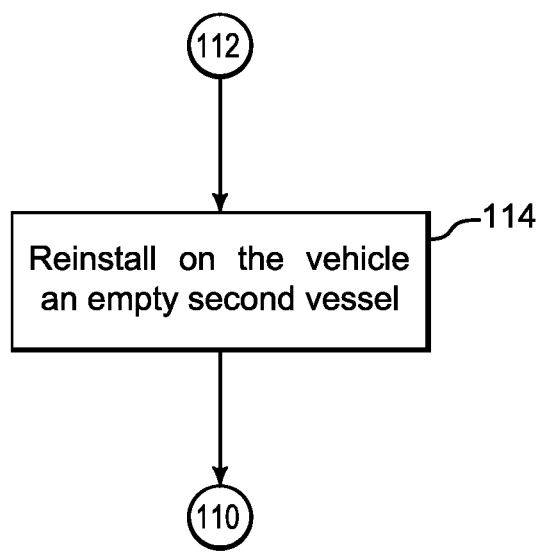

In some other embodiments and referring additionally to FIG. 1C, if desired an empty second vessel may be reinstalled on the vehicle 14 at a block 114. In such cases, it will be appreciated that an empty second vessel may be obtained from a collection or exchange facility as described above. Thus, given by way of non-limiting example, in such a case the second vessel (that contains carbon associated with the carbon dioxide removed from the combustion gas 10 may be removed from the vehicle 14 at the block 112 and brought to the collection or exchange facility and exchanged for an empty second vessel, which is reinstalled on the vehicle 14 at the block 114. However, it will be appreciated that an empty second vessel need not be obtained from such a collection or exchange facility and may be obtained from any source as desired.

Figure 1D:
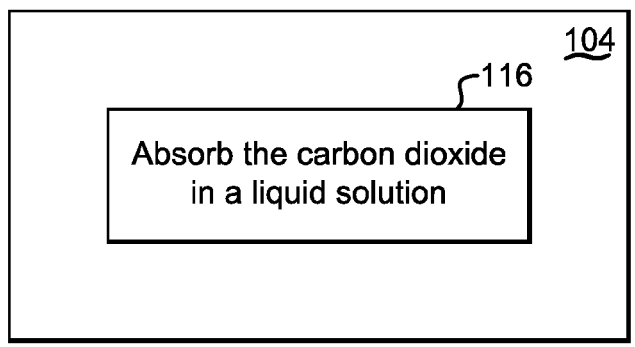

It will be appreciated that the carbon dioxide may be removed from the combustion gas 10 in any manner desired. For example and referring additionally to FIGS. 1A, 1D, and 3, removing in a first vessel carbon dioxide from the combustion gas 10 at the block 104 may include absorbing the carbon dioxide in a liquid solution. Given by way of example only and not of limitation, the liquid solution may include without limitation a chemical solvent absorber, like an alkanolamine solvent such as without limitation monoethanolamine (MEA), methyldiethanolamine (MDEA), diethanolamine (DEA), piperazine, diisopropanolamine (DIPA), diglycolamine (DGA), and/or triethanolamine (TEA). In some embodiments, carbonic anhydrase may be used with the chemical solvent absorber to increase carbon dioxide absorption rates.

Given by way of further examples, in some embodiments the liquid solution may include amine-modified room temperature ionic liquids ("RTILs"), such as without limitation amine-solubilized RTILs ("RTIL-amines") and/or amino functionalized RTILs (task-specific ionic liquids, or "TSILs").

In some other embodiments and given by way of further examples, the liquid solution may include aminoacid metal salts with piperazine. For example, the aminoacid metal salt may include without limitation potassium dimethylaminoacetate. In some other embodiments, the liquid solution may include amino-amides, such as without limitation diethylaminoacetamide.

Figure 1E:
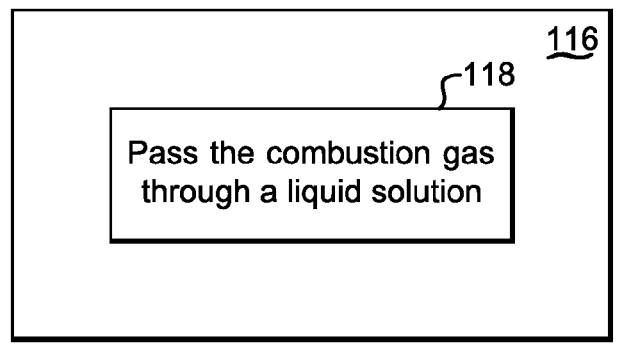
Figure 1F:
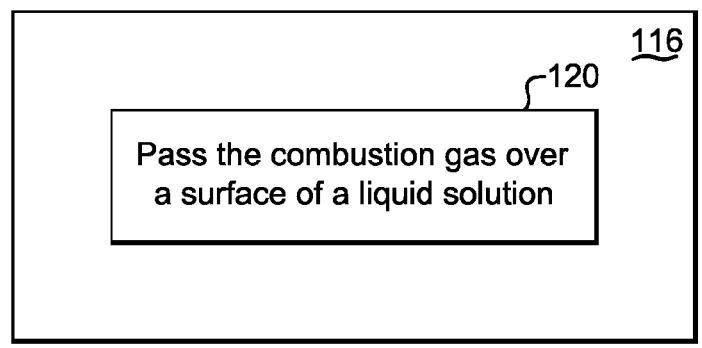
Figure 1G:
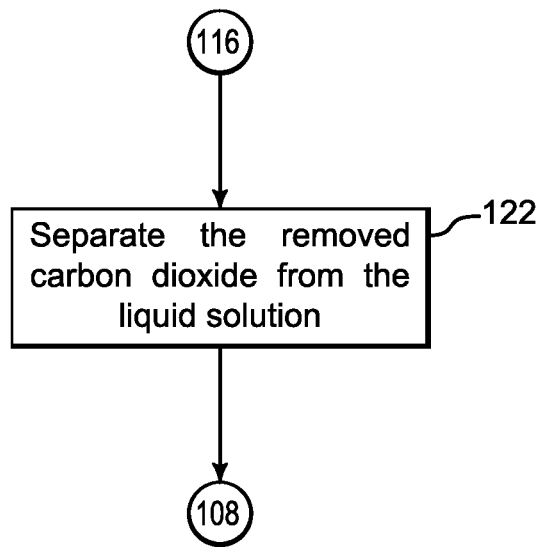

In some embodiments and referring additionally to FIG. 1E, absorbing the carbon dioxide in a liquid solution at the block 116 may include passing the combustion gas through a liquid solution at a block 118. In some other embodiments and referring additionally to FIG. 1F, absorbing the carbon dioxide in a liquid solution at the block 116 may include passing the combustion gas over a surface of a liquid solution at a block 120.

It will be appreciated that, in some embodiments, the first vessel has a first pressure and the second vessel has a second pressure that is less than the first pressure. In such cases, a pressure differential can help prevent backflow from the second vessel to the first vessel. Also, in some embodiments (and depending upon the removal modality), a higher pressure may be entailed for removing carbon dioxide than is entailed for storing carbon dioxide.

Figure 1H:
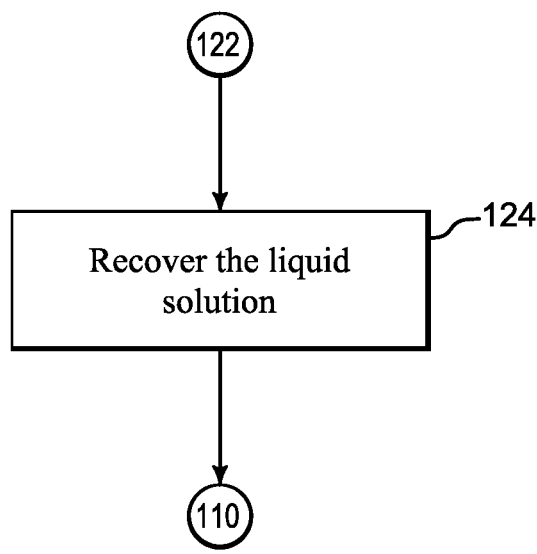

In some embodiments and referring to FIGS. 1A, 1D, 1G, and 3, if desired the removed carbon dioxide may be separated from the liquid solution at a block 122. Given by way of non-limiting example for purposes of illustration, the liquid solution may be heated in any manner as desired to a temperature sufficient to separate the carbon dioxide from the liquid solution, and the carbon dioxide is transferred to the second vessel for storage. Referring additionally to FIG. 1H, in some embodiments after the carbon dioxide is separated from the liquid solution at the block 122, if desired, the liquid solution may be recovered at a block 124. For example, the liquid solution from which the carbon dioxide has been separated may be cooled in the first vessel from its previously-elevated temperature, whereupon the liquid solution may once again be used for absorbing carbon dioxide.

Figure 1I:
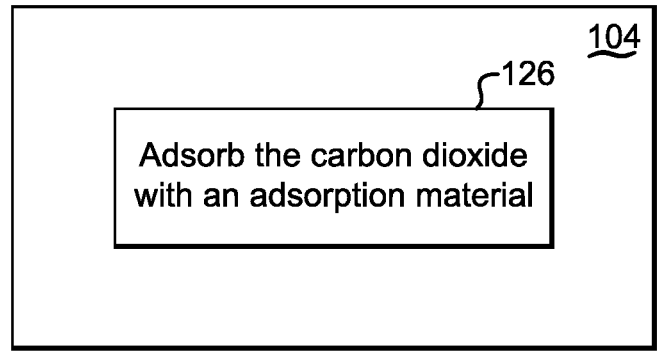

In some other embodiments and referring now to FIGS. 1A, 1I, and 3, removing in a first vessel carbon dioxide from the combustion gas 10 at the block 104 may include adsorbing the carbon dioxide with an adsorption material at a block 126. Given by way of example only and not of limitation, in some embodiments the adsorption material may include without limitation activated carbon, a metal-oxide-framework (MOF), silica gel, zeolite, a zeolitic-imidezolate-framework (ZIF), porous material, and/or mesoporous material. In some other embodiments and given by way of further examples, the adsorption material may include: RTILs such as imidazolium-based ionic liquids; and/or polymerized room temperature ionic liquids ("poly(RTILs)").

Figure 1J:
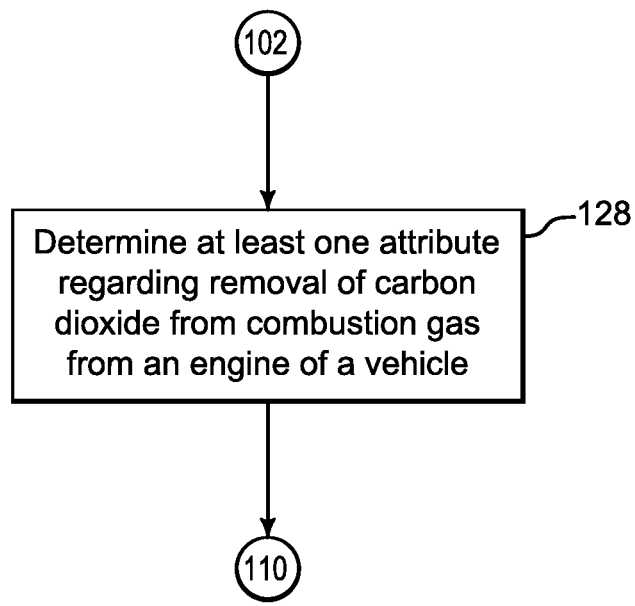
Figure 1K:
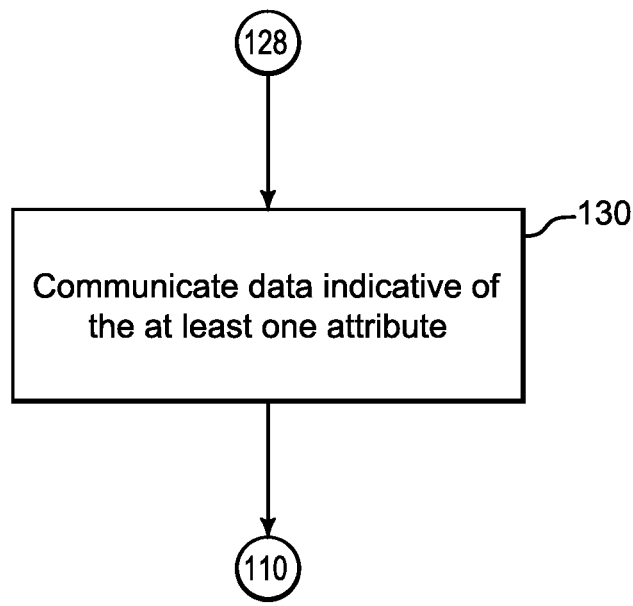

Referring now to FIGS. 1A, 1J, and 3, in some embodiments, if desired, at least one attribute regarding removal of carbon dioxide from the combustion gas 10 may be determined at a block 128. The determination of the attribute at the block 128 may be performed at any point in the method 100 as desired for a particular application. Given by way of non-limiting examples, timing of determination of the attribute may depend in part on whether the attribute relates to outcome of a processing block that has already been performed, whether the attribute is relied upon by any further processing block, or the like. For example and referring additionally to FIG. 1K, in some embodiments and if desired after the attribute is determined at the block 128, data indicative of the at least one attribute may be communicated at a block 130.

It will be appreciated that the attribute may include any one or more attributes regarding any one or more aspects whatsoever regarding removal of carbon dioxide from the combustion gas 10 as desired for a particular application. Given by way of non-limiting examples, the at least one attribute regarding removal of carbon dioxide from the combustion gas 10 may include without limitation any one or more of the following attributes: position of the vehicle 14 where the carbon dioxide is removed from the combustion gas 10; time when the carbon dioxide is removed from the combustion gas 10; governmental regulations regarding removing carbon dioxide from combustion gas from an engine of a vehicle; an amount of pollution in air that is drawn into the engine 12; or the like.

It will be appreciated that the material that contains carbon associated with the carbon dioxide removed from the combustion gas 10 may include various carbon-containing compounds, depending upon whether or not any additional processing is performed on the carbon dioxide removed from the combustion gas 10. For example, in some embodiments when no further processing is performed on the carbon dioxide removed from the combustion gas 10, the material that contains carbon associated with the carbon dioxide removed from the combustion gas 10 may include carbon dioxide itself removed from the combustion gas 10.

Figure 1L:
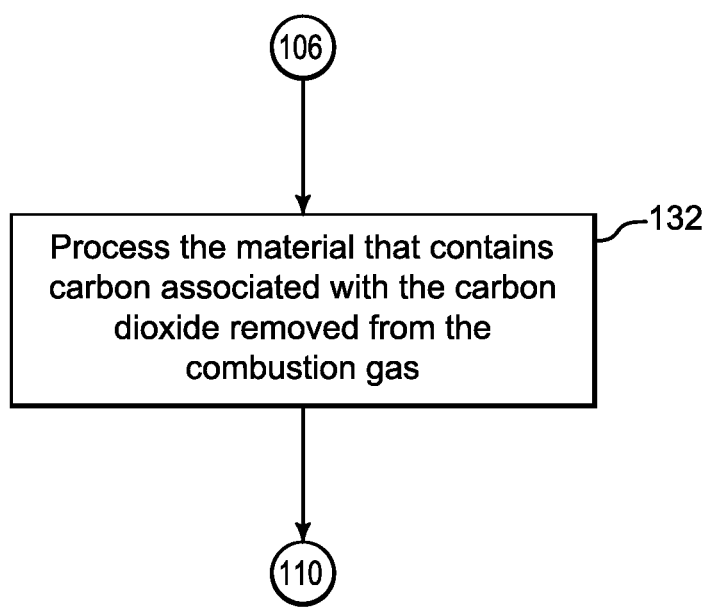
Figure 1M:
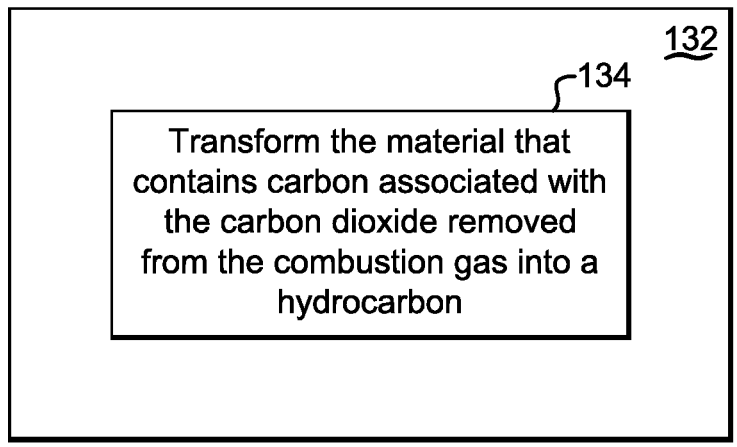

In some embodiments and referring additionally to FIG. 1L, if desired at a block 132 the material that contains carbon associated with the carbon dioxide removed from the combustion gas 10 may be processed. As used in this application, "processing" means "reacting with a chemical reactant." Accordingly, in some embodiments, processing the material that contains carbon associated with the carbon dioxide removed from the combustion gas 10 at the block 132 may include reacting the material that contains carbon associated with the carbon dioxide removed from the combustion gas 10 with a chemical reactant. For example and without limitation, in some embodiments and referring additionally to FIG. 1M, processing the material that contains carbon associated with the carbon dioxide removed from the combustion gas 10 at the block 132 may include transforming the material that contains carbon associated with the carbon dioxide removed from the combustion gas 10 into a hydrocarbon, such as without limitation a hydrocarbon fuel, at a block 134. Given by way of non-limiting examples, carbon dioxide may be reacted with natural gas to produce syngas (carbon monoxide and hydrogen) via "dry reforming". Given by way of further non-limiting examples, carbon dioxide may be transformed to a hydrocarbon via chemical methods and via biochemical methods.

Regarding chemical methods, chemical transformations of carbon dioxide start with $CO_2$ (not $CO_3^{2-}$, such as soluble carbonate salts like $NaHCO_3$ and $Na_2CO_3$), so (if carbon dioxide has been adsorbed) adsorbed carbon dioxide is first released from the adsorbent (such as by heating or under reduced pressure). Illustrative chemical methods may include, without limitation, transformation of carbon dioxide to methanol. In various embodiments, transformation of carbon dioxide to methanol may be accomplished via illustrative chemical methods such as without limitation catalytic hydrogenation (such as under high temperature and high pressure or via reduction of $CO_2$ with a silane using a stable N-heterocyclic carbene organocatalyst to produce a methylsilyl ether which is subsequently hydrolyzed to yield methanol). In another illustrative chemical method, electrochemical reduction of $CO_2$ in aqueous media generates CO and $H_2$ at the cathode in a ratio of approximately 1:2 while producing $O_2$ at the anode, and the generated CO and $H_2$ at the cathode are subsequently reacted to form methanol. In another illustrative chemical method, in a photoelectrochemical reaction reduction of $CO_2$ occurs at a p-type semiconductor electrode with a homogenous pyridinium ion catalyst using light energy.

Further illustrative chemical methods may include, without limitation, transformation of carbon dioxide to methane. In various embodiments, transformation of carbon dioxide to methane may be accomplished via illustrative chemical methods such as without limitation catalytic hydrogenation. For example, in an embodiment hydrogenation of $CO_2$ over a Fischer-Tropsch Co—Pt/$Al_2O_3$ catalyst yields methane as the major product together with small fractions of $C_2$-$C_4$ hydrocarbons. In some illustrative embodiments, in a solar photocatalytic reaction that uses arrays of nitrogen-doped titania nanotubes sputter-coated with an ultrathin layer of a platinum and/or copper co-catalyst(s), exposure of $CO_2$ and water vapor to sunlight produces methane as the major product. In other embodiments, an illustrative thermochemical reaction of $CO_2$ and $H_2O$ yields methane by using reduced samarium-doped ceria that has been treated with a base-metal catalyst (such as Ni).

Further illustrative chemical methods may include, without limitation, transformation of carbon dioxide to a Fischer-Tropsch product. Given by way of non-limiting example, electroreduction of $CO_2$ over an un-electropolished Cu-electrode can produce hydrocarbons with a distribution similar to that obtained from the Fischer-Tropsch reaction of syngas.

Illustrative biochemical methods may include, without limitation, transformation of carbon dioxide to isobutyraldehyde and isobutanol. In some embodiments, genetically engineered cyanobacteria can convert either $CO_2$ or $NaHCO_3$ to isobutyraldehyde, and isobutyraldehyde is readily transformed to isobutanol. In some other embodiments, genetically engineered photosynthetic microorganisms can produce isoprene from $CO_2$ or $CO_3^{2-}$.

Figure 1N:
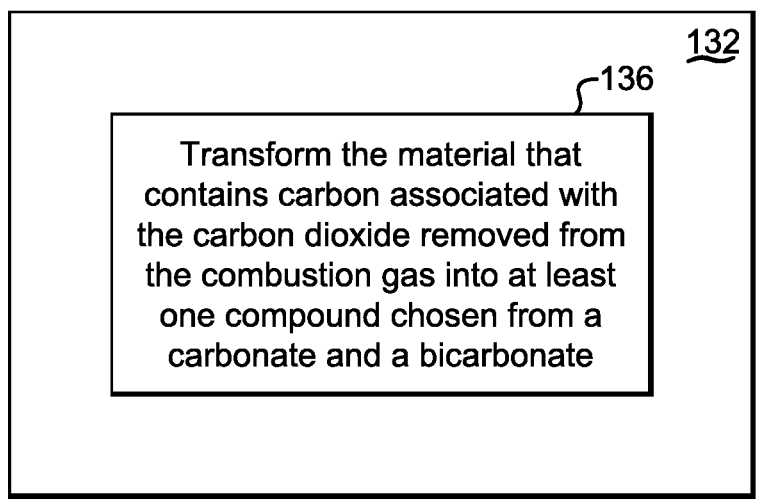

As a further example and without limitation, in some other embodiments and referring additionally to FIG. 1N, processing the material that contains carbon associated with the carbon dioxide removed from the combustion gas 10 may include transforming the material that contains carbon associated with the carbon dioxide removed from the combustion gas 10 into at least one compound chosen from a carbonate and a bicarbonate at a block 136. Given by way of non-limiting examples, the carbon dioxide may be reacted with a hydroxide, such as an alkali hydroxide. For example, the carbon dioxide may be reacted with sodium hydroxide to form sodium carbonate or sodium bicarbonate or with potassium hydroxide to form potassium carbonate or potassium bicarbonate, as desired.

As a further example and without limitation, in some other embodiments processing the material that contains carbon associated with the carbon dioxide removed from the combustion gas 10 may include hydrating the material that contains carbon associated with the carbon dioxide removed from the combustion gas 10 to form carbonic acid. In embodiments in which carbonic acid is formed, the carbonic acid may be reacted with a carbonate, if desired.

In short, it will be appreciated that the material that contains carbon associated with the carbon dioxide removed from the combustion gas 10 may be reacted with any chemical reactant as desired.

It will also be appreciated that the material that contains carbon associated with the carbon dioxide removed from the combustion gas 10 may be stored while being processed. However, the material that contains carbon associated with the carbon dioxide removed from the combustion gas 10 need not be stored in order to be processed. Accordingly, in some embodiments, the material that contains carbon associated with the carbon dioxide removed from the combustion gas 10 may be processed without being stored.

In various embodiments the method 100 may include any one or more additional process blocks related to the material that contains carbon associated with carbon dioxide removed from the combustion gas 10 and/or removal of carbon dioxide from the combustion gas 10. Several examples will be given below by way of illustration and not of limitation.

Figure 1O:
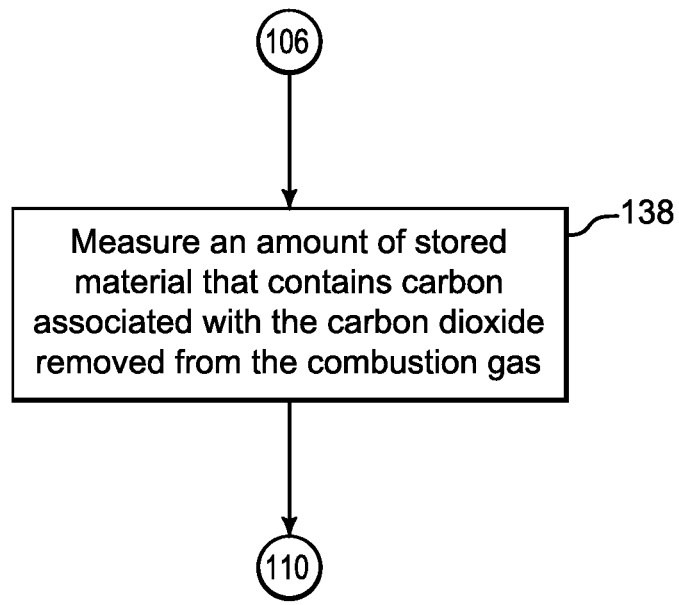
Figure 1P:
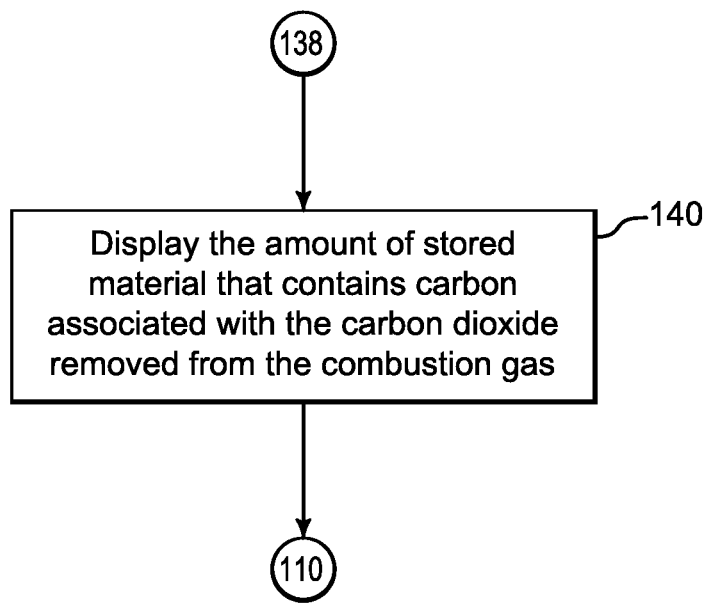
Figure 1Q:
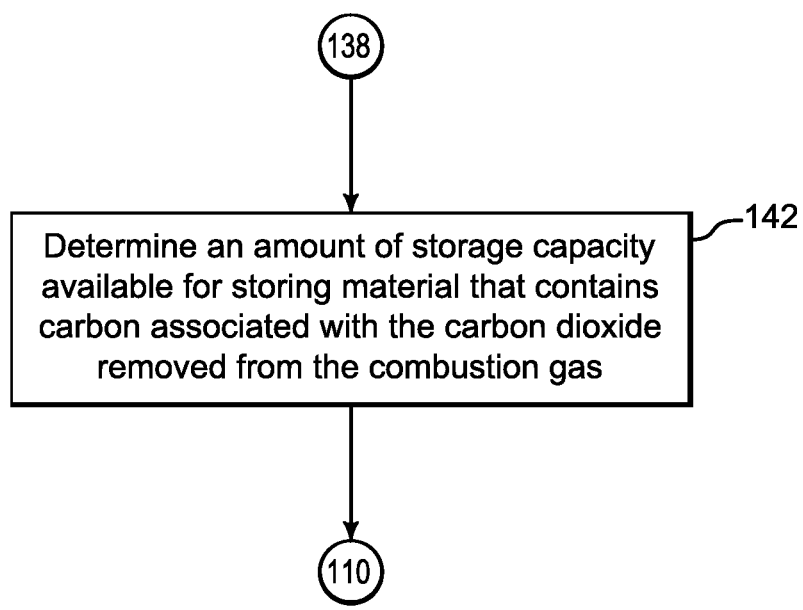

For example and referring to FIGS. 1A, 1O, and 3, in some embodiments an amount of stored material that contains carbon associated with the carbon dioxide removed from the combustion gas 10 may be measured at a block 138. The measurement performed at the block 138 may measure volume and/or weight, as desired for a particular application. It will be appreciated that any measurement technique and sensors may be used as desired. In some other embodiments and referring additionally to FIG. 1P, the amount of stored material that contains carbon associated with the carbon dioxide removed from the combustion gas 10 may be displayed at a block 140.

Figure 1R:
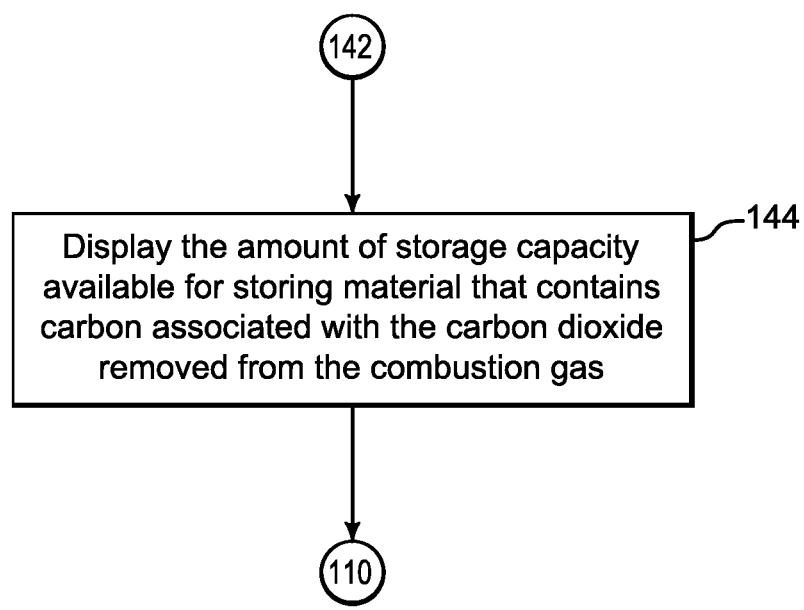
Figure 1S:
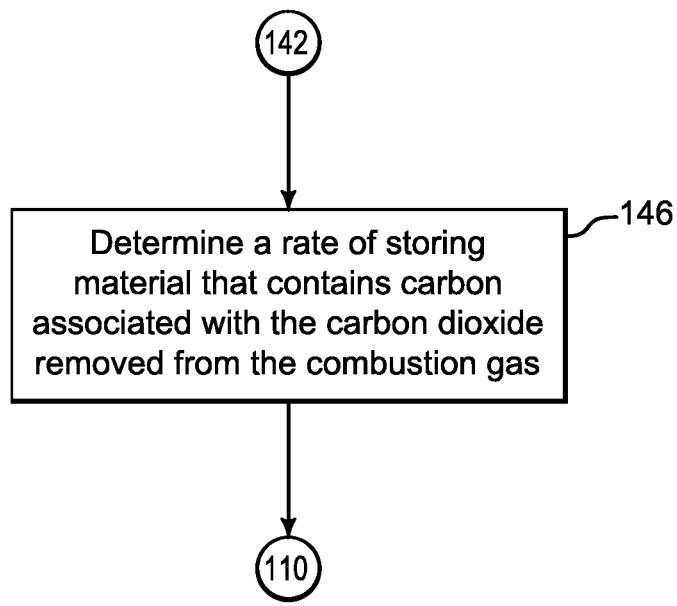

In some embodiments and referring to FIGS. 1A, 1O, 1Q, and 3, an amount of storage capacity available for storing material that contains carbon associated with the carbon dioxide removed from the combustion gas 10 may be determined at a block 142. For example, the amount of stored material that contains carbon associated with the carbon dioxide removed from the combustion gas 10 (that was measured at the block 138) may be subtracted from the total amount of storage capacity available in an empty second vessel. In some embodiments and referring additionally to FIG. 1R, the amount of storage capacity available for storing material that contains carbon associated with the carbon dioxide removed from the combustion gas 10 may be displayed at a block 144.

In some embodiments and referring to FIGS. 1A, 1O, 1Q, 1S, and 3, a rate of storing material that contains carbon associated with the carbon dioxide removed from the combustion gas 10 may be determined at a block 146. For example, the amount of stored material that contains carbon associated with the carbon dioxide removed from the combustion gas 10 (that was measured at the block 138) may be divided by time that elapsed during storage of the material that contains carbon associated with the carbon dioxide removed from the combustion gas 10.

Figure 1T:
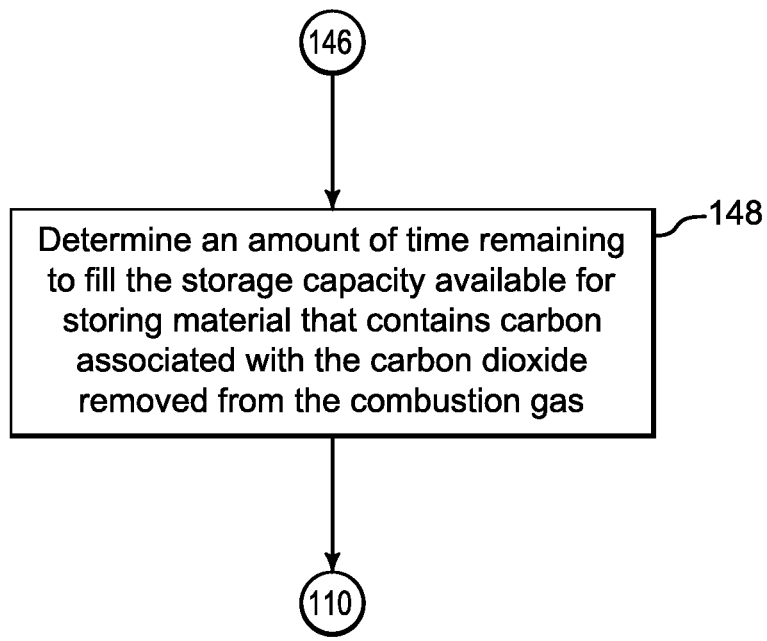
Figure 1U:
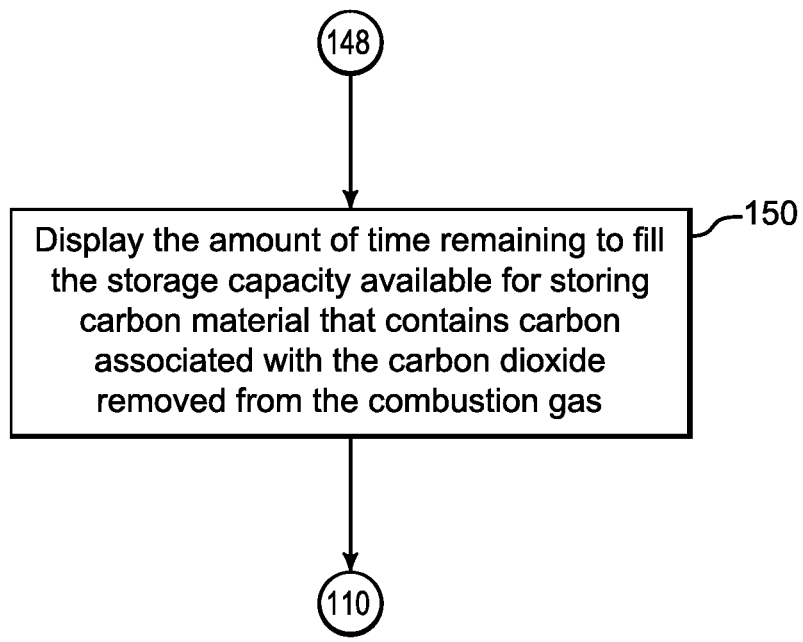

Referring additionally to FIG. 1T, in some embodiments an amount of time remaining to fill the storage capacity available for storing material that contains carbon associated with the carbon dioxide removed from the combustion gas 10 may be determined at a block 148. For example, the amount of storage capacity available for storing material that contains carbon associated with the carbon dioxide removed from the combustion gas 10 (that was determined at the block 142) may be divided by the rate of storing material that contains carbon associated with the carbon dioxide removed from the combustion gas 10 (that was determined at the block 146). Referring additionally to FIG. 1U, in some embodiments the amount of time remaining to fill the storage capacity available for storing carbon material that contains carbon associated with the carbon dioxide removed from the combustion gas 10 (that was determined at the block 148) may be displayed at a block 150.

Figure 1V:
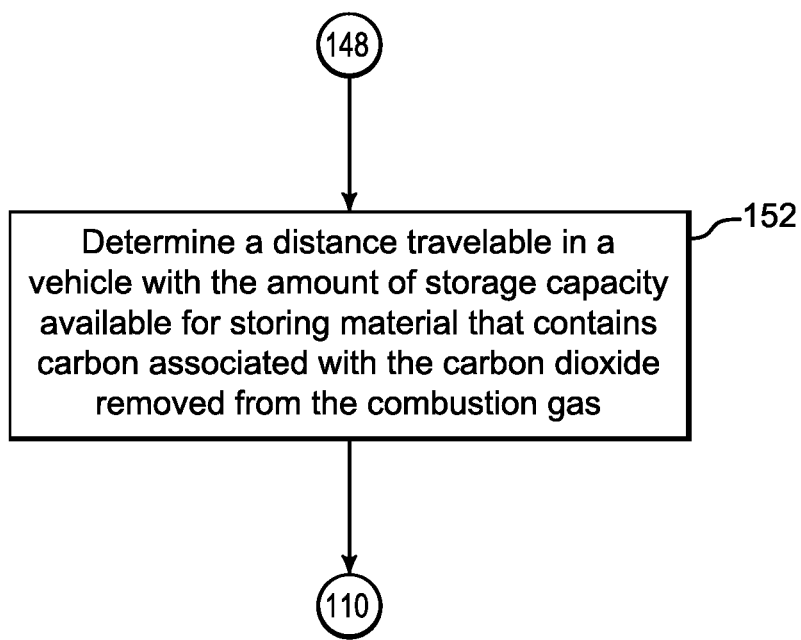
Figure 1W:
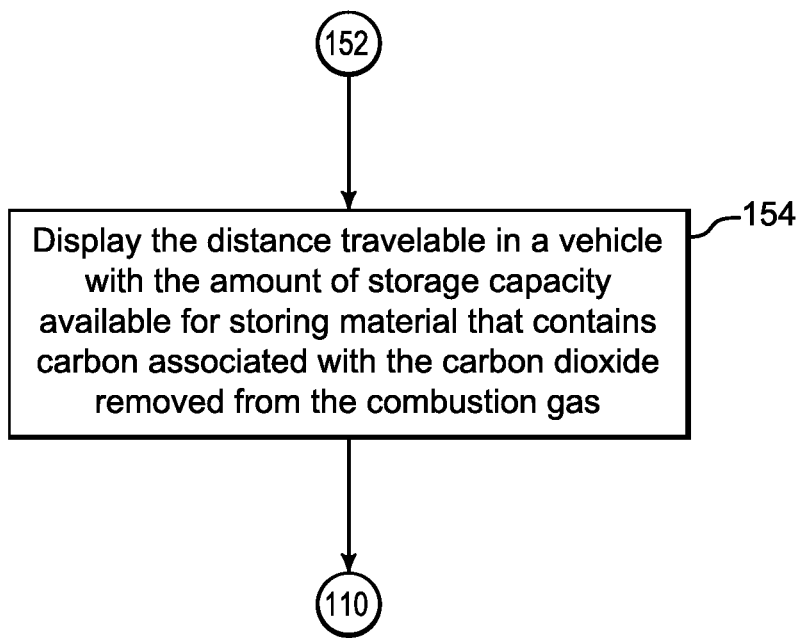

Referring additionally to FIG. 1V, in some embodiments a distance travelable in the vehicle 14 with the amount of storage capacity available for storing material that contains carbon associated with the carbon dioxide removed from the combustion gas 10 (that was determined at the block 142) may be determined at a block 152. For example, the amount of time remaining to fill the storage capacity available for storing carbon material that contains carbon associated with the carbon dioxide removed from the combustion gas 10 (that was determined at the block 148) may be multiplied by speed of the vehicle 14. Referring additionally to FIG. 1W, in some embodiments the distance travelable in the vehicle 14 with the amount of storage capacity available for storing material that contains carbon associated with the carbon dioxide removed from the combustion gas 10 (that was determined at the block 152) may be displayed at a block 154.

Figure 1X:
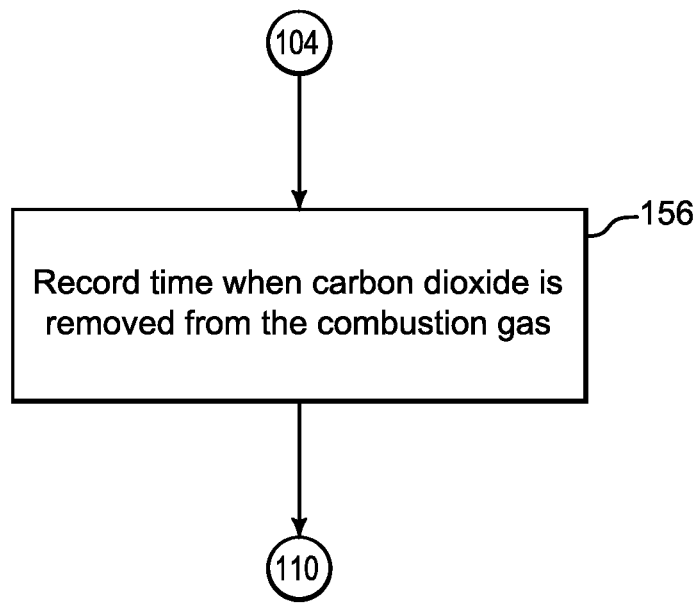
Figure 1Y:
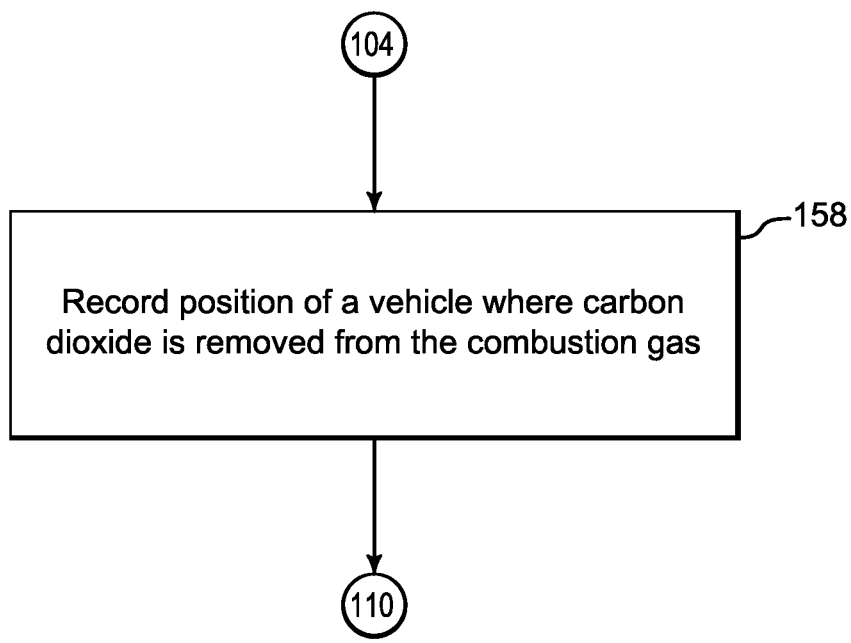

Referring now to FIGS. 1A, 1X, and 3, in some embodiments time when carbon dioxide is removed from the combustion gas 10 may be recorded at a block 156. Referring now to FIGS. 1A, 1Y, and 3, in some embodiments position of the vehicle 14 where carbon dioxide is removed from the combustion gas 10 may be recorded at a block 158. Given by way of non-limiting example, position information of the vehicle 14 may be provided by a global positioning system (GPS) unit or the like.

Figure 1Z:
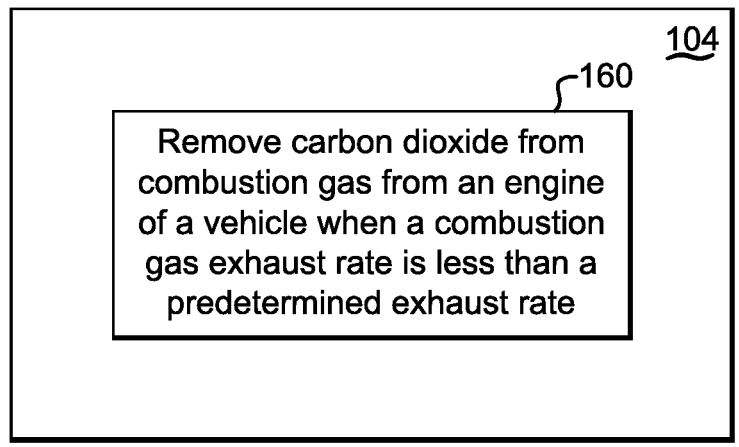
Figure 1A:
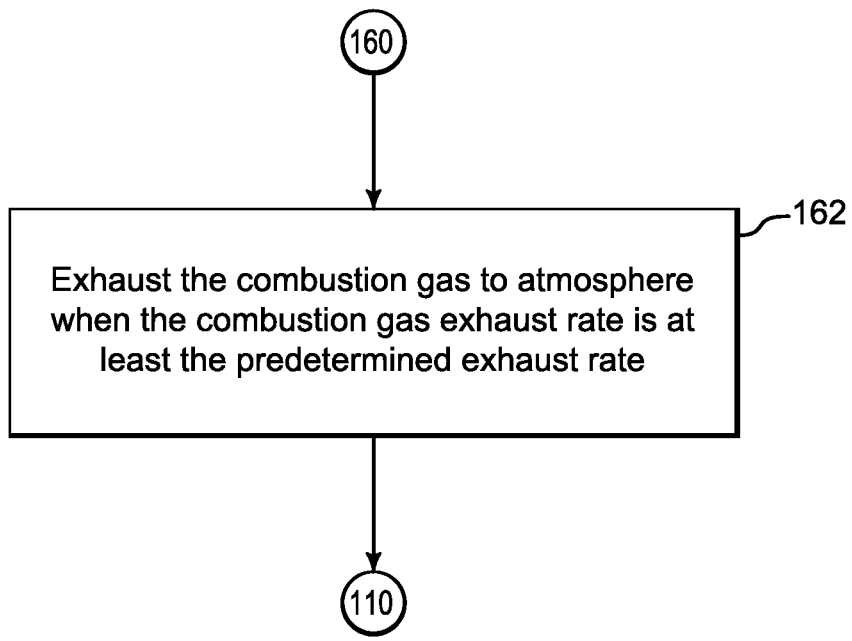
Figure 1A:
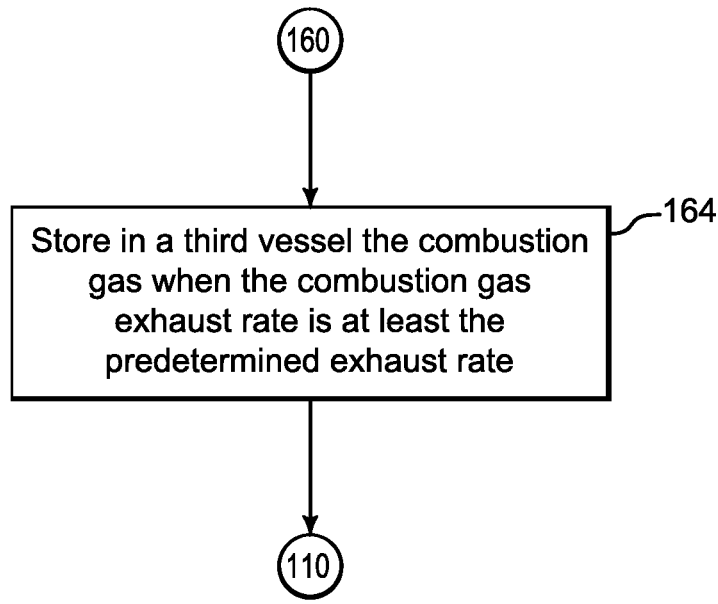
Figure 1A:
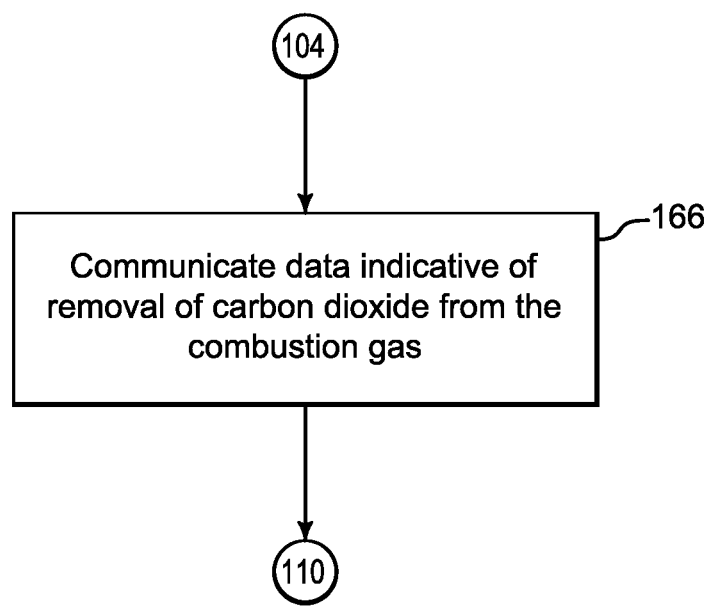
Figure 1A:
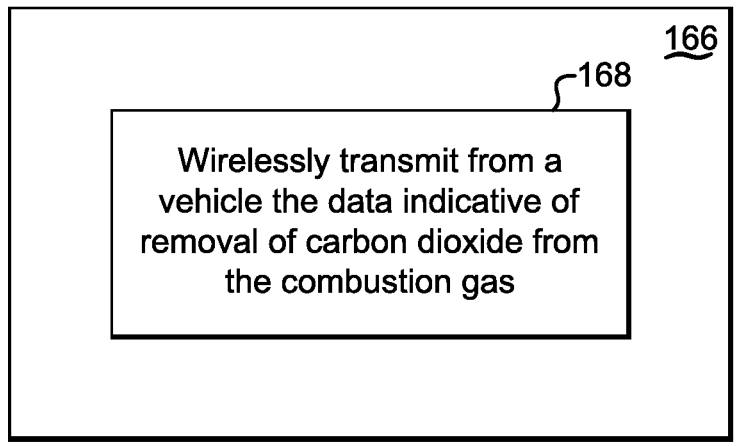
Figure 1A:
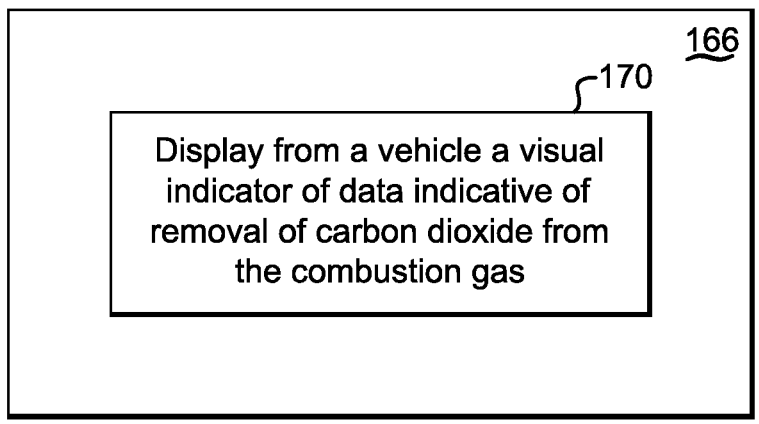
Figure 1A:
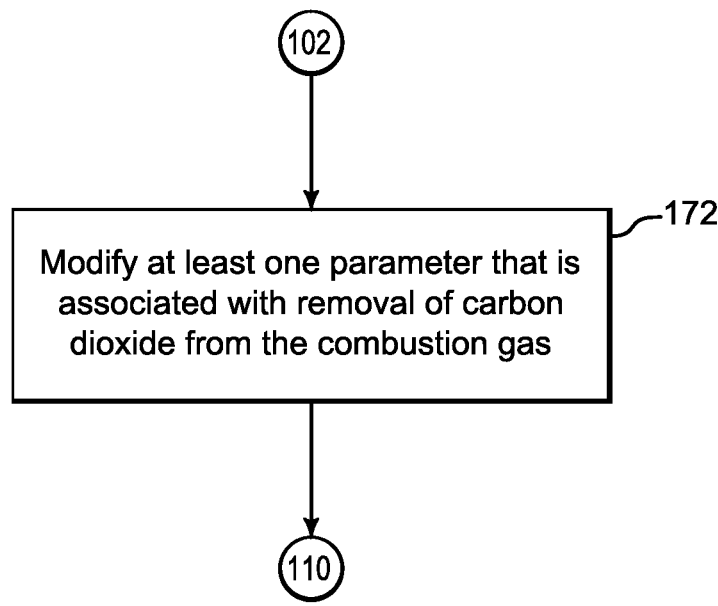
Figure 1A:
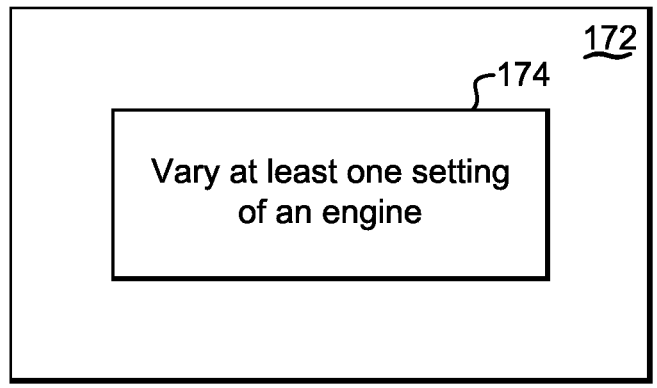
Figure 1A:
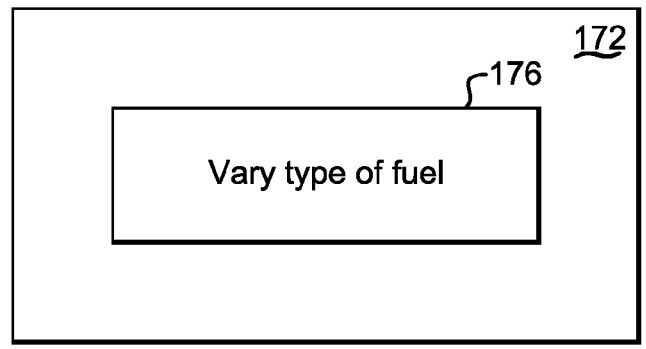
Figure 1A:
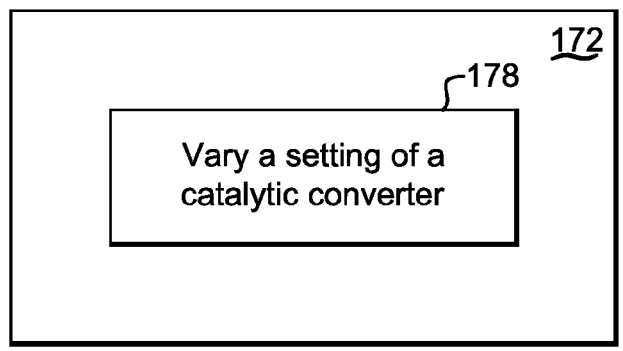
Figure 1A:
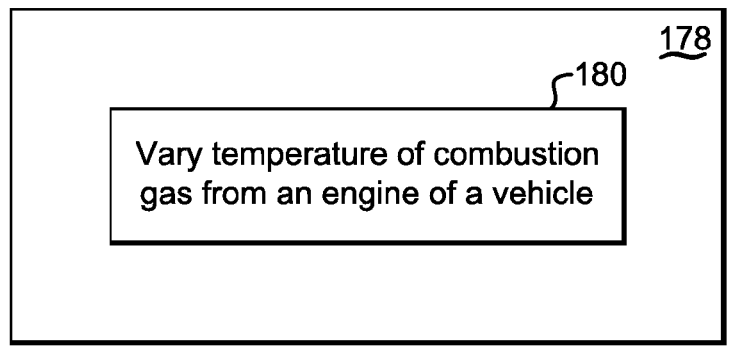
Figure 1A:
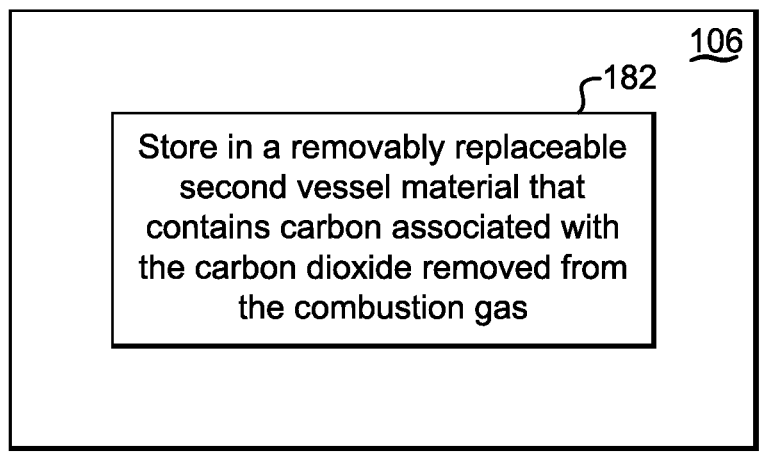

Referring now to FIGS. 1A, 1Z, and 3, in some embodiments removing carbon dioxide from combustion gas from an engine of a vehicle at the block 104 may include removing carbon dioxide from combustion gas from an engine of a vehicle when a combustion gas exhaust rate is less than a predetermined exhaust rate at a block 160. In some cases, the predetermined exhaust rate may approximately represent a maximum input rate of combustion gas that can be removed at the block 104, thereby helping to mitigate inefficiencies and/or buildup of back-pressure.

In some embodiments and referring additionally to FIG. 1AA, at a block 162 the combustion gas 10 may be exhausted to atmosphere when the combustion gas exhaust rate is at least the predetermined exhaust rate. In such cases, combustion gas in excess of that which may be removed at the block 104 is instead exhausted to atmosphere, which can help mitigate inefficiencies and/or buildup of back-pressure. In some other embodiments and referring additionally to FIG. 1AB, at a block 164 the combustion gas 10 may be stored in a third vessel when the combustion gas exhaust rate is at least the predetermined exhaust rate. In such cases, the combustion gas 10 that was stored in the third vessel at the block 164 may be available for processing at the block 104 (that is, removal of carbon dioxide) when conditions permit (such as when the engine 12 is shut down or when a combination of the combustion gas 10 from the engine 12 and the combustion gas 10 stored in the third vessel is within processing capabilities at the block 104).

Referring now to FIGS. 1A, 1AC, and 3, in some embodiments data indicative of removal of carbon dioxide from the combustion gas 10 may be communicated at a block 166. Given by way of non-limiting example and referring additionally to FIG. 1AD, in some embodiments communicating data indicative of removal of carbon dioxide from the combustion gas 10 at the block 166 may include wirelessly transmitting from a vehicle the data indicative of removal of carbon dioxide from the combustion gas 10. For example, the data indicative of removal of carbon dioxide from the combustion gas 10 may be wirelessly transmitted via radiofrequency communications. In some other embodiments and referring to FIGS. 1A, 1AC, 1AE, and 3, communicating data indicative of removal of carbon dioxide from the combustion gas 10 at the block 166 may include displaying from a vehicle a visual indicator of data indicative of removal of carbon dioxide from the combustion gas 10 at a block 170. It will be appreciated that any type of visual indicator may be used as desired.

It will also be appreciated that data may be further indicative of various illustrative aspects of removal of carbon dioxide from the combustion gas 10. Given by way of examples and not of limitation, the data indicative of removal of carbon dioxide from the combustion gas 10 may be further indicative further indicative of without limitation: identification of the vehicle 12; identification of a user; amount of carbon dioxide removed from the combustion gas 10; location at which carbon dioxide is removed from the combustion gas 10; time at which carbon dioxide is removed from the combustion gas 10; and/or form in which material that contains carbon associated with the carbon dioxide removed from the combustion gas 10 is stored.

Referring now to FIGS. 1A, 1AF, and 3, in some embodiments at least one parameter that is associated with removal of carbon dioxide from the combustion gas 10 may be modified at a block 172. Given by way of non-limiting example and referring additionally to FIG. 1AG, in some embodiments modifying at least one parameter that is associated with removal of carbon dioxide from the combustion gas 10 at the block 172 may include varying at least one setting of an engine at a block 174. For example, a setting of the engine 12 that may be varied at the block 174 may include richness of a fuel-air mixture.

In some other embodiments and referring now to FIGS. 1A, 1AF, 1AH, and 3, modifying at least one parameter that is associated with removal of carbon dioxide from the combustion gas 10 at the block 172 may include varying type of fuel at a block 176. Given by way of non-limiting examples, varying type of fuel may include without limitation: switching a hydrocarbon fuel between gasoline fuel and diesel fuel; switching fuel between a hydrocarbon fuel and electricity in a hybrid vehicle; varying octane rating of a hydrocarbon fuel; varying sulfur content of a diesel fuel; switching between a hydrocarbon fuel and electricity in a hybrid vehicle; and/or the like.

In some other embodiments and referring now to FIGS. 1A, 1AF, 1AI, and 3, modifying at least one parameter that is associated with removal of carbon dioxide from the combustion gas 10 at the block 172 may include varying a setting of a catalytic converter at a block 178. Referring additionally to FIG. 1AJ, in some embodiments varying a setting of a catalytic converter at the block 178 may include varying temperature of combustion gas from an engine of a vehicle at a block 180.

Figure 2A:
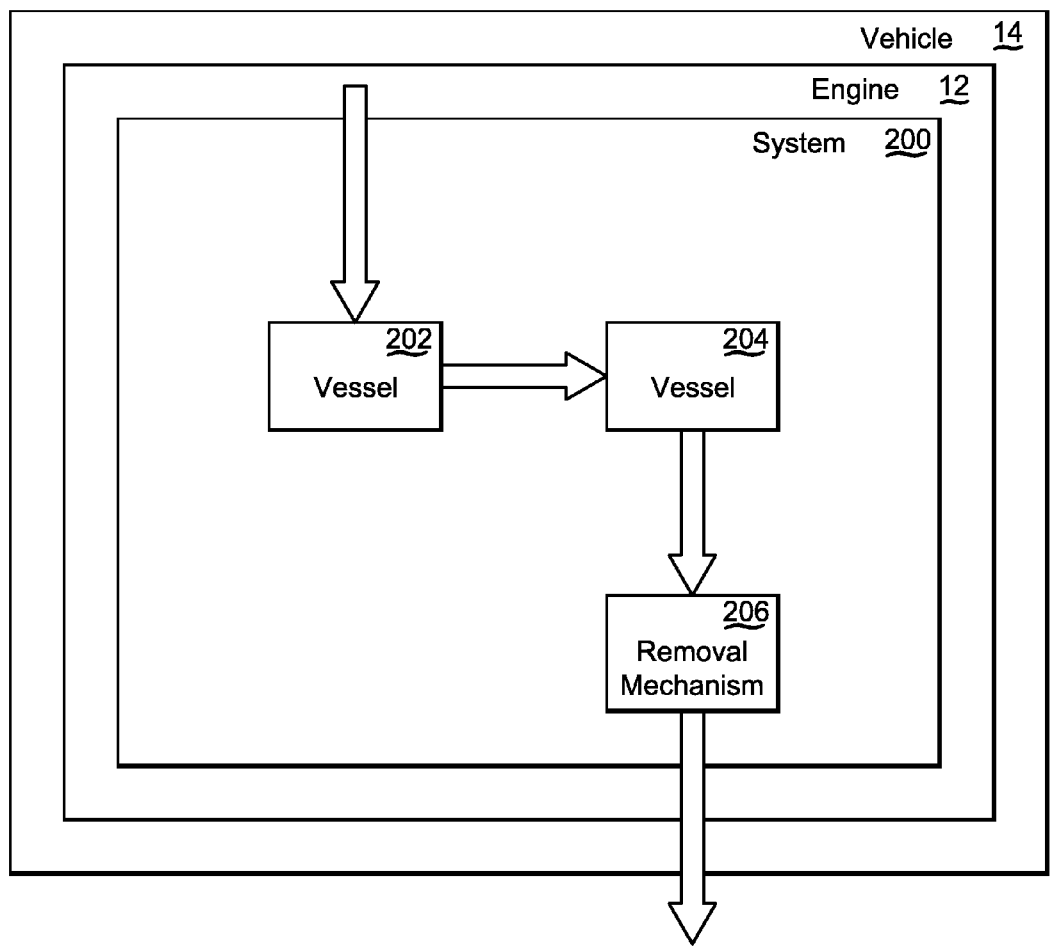
FIG. 2A is a block diagram of an illustrative system for removing carbon dioxide from combustion gas from an engine of a vehicle.

Referring now to FIGS. 2A and 3 and given by way of overview, an illustrative system 200 is provided for removing carbon dioxide from the combustion gas 10 from the engine 12 of the vehicle 10. A vessel 202 is configured to remove carbon dioxide from the combustion gas 10 from the engine 12 of the vehicle 14. A vessel 204 is configured to store material that contains carbon associated with carbon dioxide removed from the combustion gas 10. A removal mechanism 206 is configured to remove from the vehicle 14 the material that contains carbon associated with carbon dioxide removed from the combustion gas 10. Illustrative details set forth by way of example only and not of limitation will now be explained.

In some embodiments, the system 200 and its components may be configured to perform process blocks of the method 100 (FIG. 1A). For example, the vessel 202 may be configured to perform operations at the block 104 (FIG. 1A), the vessel 204 may be configured to perform operations at the block 106 (FIG. 1A), and the removal mechanism 206 may be configured to perform operations at the block 108 (FIG. 1A). Other components of the system 200 may be configured to perform other process blocks of the method 100. In such cases, process details that have already been discussed in the context of the method 100 will not be repeated.

The vehicle 14 and the engine 12 have been discussed above. For sake of brevity, their details need not be repeated for an understanding.

Still referring to FIGS. 2A and 3, in some embodiments the vessel 204 may be vessel configured to be disposed on the vehicle 14. In some embodiments the vessel 204 may be removable from the vehicle 14, and in some embodiments the vessel 204 may be removably replaceable on the vehicle 14. It will be appreciated that the vessel 204 may be any type of storage vessel as desired that is removably replaceable on the vehicle 14. Given by way of non-limiting examples, the vessel 204 may include without limitation a bottle, reservoir, tank, or the like. The vessel 204 may be sized as desired for a particular application. The vessel 204 may be made from any material as desired for a particular application.

Given by way of non-limiting example for illustration purposes only, in some embodiments the vessel 204 (that contains carbon associated with the carbon dioxide removed from the combustion gas 10) may be configured to be disposed off the vehicle 14. That is, in some cases the vessel 204 may be configured such that the vessel 204 may be removed from the vehicle 14 and brought to a collection or exchange facility that accepts containers (such as the vessel 204) that contain carbon associated with the carbon dioxide removed from the combustion gas 10. However, it will be appreciated that, in other applications, the vessel 204 need not be brought to such a collection or exchange facility.

In some embodiments (such as in some of the applications discussed above), the removal mechanism 206 may include the vessel 204. However, in some embodiments the removal mechanism 206 may include an outlet port.

Still referring to FIGS. 2A and 3, the vessel 202 may be any type of reaction vessel as desired for a particular application. The vessel 202 may be sized as desired for a particular application.

In some embodiments the vessel 204 may have a pressure that is less than the pressure of the vessel 202. In such cases, the pressure differential can help fill the vessel 204 and help mitigate back-flow from the vessel 204 to the vessel 202. As discussed above, in some embodiments (and depending upon the removal modality) a higher pressure may be entailed for removing carbon dioxide than is entailed for storing carbon dioxide.

Figure 2B:
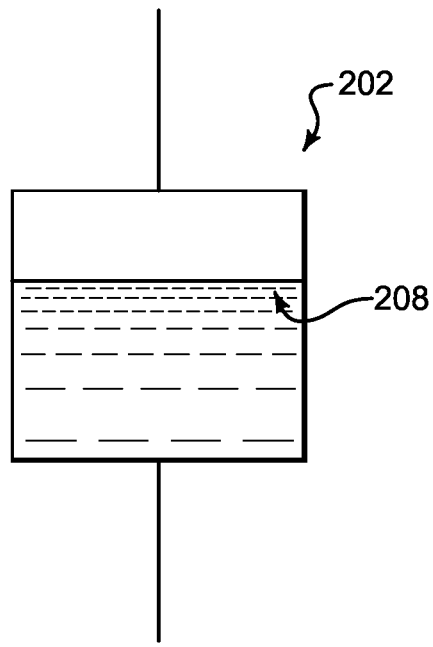
FIGS. 2B-2D are illustrations in partial schematic form of components of the system of FIG. 2A.
Figure 2C:
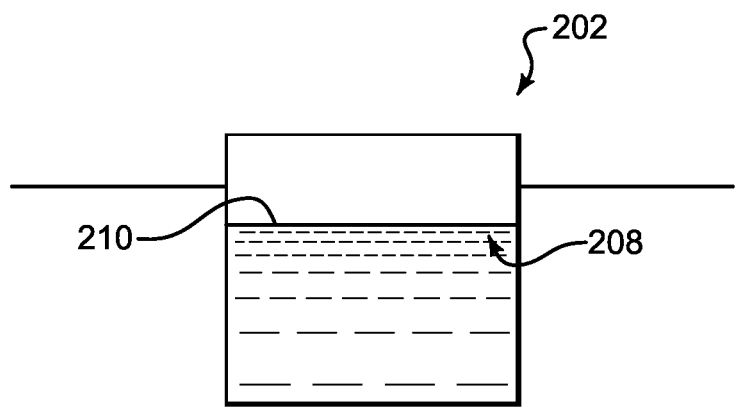

Referring additionally to FIGS. 2B and 2C, in various embodiments the vessel 202 may contain any type of liquid solution 208 as desired, such as a liquid solvent or the like. The liquid solution 208 has been discussed above (in the context of the method 100) and its details need not be repeated for an understanding.

As shown in FIG. 2B, in some embodiments the vessel 202 may be further configured to pass the combustion gas through the liquid solution 208. In some arrangements the combustion gas may be "bubbled up" through the liquid solution 208. In some other arrangements the combustion gas may be circulated through the liquid solution 208 via forced circulation. As shown in FIG. 2C, in some other embodiments the vessel 202 may be further configured to pass the combustion gas over a surface 210 of the liquid solution 208.

In some embodiments the vessel 202 may be configured to separate the removed carbon dioxide from the liquid solution 208. For example, temperature inside the vessel 202 may be raised sufficiently to drive the carbon dioxide out of the liquid solution 208, and the carbon dioxide can be transferred to the vessel 204 for storage. In some other embodiments, the vessel 202 may be further configured to recover the liquid solution. For example, the liquid solution 208 (from which the carbon dioxide has been separated) may be cooled in the vessel 202 from its previously-elevated temperature, whereupon the liquid solution 208 may once again be used for absorbing carbon dioxide.

Figure 2D:
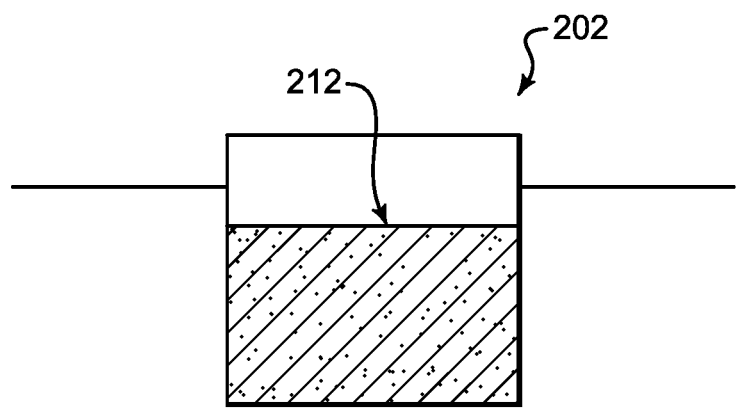

Referring now to FIGS. 2A, 2D, and 3, in some other embodiments the vessel 202 may be configured to adsorb the carbon dioxide with an adsorption material 212. The adsorption material 212 has been discussed above in the context of the method 100 and its details need not be repeated for an understanding.

Figure 2E:
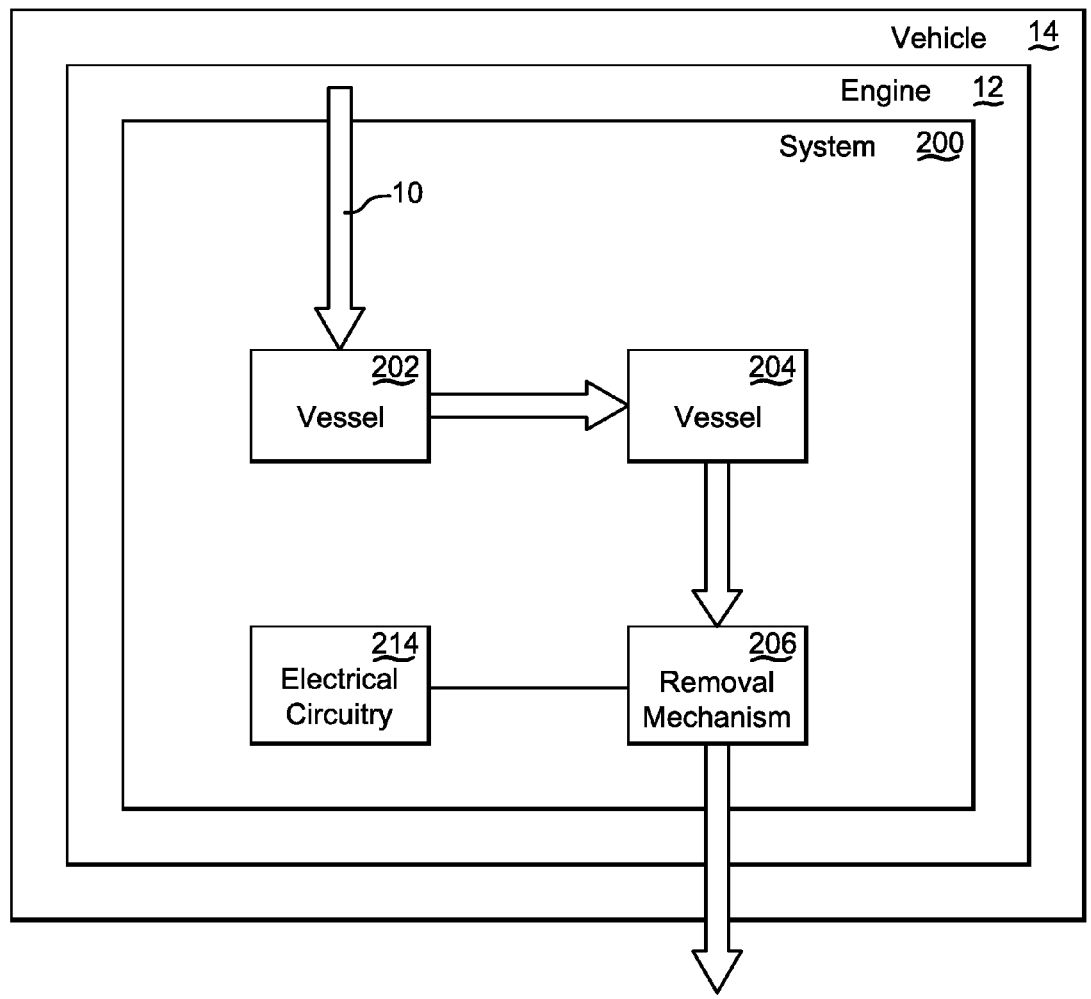
FIGS. 2E-2L are block diagrams of other illustrative systems for removing carbon dioxide from combustion gas from an engine of a vehicle.

Referring now to FIGS. 2E and 3, in some embodiments the system 200 may also include electrical circuitry 214 that is configured to determine at least one attribute regarding removal of carbon dioxide from the combustion gas 10.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2F:
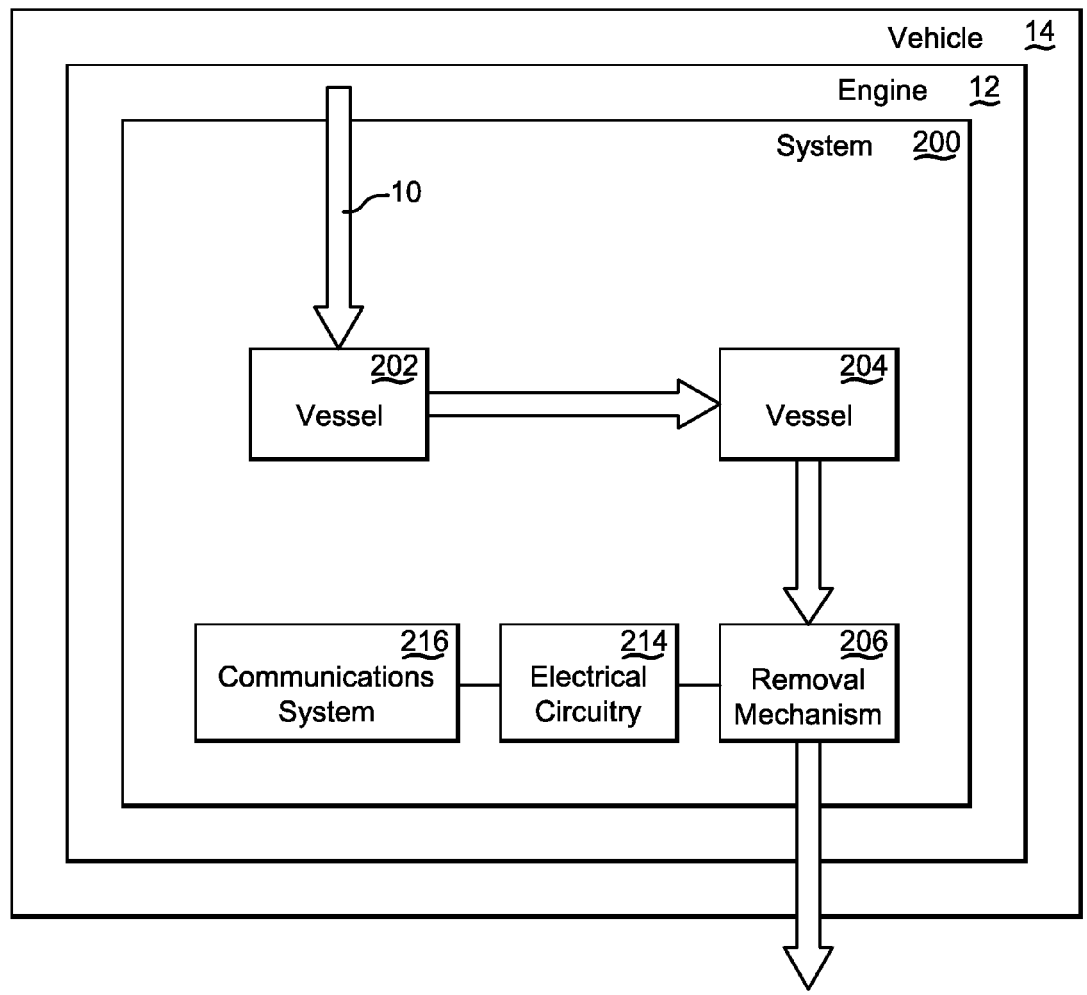

Referring additionally to FIG. 2F, in some embodiments the system 200 may also include a communications system 216 that is configured to communicate data indicative of the attribute. The communications system 216 may be any type of communications system as desired, such as a radiofrequency communications system, a visual communications system, an aural communications system, or the like. Nonlimiting examples of the at least one attribute will be discussed below.

The attribute may be any attribute as desired regarding removal of carbon dioxide from the combustion gas 10. Given by way of examples only and not of limitation, in various embodiments the at least one attribute may include without limitation any one or more of the following attributes: position of the vehicle 14 where the carbon dioxide is removed from the combustion gas 10; time when the carbon dioxide is removed from the combustion gas 10; governmental regulations regarding removing carbon dioxide from combustion gas from an engine of a vehicle; and/or an amount of pollution in air drawn into the engine 12 from which the carbon dioxide is removed from the combustion gas 10.

As discussed above, it will be appreciated that the material that contains carbon associated with the carbon dioxide removed from the combustion gas 10 may include various carbon-containing compounds, depending upon whether or not any additional processing is performed on the carbon dioxide removed from the combustion gas 10. For example, in some embodiments when no further processing is performed on the carbon dioxide removed from the combustion gas 10, the material that contains carbon associated with the carbon dioxide removed from the combustion gas 10 may include carbon dioxide itself removed from the combustion gas 10.

However, in some other embodiments, the vessel 202 and/or the vessel 204 may be further configured to process the material that contains carbon associated with carbon dioxide removed from the combustion gas 10. For example, in some embodiments the vessel 202 and/or the vessel 204 may be further configured to react the material that contains carbon associated with carbon dioxide removed from the combustion gas 10 with a chemical reactant, as discussed above. Given by way of non-limiting examples, in some embodiments, the vessel 202 and/or the vessel 204 may be further configured to transform the removed carbon dioxide into at least one compound chosen from a hydrocarbon, a carbonate, a bicarbonate, and carbonic acid, as discussed above.

In various embodiments the system 200 may include any one or more additional components that are configured to perform processes related to the material that contains carbon associated with carbon dioxide removed from the combustion gas 10 and/or removal of carbon dioxide from the combustion gas 10. For example, in embodiments in which the material that contains carbon associated with carbon dioxide removed from the combustion gas 10 is reacted with a chemical reactant, if desired the vessel 202 and/or the vessel 204 may be partitioned to store the chemical reactant. In some other embodiments in which the material that contains carbon associated with carbon dioxide removed from the combustion gas 10 is reacted with a chemical reactant, if desired the system 200 may include a separate vessel (not shown) in which the chemical reactant is stored.

In that regard, some embodiments of the system 200 may be considered an electro-mechanical system. Several examples will be given below by way of illustration and not of limitation. In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Figure 2G:
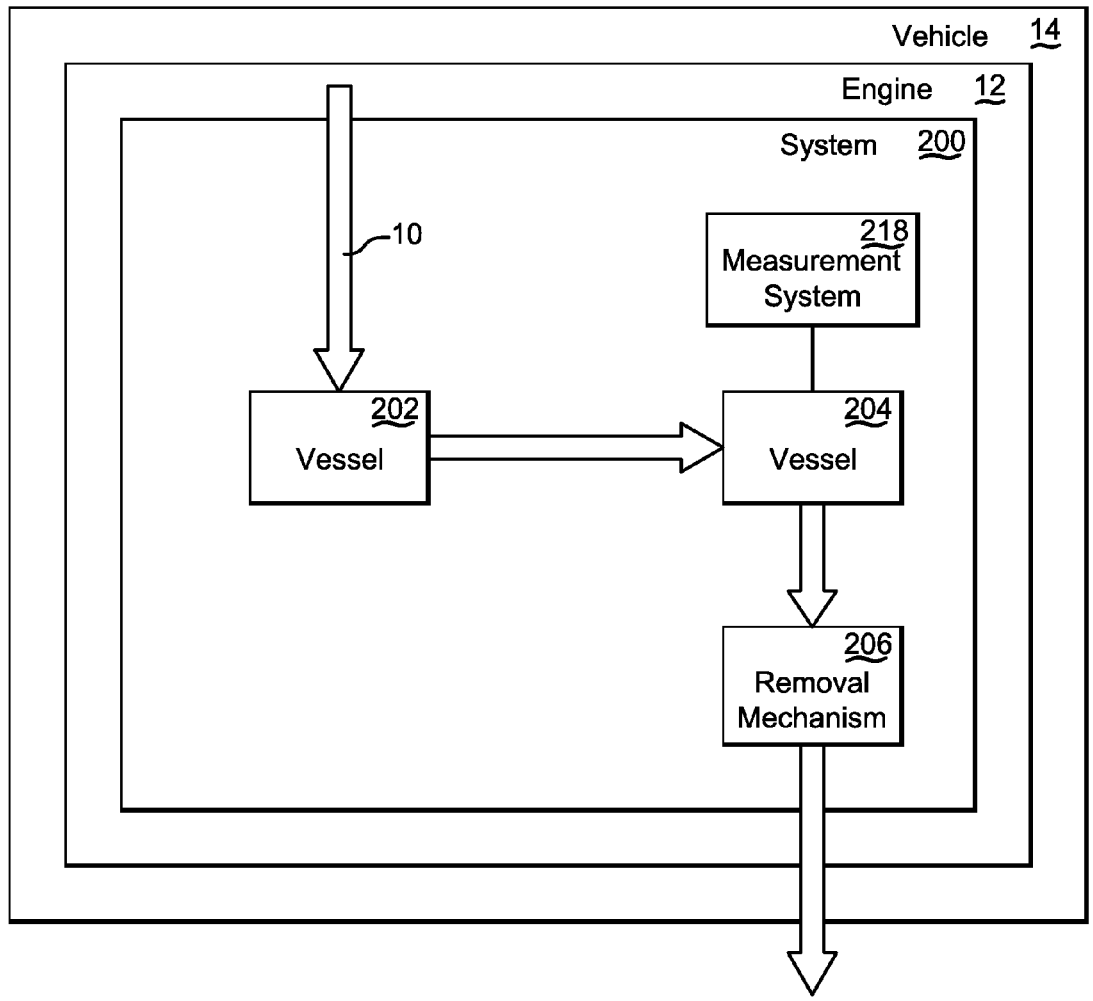

For example and referring to FIGS. 2G and 3, in some embodiments the system 200 may also include a measurement system 218 that is configured to measure an amount of stored material that contains carbon associated with carbon dioxide removed from the combustion gas 10. The measurement system 218 may include any suitable sensor as desired for sensing stored material that contains carbon associated with carbon dioxide removed from the combustion gas 10. The measurement system 218 may also include electrical circuitry as desired to determine the amount of stored material that contains carbon associated with carbon dioxide removed from the combustion gas 10.

Figure 2H:
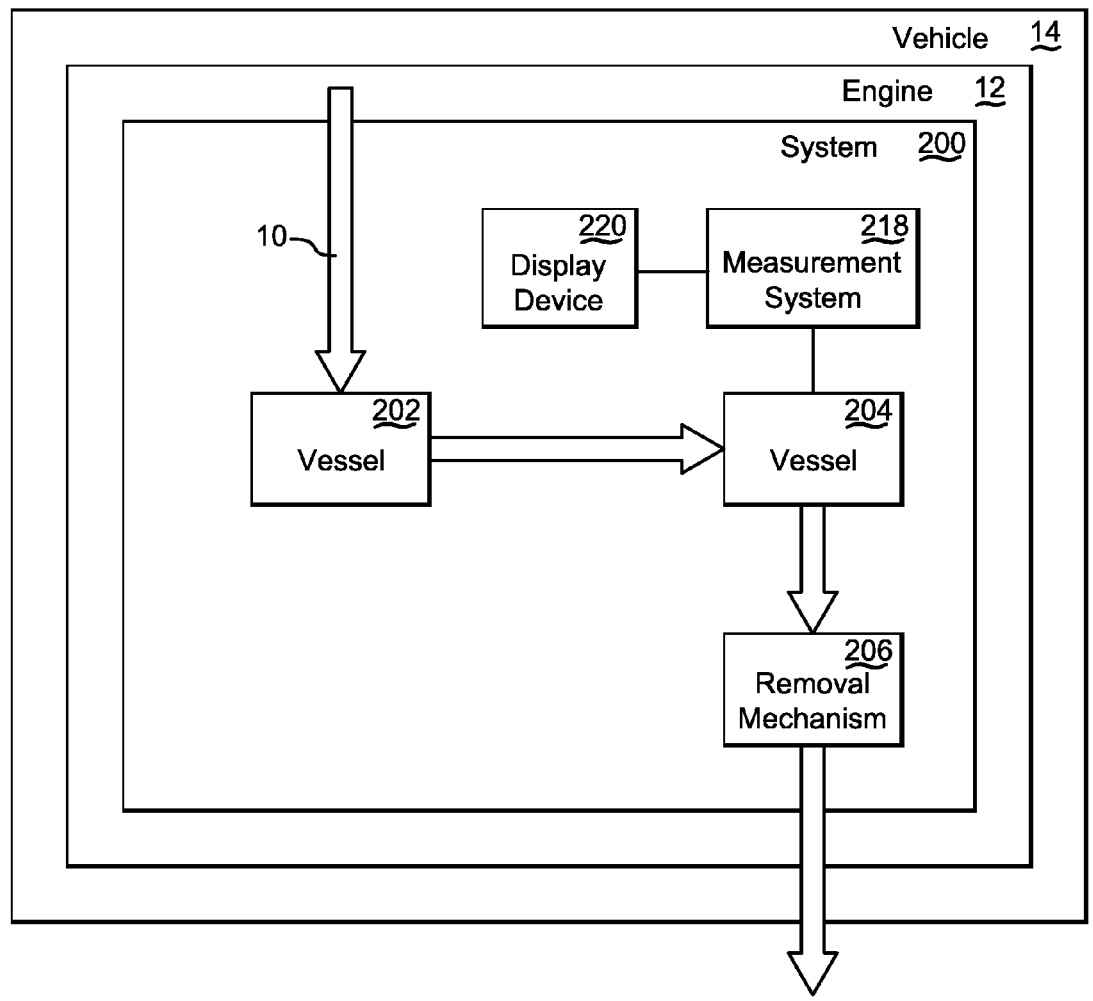

Referring additionally to FIG. 2H, in some embodiments the system 200 may also include a display device 220 that is configured to display the amount of stored material that contains carbon associated with carbon dioxide removed from the combustion gas 10. It will be appreciated that the display device 220 may be any type of display device as desired.

In various embodiments, the measurement system 218 and the display device may be further configured to measure and display, respectively, other parameters as desired. For example, in some other embodiments the measurement system 218 may be further configured to determine an amount of storage capacity available for storing material that contains carbon associated with carbon dioxide removed from the combustion gas 10. That is, in such applications the measurement system 218 can determine the amount of storage capacity available in the vessel 204. In some cases the display device 220 may be configured to display the amount of storage capacity available for storing material that contains carbon associated with carbon dioxide removed from the combustion gas 10.

In some other embodiments the measurement system 218 may be further configured to determine a rate of storing material that contains carbon associated with carbon dioxide removed from the combustion gas 10. That is, electrical circuitry in the measurement system 218 can divide the amount of stored material that contains carbon associated with the carbon dioxide removed from the combustion gas 10 by time that elapsed during storage of the material that contains carbon associated with the carbon dioxide removed from the combustion gas 10.

In some other embodiments the measurement system 218 may be further configured to determine an amount of time remaining to fill the storage capacity available for storing material that contains carbon associated with carbon dioxide removed from the combustion gas 10. For example, the amount of storage capacity available for storing material that contains carbon associated with the carbon dioxide removed from the combustion gas 10 may be divided by the rate of storing material that contains carbon associated with the carbon dioxide removed from the combustion gas 10. In some embodiments the display device 220 may be configured to display the amount of time remaining to fill the storage capacity available for storing material that contains carbon associated with carbon dioxide removed from the combustion gas 10.

In some embodiments the measurement system 218 may be further configured to determine a distance travelable in the vehicle 14 with the amount of storage capacity available for storing material that contains carbon associated with carbon dioxide removed from the combustion gas 10. For example, the amount of time remaining to fill the storage capacity available for storing carbon material that contains carbon associated with the carbon dioxide removed from the combustion gas 10 may be multiplied by speed of the vehicle 14. In some embodiments the display device 220 may be configured to display the distance travelable in the vehicle 14 with the amount of storage capacity available for storing material that contains carbon associated with carbon dioxide removed from the combustion gas 10.

Figure 2I:
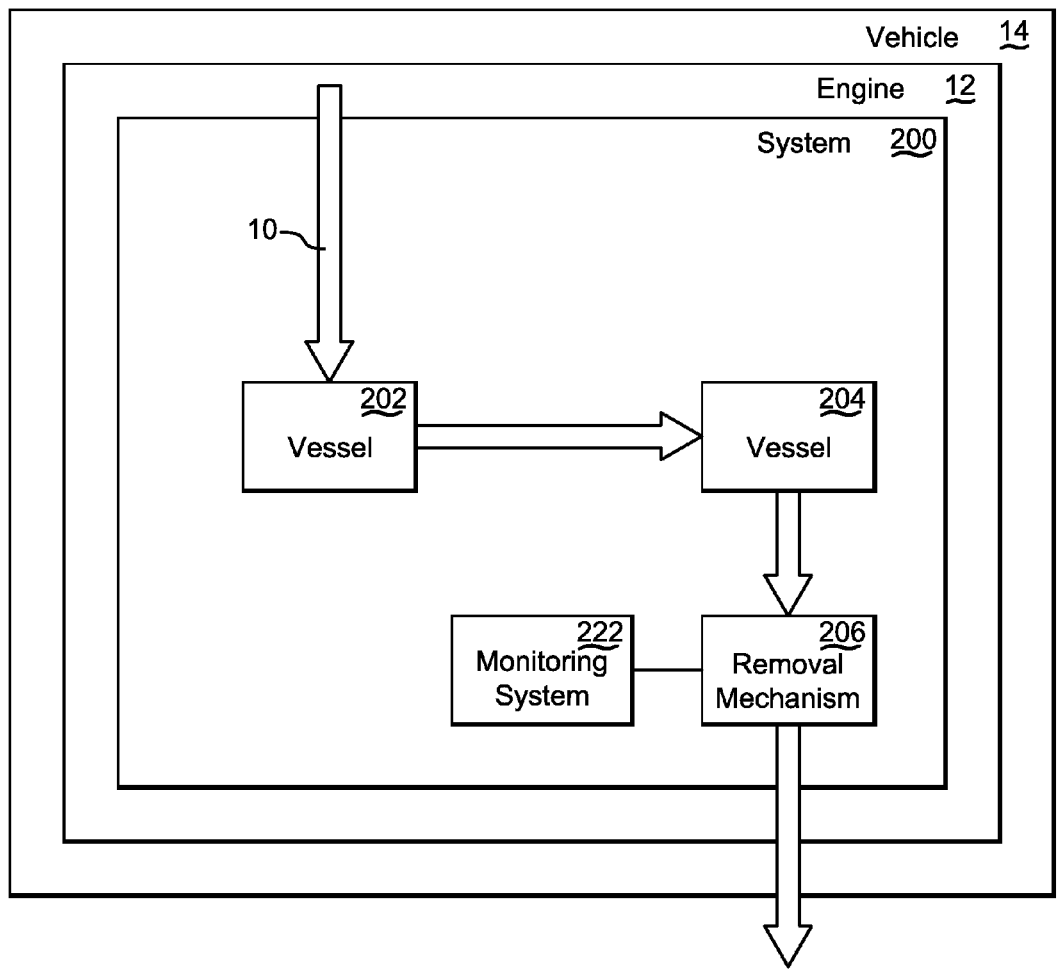

Referring now to FIGS. 2I and 3, in some embodiments the system 200 may include a monitoring system 222 that is configured to record time when carbon dioxide is removed from the combustion gas 10. In such cases, the monitoring system may include any electrical circuitry suitable for creating an electronic time stamp or an electronic date-time stamp, as desired.

In some other embodiments, the monitoring system 222 may be configured to record position of the vehicle 14 where carbon dioxide is removed from the combustion gas 10. In such cases, the monitoring system 222 may include any without limitation a global positioning system (GPS) or any electrical circuitry as desired for determining position of the vehicle 14, such as LORAN, or an inertial navigation system (INS), or any electrical circuitry configured to perform dead reckoning from an initial fix of position, or the like.

Referring back to FIGS. 2A and 3, in various embodiments the vessel 202 may be further configured to remove carbon dioxide from the combustion gas 10 when a combustion gas exhaust rate is less than a predetermined exhaust rate. In some cases, the predetermined exhaust rate may approximately represent a maximum input rate of combustion gas that can be removed by the vessel 202, thereby helping to mitigate inefficiencies and/or buildup of back-pressure in the vessel 202 or the engine 12.

Figure 2J:
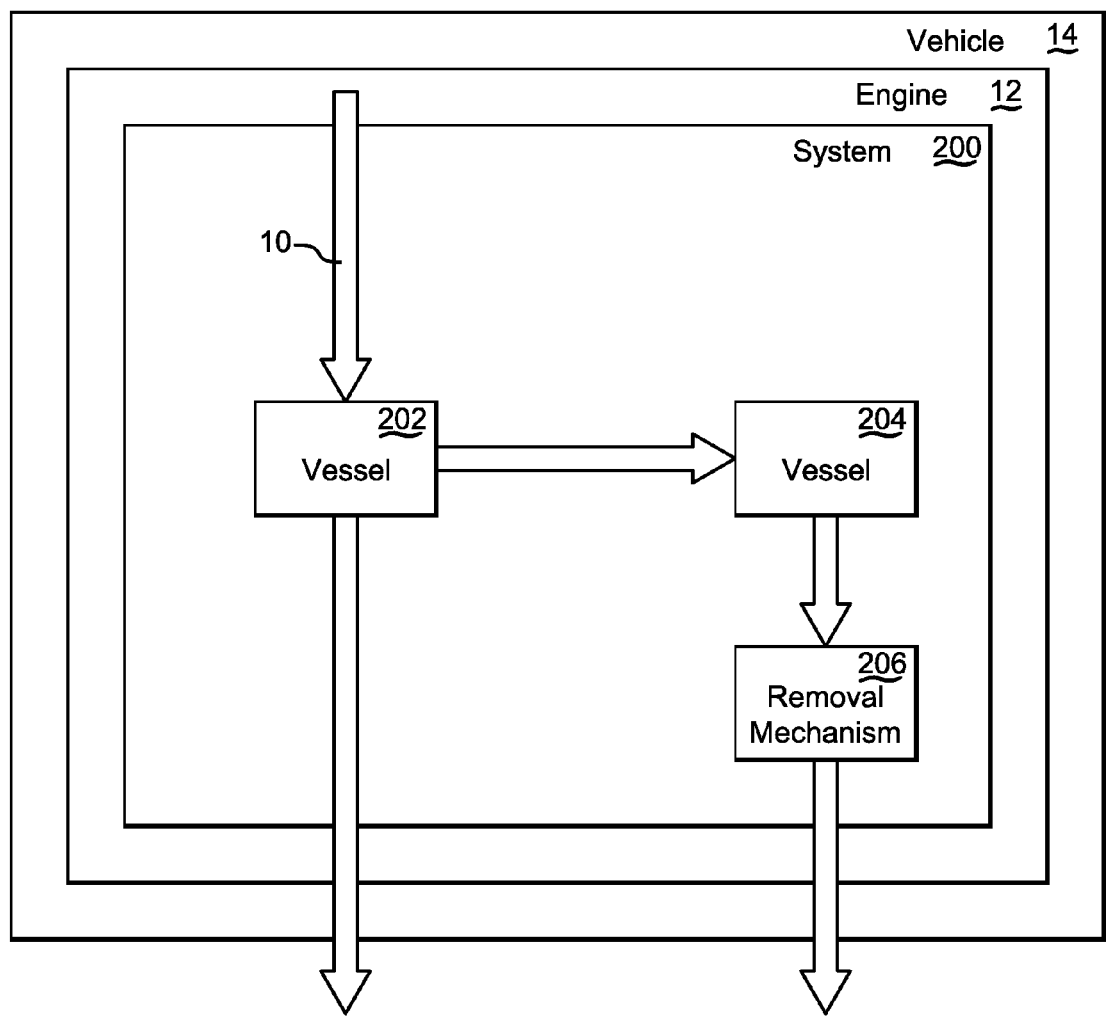

In some embodiments and referring now to FIGS. 2J and 3, the vessel 202 may be further configured to exhaust the combustion gas 10 to atmosphere when the combustion gas exhaust rate is at least the predetermined exhaust rate. For example, the vessel 202 may include a pressure relief device, such as a pressure relief valve, with a pressure set point above pressures associated with combustion gas exhaust rates below the predetermined exhaust rate. When the combustion gas exhaust rate exceeds the predetermined exhaust rate (and, thus, the maximum input rate of combustion gas that can be removed by the vessel 202), pressure within the vessel 202 can build up toward the pressure set point of the pressure relief device. When the pressure reaches the pressure set point, the pressure relief device can be activated, thereby porting combustion gas 10 to atmosphere.

Figure 2K:
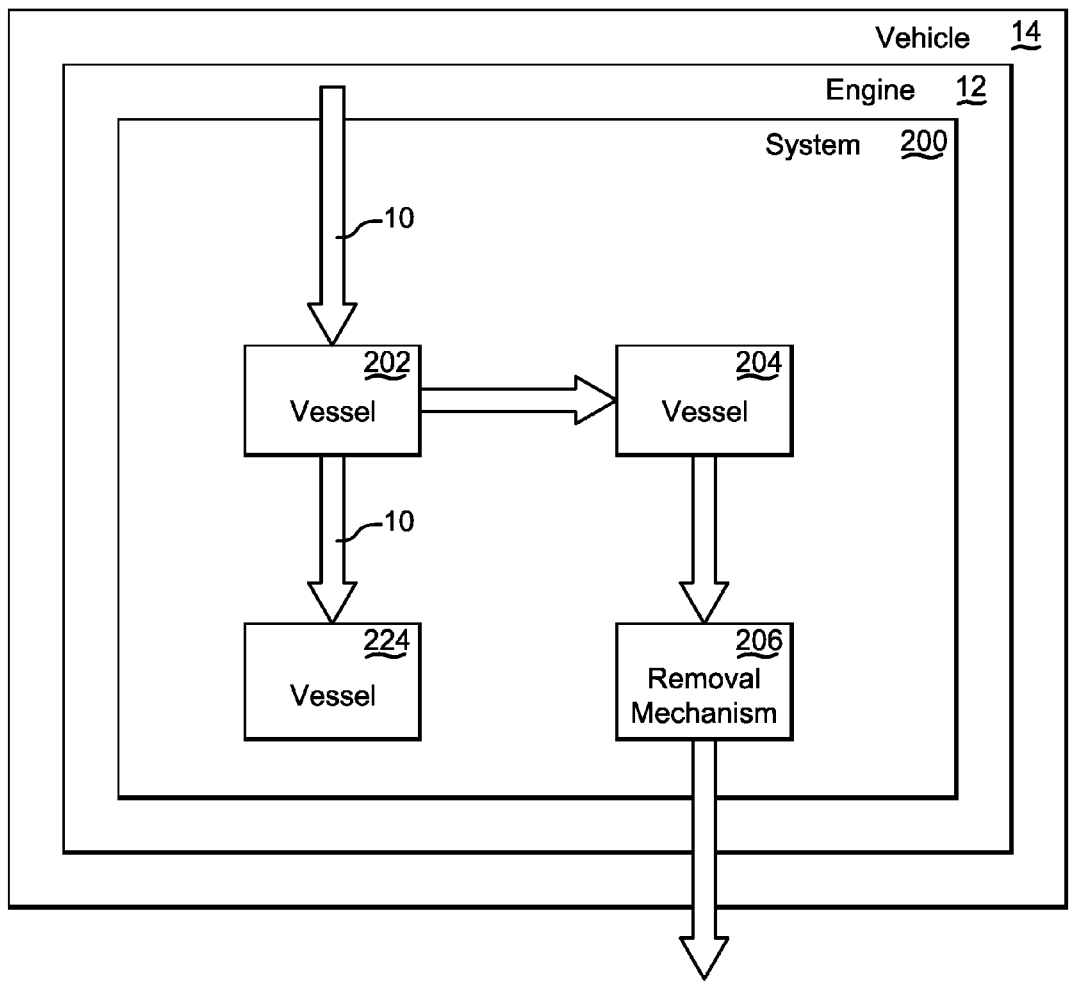

In some other embodiments and referring now to FIGS. 2K and 3, the system 200 may further include a vessel 224 that is configured to store the combustion gas 10 when the combustion gas exhaust rate is at least the predetermined exhaust rate. For example, the combustion gas 10 may be ported to the vessel 224 (instead of to atmosphere) when a pressure relief device as described above is activated. In such a case, the combustion gas stored in the vessel 224 may be sent to the vessel 202 for removal of carbon dioxide at other times as desired, such as when the vessel 202 can accommodate input of additional combustion gas from the vessel 224.

Figure 2L:
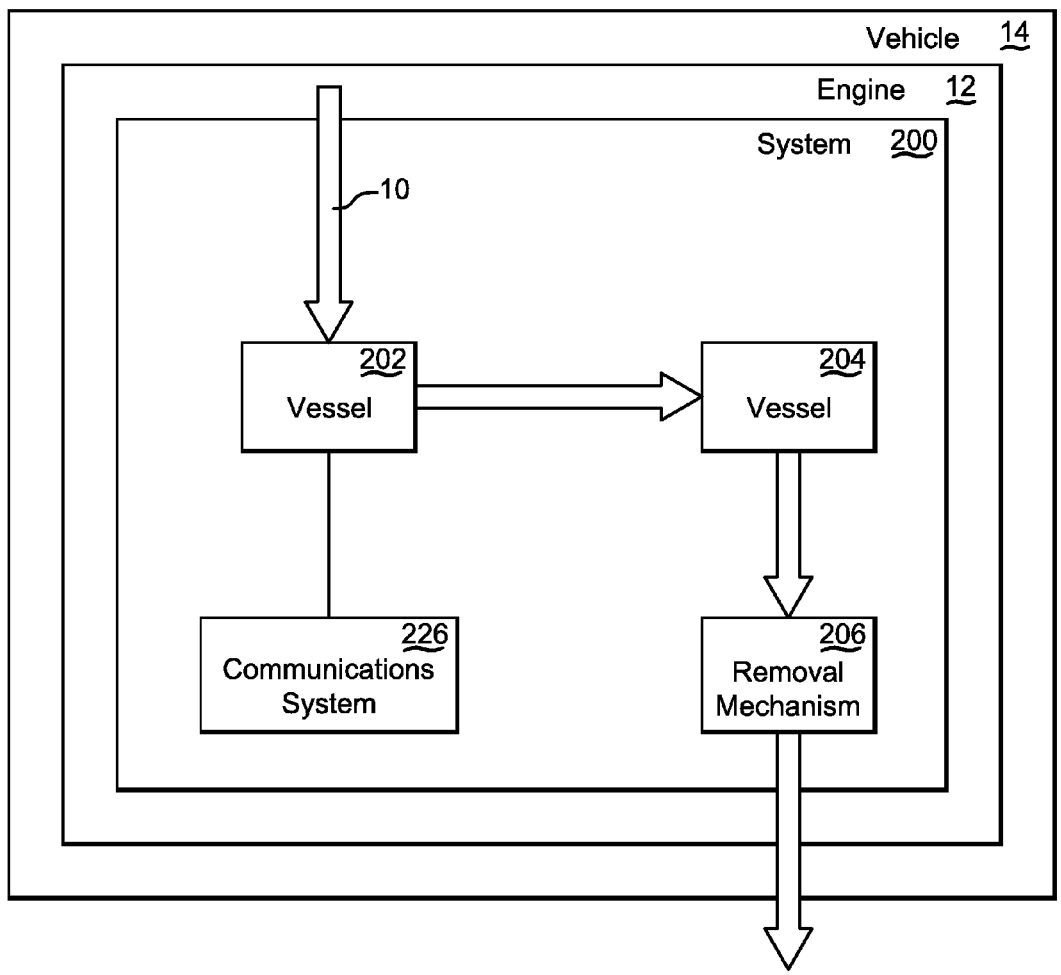

Referring now to FIGS. 2L and 3, in some embodiments the system 200 may include a communications system 226 that is configured to communicate data indicative of removal of carbon dioxide from the combustion gas 10. The communications system 226 may be any type of communications system as desired, such as a radiofrequency communications system, a visual communications system, an aural communications system, or the like. To that end, in some embodiments the communications system 226 may be further configured to wirelessly transmit from the vehicle 14 the data indicative of removal of carbon dioxide from the combustion gas 10. In some other embodiments the communications system 226 may be further configured to display from the vehicle 14 a visual indicator of data indicative of removal of carbon dioxide from the combustion gas 10.

The data indicative of removal of carbon dioxide from the combustion gas 10 may include any data as desired. Given by way of nonlimiting examples, the data indicative of removal of carbon dioxide from the combustion gas 10 may be further indicative of any one or more of the following: identification of the vehicle 14; identification of a user; amount of carbon dioxide removed from the combustion gas 10; location at which carbon dioxide is removed from the combustion gas 10; time at which carbon dioxide is removed from the combustion gas 10; and/or form in which material that contains carbon associated with the carbon dioxide removed from the combustion gas 10 is stored.

Referring back to FIGS. 2A and 3 and as discussed above, at least one parameter that is associated with removal of carbon dioxide from the combustion gas 10 may be modifiable. Given by way of nonlimiting examples, the modifiable parameter may include any one or more of the following: at least one modifiable setting of an engine, such as richness of a fuel-air mixture; type of fuel; and/or a modifiable setting of a catalytic converter, such as temperature of the combustion gas 10.

Referring now to FIG. 3, the vehicle 14 includes a vehicle frame 16. The engine 12 is disposed on the vehicle frame 16. The engine 12 and types of vehicles that may be embodied as the vehicle 14 have been discussed above and need not be repeated.

The vehicle 14 also includes the system 200 for removing carbon dioxide from the combustion 10 gas from the engine 12. As discussed above, the system 200 includes the vessel 202 that is configured to remove carbon dioxide from the combustion gas 10, the vessel 204 that is configured to store material that contains carbon associated with carbon dioxide removed from the combustion gas 10, and the removal mechanism 206 that is configured to remove from the vehicle 14 the material that contains carbon associated with carbon dioxide removed from the combustion gas 10.

The system 200 has been described above with reference to FIGS. 2A-2L. The above-description is hereby incorporated into this discussion of the vehicle 14. The discussion of the system 200 need not be repeated for an understanding and, in the interest of brevity, the discussion of the system 200 is not repeated.

It will be appreciated that the vehicle 14 is shown in FIG. 3 as an automobile for purposes of illustration only. No limitation of any sort whatsoever is intended regarding form of the vehicle 14 and is not to be inferred. To that end, the vehicle 14 may include any type of vehicle whatsoever—for travel associated with sea, air, or land—that includes the engine 12 from which it may be desired to remove carbon dioxide from the combustion gas 10.

Various additional methods related to aspects of removal of carbon dioxide from combustion gas from an engine of a vehicle are disclosed. These illustrative methods will be discussed below.

Figure 4A:
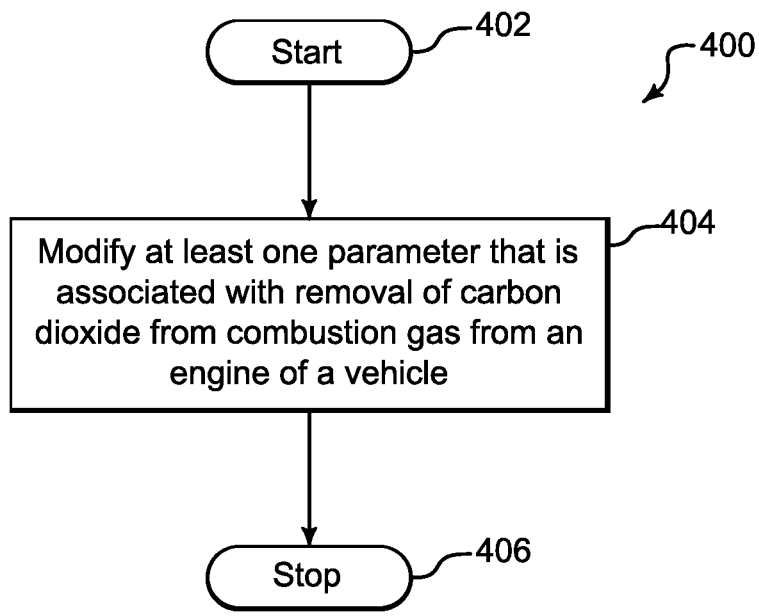
FIG. 4A is a flowchart of an illustrative method.

For example and referring now to FIG. 4A, a method 400 starts at a block 402. At a block 404 at least one parameter that is associated with removal of carbon dioxide from combustion gas from an engine of a vehicle is modified. The method 400 stops at a block 406.

Figure 4B:
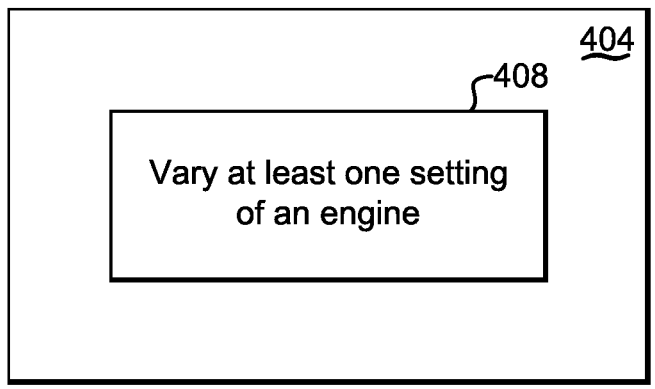
FIGS. 4B-4E are flowcharts of details of the method of FIG. 4A.

Referring to FIG. 4B, in some embodiments modifying at least one parameter that is associated with removal of carbon dioxide from combustion gas from an engine of a vehicle at the block 404 may include varying at least one setting of an engine at a block 408. Given by way of nonlimiting example, the setting of an engine may include richness of a fuel-air mixture.

Figure 4C:
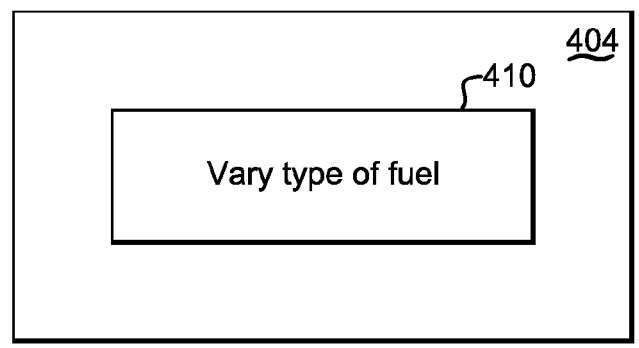

Referring to FIG. 4C, in some embodiments modifying at least one parameter that is associated with removal of carbon dioxide from combustion gas from an engine of a vehicle at the block 404 may include varying type of fuel at a block 410.

Figure 4D:
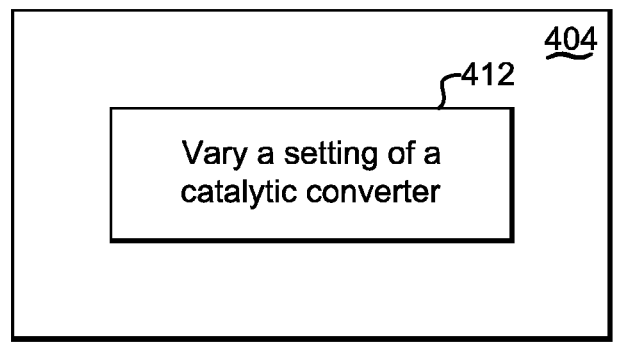
Figure 4E:
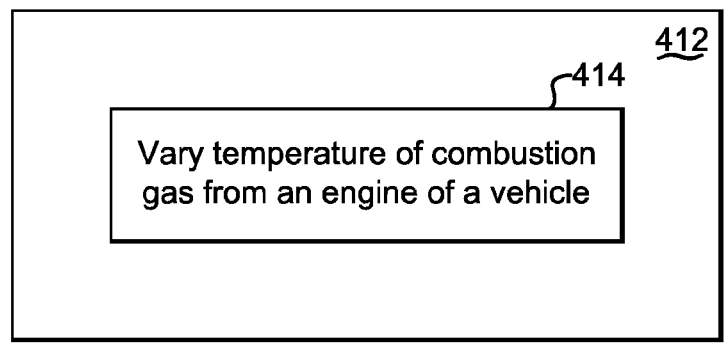

Referring to FIG. 4D, in some embodiments modifying at least one parameter that is associated with removal of carbon dioxide from combustion gas from an engine of a vehicle at the block 404 may include varying a setting of a catalytic converter at a block 412. Given by way of nonlimiting example, varying a setting of a catalytic converter at the block 412 may include varying temperature of combustion gas from an engine of a vehicle at a block 414.

Figure 5A:
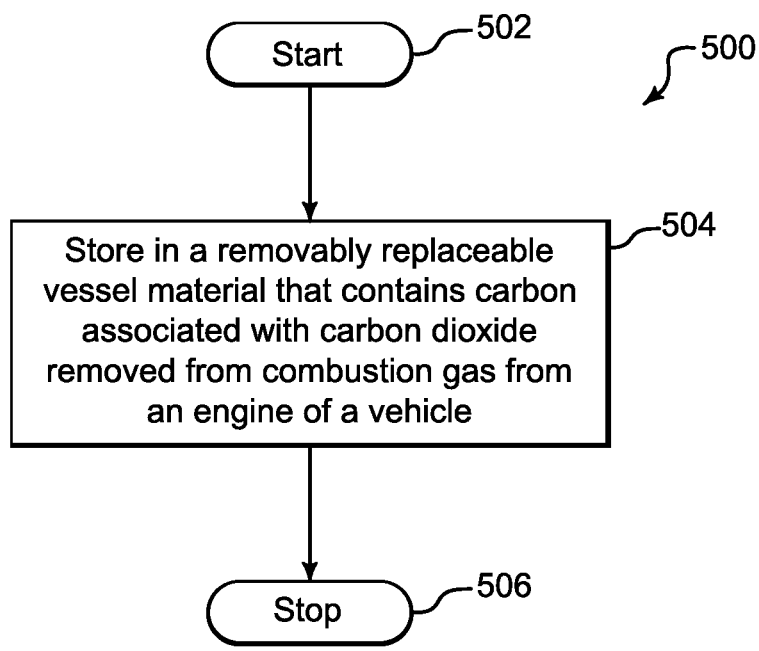
FIG. 5A is a flowchart of another illustrative method.

As another example and referring now to FIG. 5A, a method 500 starts at a block 502. At a block 504, material that contains carbon associated with carbon dioxide removed from combustion gas from an engine of a vehicle is stored in a removably replaceable vessel. In some embodiments, the material that contains carbon associated with carbon dioxide removed from combustion gas from an engine of a vehicle may stored in the removably replaceable vessel while the removably replaceable vessel is installed in or on the vehicle. However, the removably replaceable vessel need not be installed in or on the vehicle for the material that contains carbon associated with carbon dioxide removed from combustion gas from the engine of the vehicle to be stored in the removably replaceable vessel. In some embodiments, the vehicle may be stationary and the material that contains carbon associated with carbon dioxide removed from combustion gas from the engine of the vehicle may be stored in a removably replaceable vessel that is not installed in or on the vehicle. In such embodiments, the material that contains carbon associated with carbon dioxide removed from combustion gas from the engine of the vehicle may be offloaded from the vehicle to the removably replaceable vessel via an outlet port and suitable piping. The method 500 stops at a block 506.

As discussed above, the material that contains carbon associated with the carbon dioxide removed from the combustion gas may include various carbon-containing compounds, depending upon whether or not any additional processing is performed on the carbon dioxide removed from the combustion gas. For example, in some embodiments when no further processing is performed on the carbon dioxide removed from the combustion gas, the material that contains carbon associated with the carbon dioxide removed from the combustion gas may include carbon dioxide itself removed from the combustion gas.

Figure 5B:
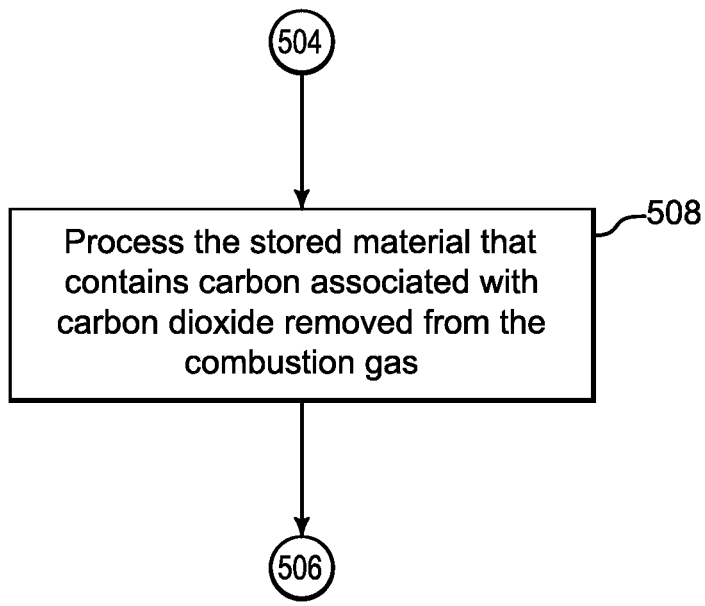
FIGS. 5B-5Q are flowcharts of details of the method of FIG. 5A.
Figure 5C:
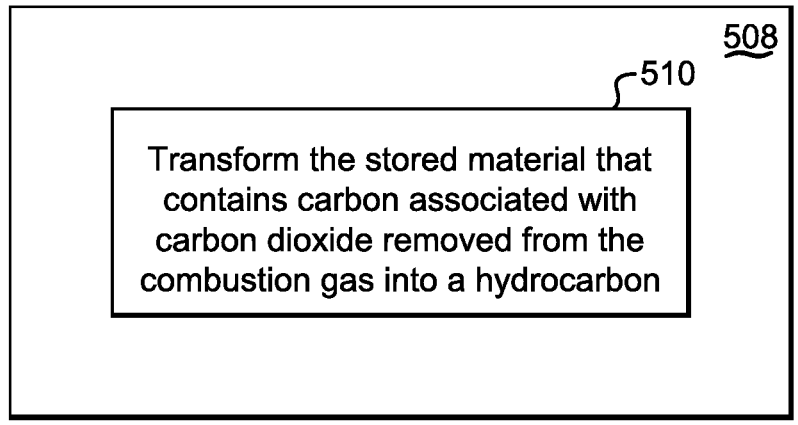

In some other embodiments and referring additionally to FIG. 5B, if desired at a block 508 the stored material that contains carbon associated with the carbon dioxide removed from the combustion gas may be processed. For example, in some embodiments processing the stored material that contains carbon associated with carbon dioxide removed from the combustion gas 10 at the block 508 may include reacting the stored material that contains carbon associated with carbon dioxide removed from the combustion gas 10 with a chemical reactant, as discussed above. For example and without limitation, in some embodiments and referring additionally to FIG. 5C, processing the stored material that contains carbon associated with the carbon dioxide removed from the combustion gas at the block 508 may include transforming the stored material that contains carbon associated with the carbon dioxide removed from the combustion gas into a hydrocarbon at a block 510, as discussed above.

Figure 5D:
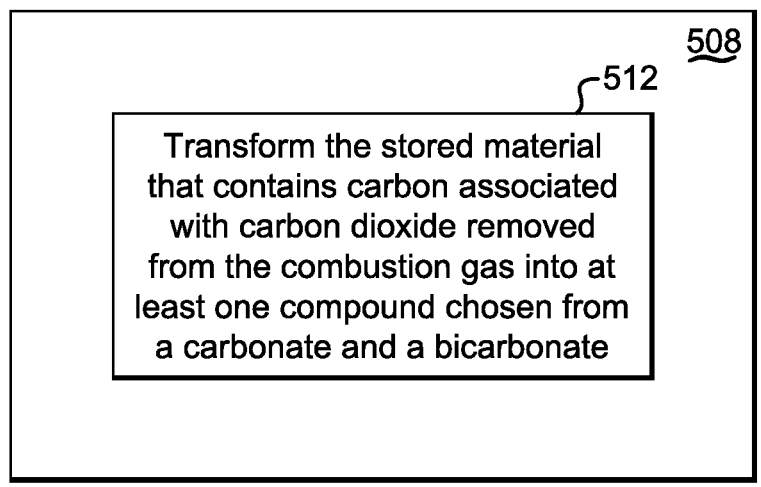

As a further example and without limitation, in some other embodiments and referring additionally to FIG. 5D, processing the stored material that contains carbon associated with the carbon dioxide removed from the combustion gas may include transforming the stored material that contains carbon associated with the carbon dioxide removed from the combustion gas into at least one compound chosen from a carbonate and a bicarbonate. Given by way of non-limiting examples, the carbon dioxide may be reacted with sodium hydroxide to form sodium carbonate or sodium bicarbonate. As a further non-limiting example, processing the stored material that contains carbon associated with the carbon dioxide removed from the combustion gas at the block 508 may include hydrating carbon dioxide to form carbonic acid.

In various embodiments the method 500 may include any one or more additional process blocks related to the material that contains carbon associated with storage of material that contains carbon associated with carbon dioxide removed from the combustion gas. Several examples will be given below by way of illustration and not of limitation.

Figure 5E:
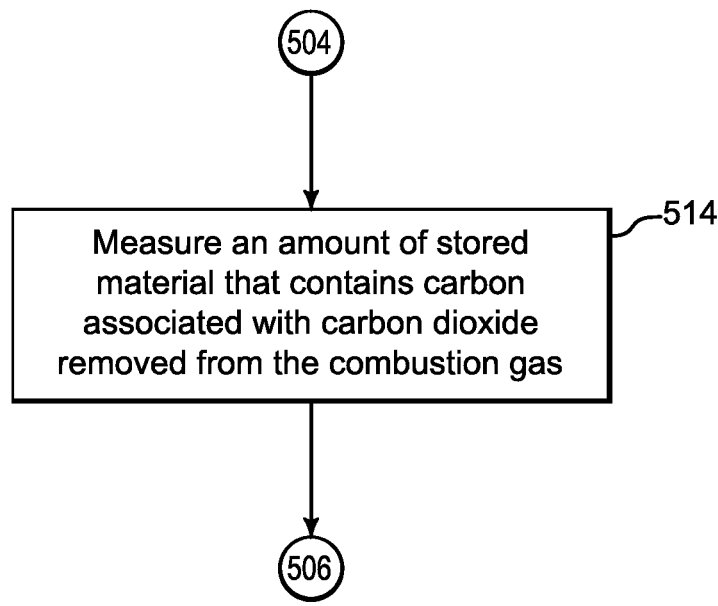
Figure 5F:
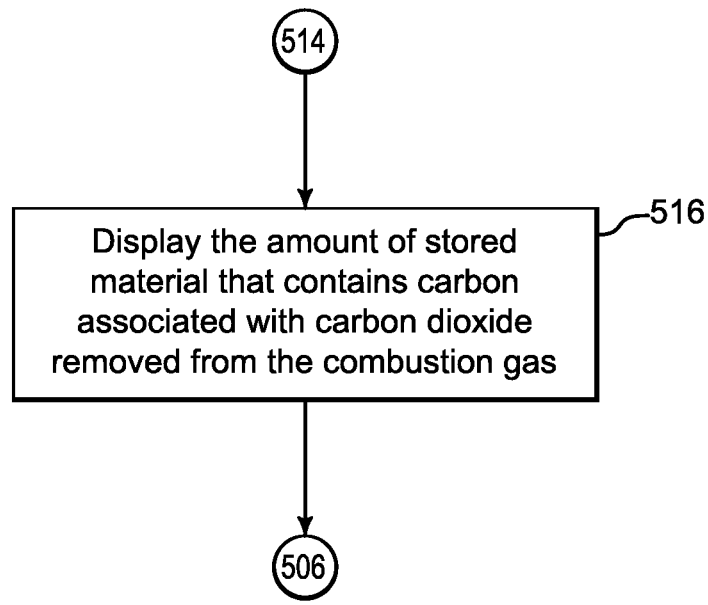

For example and referring to FIGS. 5A and 5E, in some embodiments an amount of stored material that contains carbon associated with the carbon dioxide removed from the combustion gas may be measured at a block 514. The measurement performed at the block 514 may measure volume and/or weight, as desired for a particular application. It will be appreciated that any measurement technique and sensors may be used as desired. In some other embodiments and referring additionally to FIG. 5F, the amount of stored material that contains carbon associated with the carbon dioxide removed from the combustion gas may be displayed at a block 516.

Figure 5G:
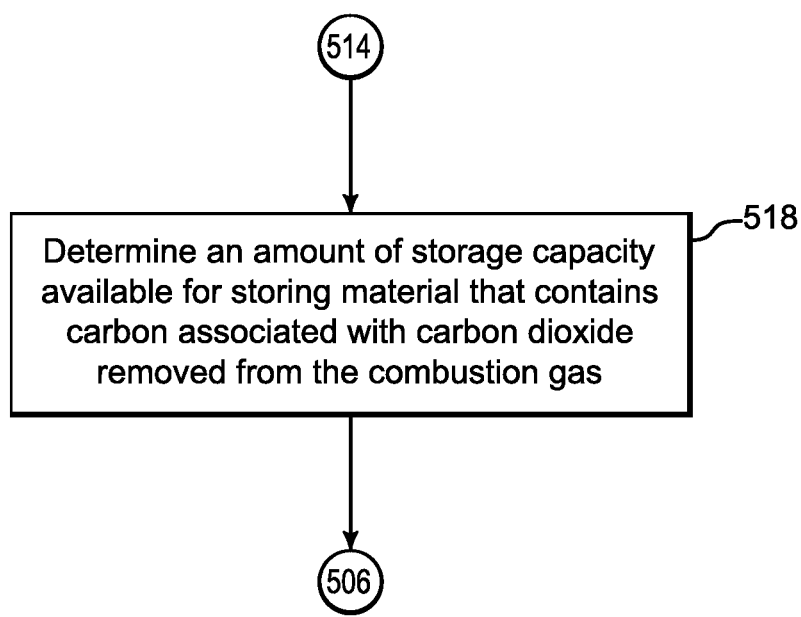
Figure 5H:
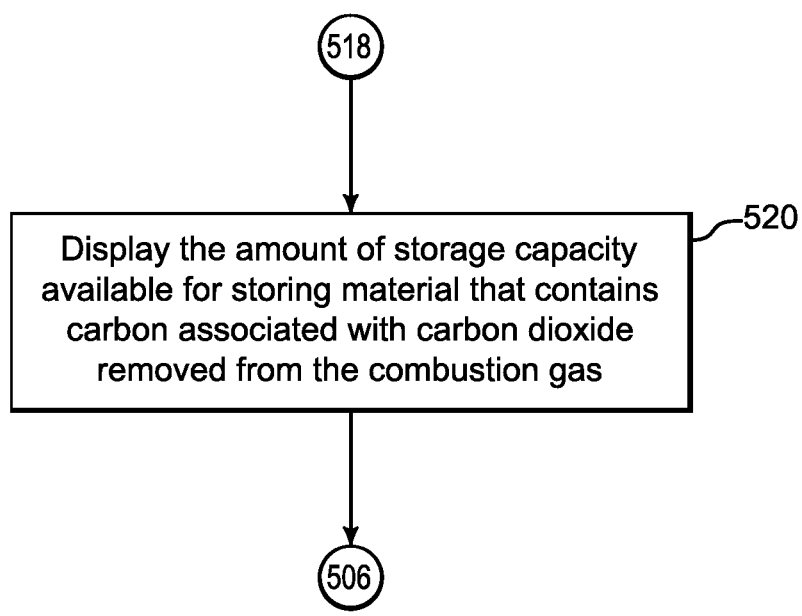

In some embodiments and referring to FIGS. 5A and 5G, an amount of storage capacity available for storing material that contains carbon associated with the carbon dioxide removed from the combustion gas may be determined at a block 518. For example, the amount of stored material that contains carbon associated with the carbon dioxide removed from the combustion gas (that was measured at the block 514) may be subtracted from the total amount of storage capacity available in an empty second vessel. In some embodiments and referring additionally to FIG. 5H, the amount of storage capacity available for storing material that contains carbon associated with the carbon dioxide removed from the combustion gas may be displayed at a block 520.

Figure 5I:
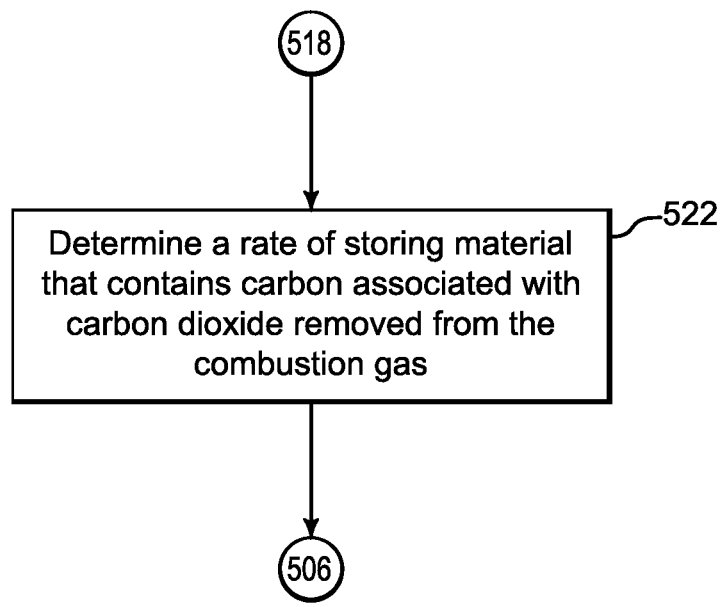

In some embodiments and referring to FIGS. 5A and 5I, a rate of storing material that contains carbon associated with the carbon dioxide removed from the combustion gas may be determined at a block 522. For example, the amount of stored material that contains carbon associated with the carbon dioxide removed from the combustion gas (that was measured at the block 514) may be divided by time that elapsed during storage of the material that contains carbon associated with the carbon dioxide removed from the combustion gas.

Figure 5J:
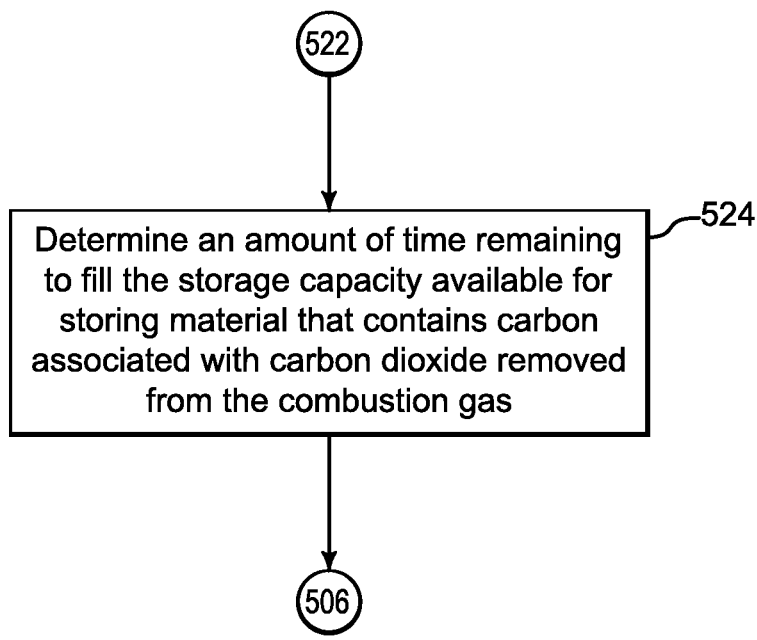
Figure 5K:
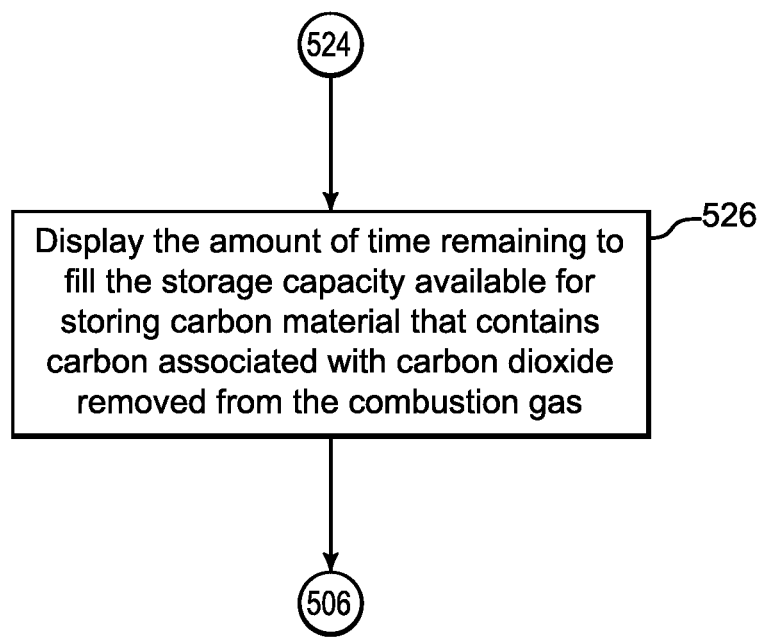

Referring additionally to FIG. 5J, in some embodiments an amount of time remaining to fill the storage capacity available for storing material that contains carbon associated with the carbon dioxide removed from the combustion gas may be determined at a block 524. For example, the amount of storage capacity available for storing material that contains carbon associated with the carbon dioxide removed from the combustion gas (that was determined at the block 518) may be divided by the rate of storing material that contains carbon associated with the carbon dioxide removed from the combustion gas (that was determined at the block 522). Referring additionally to FIG. 5K, in some embodiments the amount of time remaining to fill the storage capacity available for storing carbon material that contains carbon associated with the carbon dioxide removed from the combustion gas (that was determined at the block 524) may be displayed at a block 526.

Figure 5L:
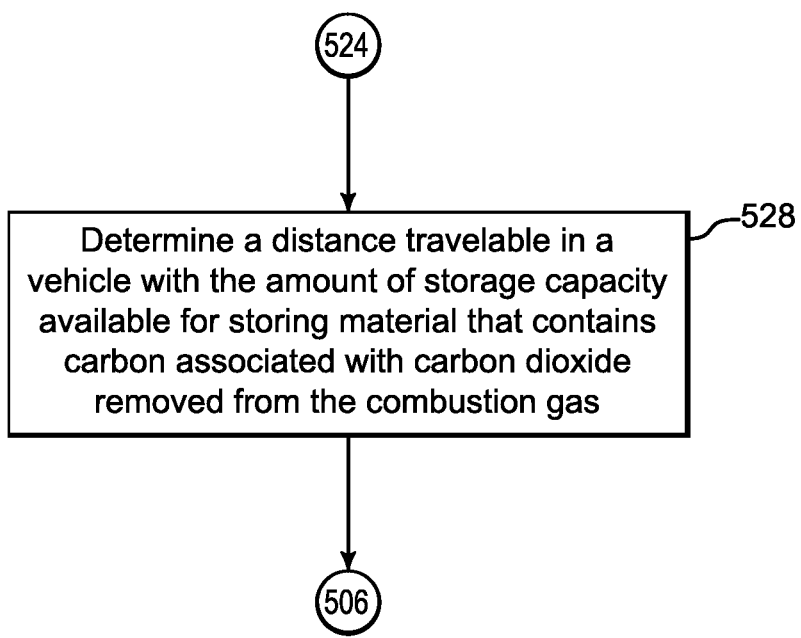
Figure 5M:
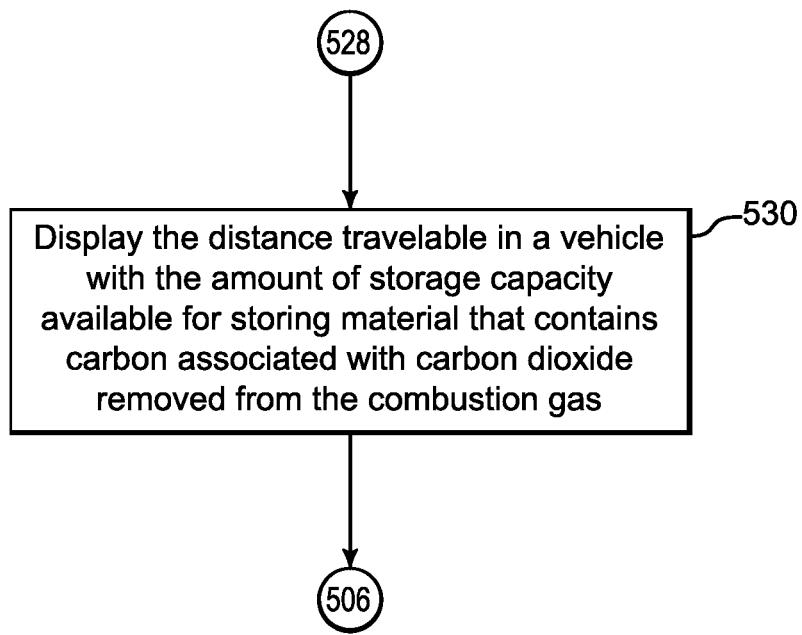

Referring additionally to FIG. 5L, in some embodiments a distance travelable in the vehicle with the amount of storage capacity available for storing material that contains carbon associated with the carbon dioxide removed from the combustion gas (that was determined at the block 518) may be determined at a block 528. For example, the amount of time remaining to fill the storage capacity available for storing carbon material that contains carbon associated with the carbon dioxide removed from the combustion gas (that was determined at the block 524) may be multiplied by speed of the vehicle. Referring additionally to FIG. 5M, in some embodiments the distance travelable in the vehicle with the amount of storage capacity available for storing material that contains carbon associated with the carbon dioxide removed from the combustion gas (that was determined at the block 528) may be displayed at a block 530.

Figure 5N:
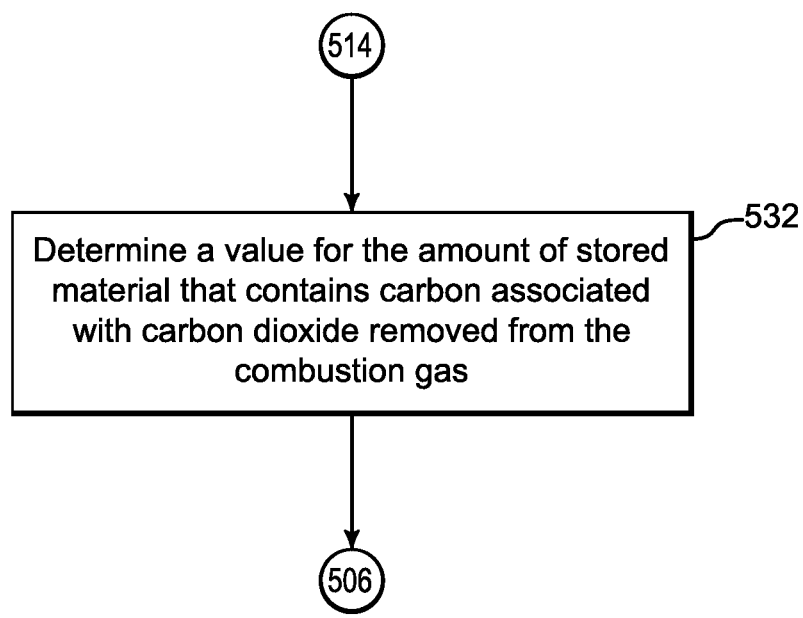

Referring now to FIGS. 5A and 5N, in some embodiments at a block 532 a value may be determined for the amount of stored material that contains carbon associated with carbon dioxide removed from the combustion gas. In various embodiments, the value for the stored material that contains carbon associated with carbon dioxide removed from the combustion gas may be based on quantity of the carbon removed or based on quantity of equivalent carbon dioxide removed. In some embodiments, the value for the stored material that contains carbon associated with carbon dioxide removed from the combustion gas may be determined based upon, in part, by one or more weighting factors that each depend on value of their respective attribute. The attribute for determining value of a weighting factor may be any one or more of the attributes discussed herein.

Figure 5O:
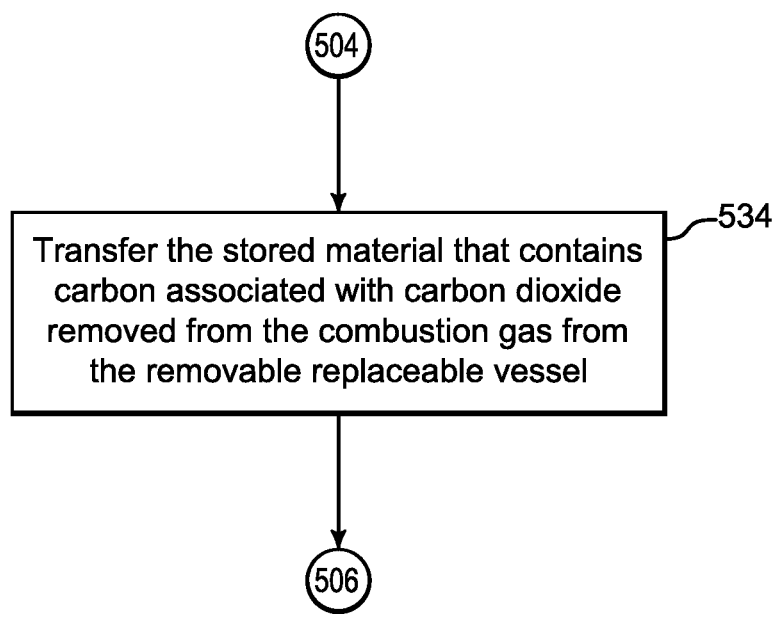

Referring now to FIGS. 5A and 5O, in some embodiments at a block 534 the stored material that contains carbon associated with carbon dioxide removed from the combustion gas may be transferred from the removably replaceable vessel.

Figure 5P:
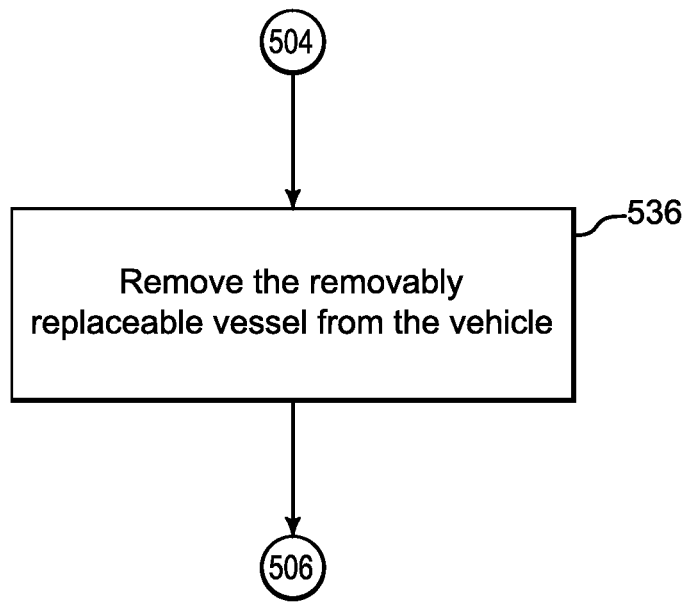
Figure 5Q:
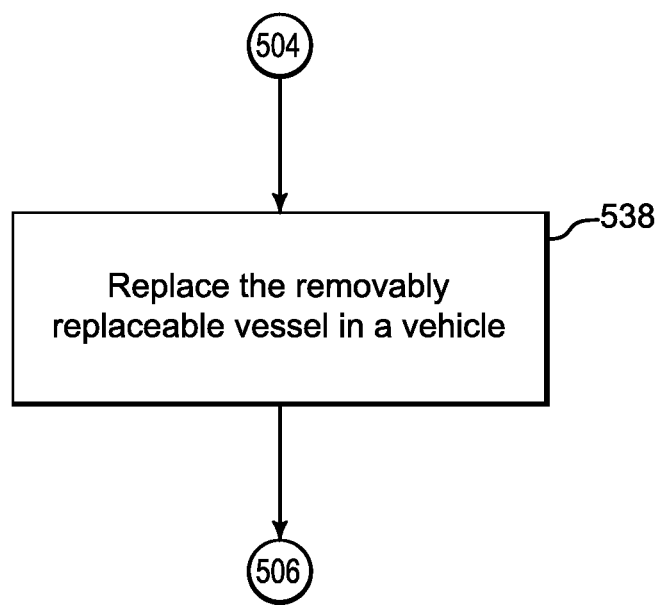

Referring now to FIGS. 5A and 5P, in some embodiments the removably replaceable vessel may be removed from the vehicle at a block 536. Referring now to FIGS. 5A and 5Q, in some embodiments the removably replaceable vessel may be replaced in a vehicle at a block 538. It will be appreciated that the vehicle in which the removably replaceable vessel is replaced need not be the same vehicle from which the removable replaceable vessel was removed. In some embodiments the vehicle in which the removably replaceable vessel is replaced may be the same vehicle from which the removable replaceable vessel was removed. In some other embodiments the vehicle in which the removably replaceable vessel is replaced may be a different vehicle from which the removable replaceable vessel was removed.

Figure 11A:
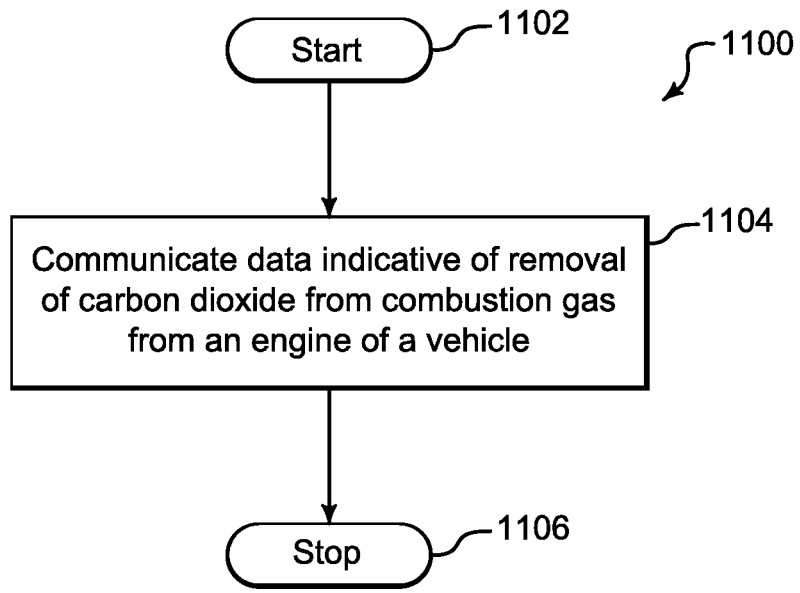
FIG. 11A is a flowchart of another illustrative method.

Referring now to FIG. 11A, in some embodiments a method 1100 is provided. The method 1100 starts at a block 1102. At a block 1104 data indicative of removal of carbon dioxide from combustion gas from an engine of a vehicle is communicated. The method 1100 stops at a block 1106.

Figure 11B:
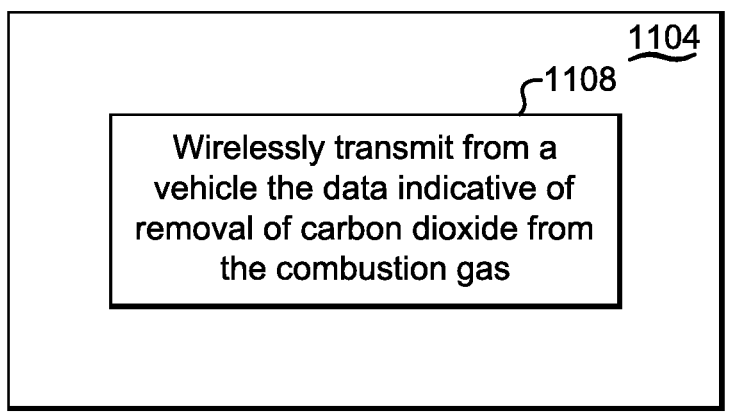
FIGS. 11B-11C are flowcharts of details of the method of FIG. 11A.

Referring additionally to FIG. 11B, in some embodiments communicating data indicative of removal of carbon dioxide from combustion gas from an engine of a vehicle at the block 1104 may include wirelessly transmitting from a vehicle the data indicative of removal of carbon dioxide from the combustion gas at a block 1108.

Figure 11C:
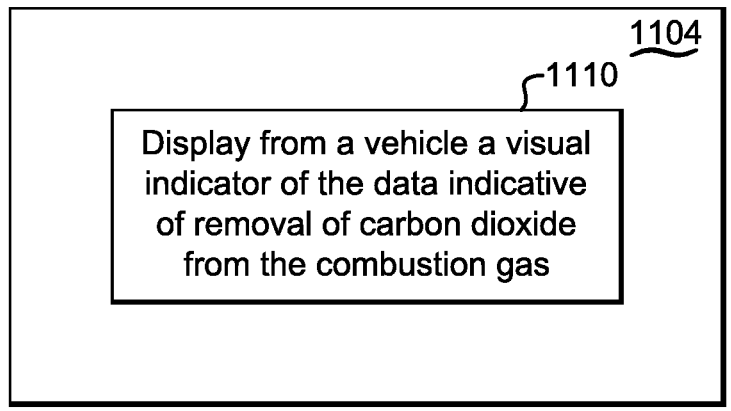

Referring now to FIGS. 11A and 11C, in some embodiments communicating data indicative of removal of carbon dioxide from combustion gas from an engine of a vehicle at the block 1104 may include displaying from a vehicle a visual indicator of the data indicative of removal of carbon dioxide from the combustion gas at a block 1110.

Referring now to FIGS. 11A-11C, in various embodiments the data indicative of removal of carbon dioxide from combustion gas from an engine of a vehicle may be further indicative of: identification of a vehicle; identification of a user; amount of carbon dioxide removed from the combustion gas; location at which carbon dioxide is removed from the combustion gas; time at which carbon dioxide is removed from the combustion gas; and/or form in which material that contains carbon associated with the carbon dioxide removed from the combustion gas is stored.

Managing Carbon Dioxide Emissions from an Engine of a Vehicle

Figure 6A:
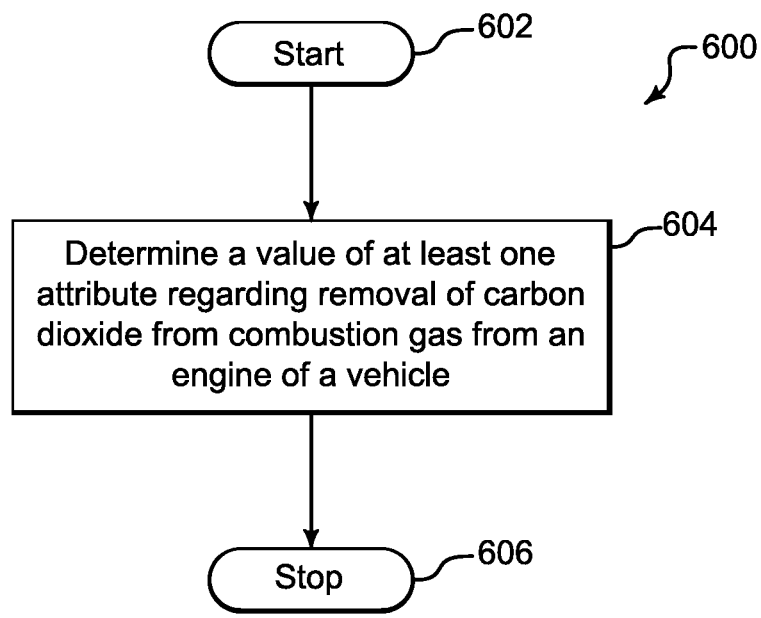
FIG. 6A is a flowchart of an illustrative method of managing carbon dioxide emissions from an engine of a vehicle.

Referring now to FIG. 6A and by way of overview, a method 600 is provided for managing carbon dioxide emissions from an engine of a vehicle. The method 600 starts at a block 602. At a block 604 a value of at least one attribute regarding removal of carbon dioxide from combustion gas from an engine of a vehicle is determined. The method 600 stops at a block 606.

Figure 6B:
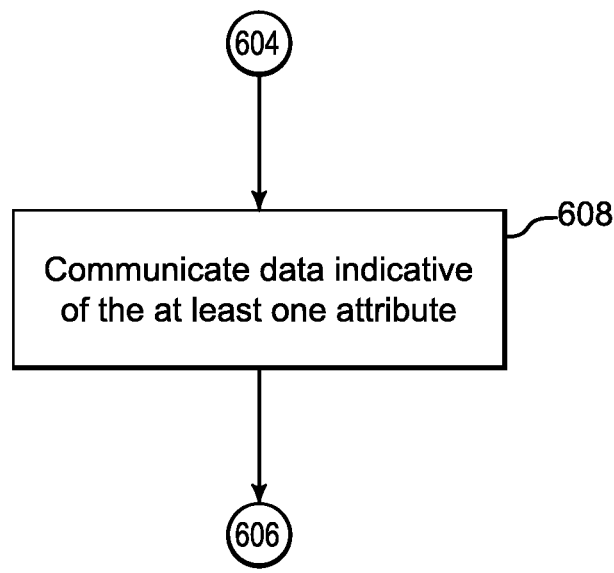
FIGS. 6B-6R are flowcharts of details of the method of FIG. 6A.

Referring briefly additionally to FIG. 6B, in some embodiments data indicative of the at least one attribute may be communicated at a block 608. It will be appreciated that the attribute may be communicated in any manner as desired, such as via radiofrequency (RF) communication, digital or analog electronic communication, visual communication, aural communication, or the like.

Referring back to FIG. 6A, the attribute determined at the block 604 may include any one or more attributes whatsoever regarding removal of carbon dioxide from combustion gas from an engine of a vehicle. Several examples will be discussed below by way of illustration only and not of limitation.

For example, in various embodiments the attribute determined at the block 604 may include without limitation: position of a vehicle where the carbon dioxide is removed from the combustion gas; time when the carbon dioxide is removed from the combustion gas; governmental regulations regarding removing carbon dioxide from combustion gas from an engine of a vehicle; an amount of pollution in air drawn into an engine from which the carbon dioxide is removed from the combustion gas; monetary value of the removed carbon dioxide; and/or an amount of storage capacity available on the vehicle to store material that contains carbon associated with carbon dioxide removed from the combustion gas.

As a further example, in various embodiments the attribute determined at the block 604 may include a predetermined amount of material that contains carbon associated with carbon dioxide removed from the combustion gas that can be stored in a predetermined time period. For example, the predetermined time period may correspond to a time period for the vehicle to travel to a predetermined location configured for offloading material that contains carbon associated with carbon dioxide removed from the combustion gas stored on the vehicle.

In other embodiments, the attribute determined at the block 604 may include a predetermined amount of material that contains carbon associated with carbon dioxide removed from the combustion gas that can be stored in a predetermined range of distance travelable by the vehicle. For example, the distance travelable may be associated with a distance to a predetermined location of a facility that is configured to receive the stored material that contains carbon associated with carbon dioxide removed from the combustion gas. As another example, the distance travelable may be associated with an amount of fuel remaining onboard the vehicle.

In other embodiments, the attribute determined at the block 604 may include identity of a vehicle; an amount of carbon dioxide removed from the combustion gas; an amount of stored material that contains carbon associated with carbon dioxide removed from the combustion gas; and/or form of stored material that contains carbon associated with carbon dioxide removed from the combustion gas.

In other embodiments, the attribute determined at the block 604 may include capacity of a facility to receive from the vehicle material that contains carbon associated with carbon dioxide removed from the combustion gas. In some embodiments, the capacity of a facility may include storage capacity to store material that contains carbon associated with carbon dioxide removed from the combustion gas. In some other embodiments the capacity of a facility may include electrical capacity to process material that contains carbon associated with carbon dioxide removed from the combustion gas.

Given by way of further examples, the attribute determined at the block 604 may include identity of a user; at least one incentive factor selected to incentivize removal of carbon dioxide; an amount of carbon dioxide removed within a predetermined time period; an amount of carbon dioxide removed within a predetermined geographical region; an amount of carbon dioxide removed by a predetermined user; and/or an amount of carbon dioxide removed from a predetermined vehicle.

As a further example, the attribute determined at the block 604 may include a vehicle mode defined by at least one modifiable parameter. Given by way of nonlimiting example, the modifiable parameter may include at least one modifiable setting of an engine, such as without limitation richness of a fuel-air mixture. As another example, the modifiable parameter may include type of fuel. As a further example, the modifiable parameter may include a modifiable setting of a catalytic converter, such as without limitation temperature of the combustion gas.

In other embodiments, the attribute determined at the block 604 may include a characteristic of the combustion gas. Given by way of nonlimiting examples, the characteristic of the combustion gas may include temperature and/or pressure of the combustion gas, composition of the combustion gas, or the like.

In other embodiments the attribute determined at the block 604 may include a ratio of rate of removal of carbon dioxide to rate of generation of carbon dioxide.

Figure 6C:
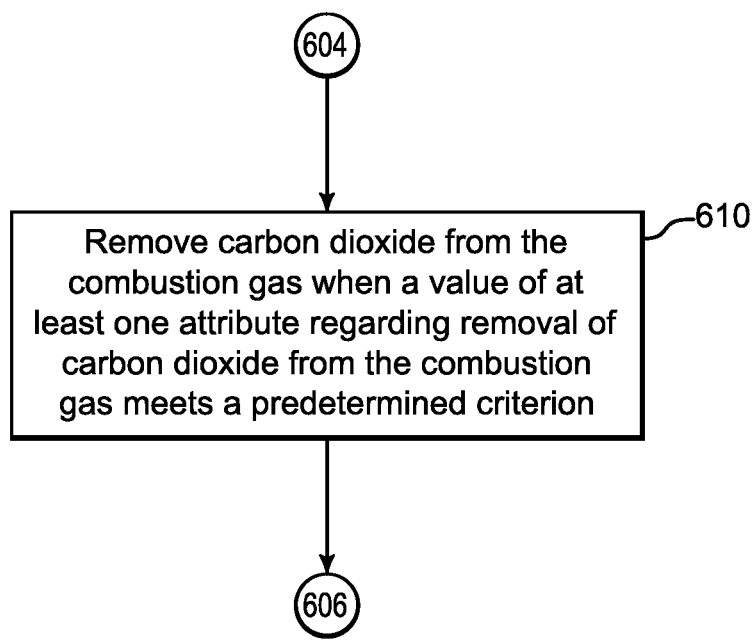
Figure 6D:
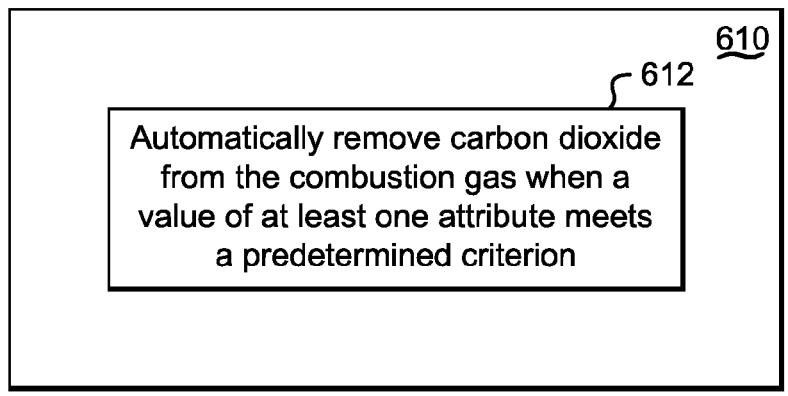

Referring additionally to FIG. 6C, in some other embodiments at a block 610 carbon dioxide may be removed from the combustion gas when a value of at least one attribute regarding removal of carbon dioxide from the combustion gas meets a predetermined criterion. In some embodiments and referring to FIG. 6D, removing carbon dioxide from the combustion gas when a value of at least one attribute meets a predetermined criterion at the block 610 may include automatically removing carbon dioxide from the combustion gas when a value of at least one attribute meets a predetermined criterion at a block 612.

Figure 6E:
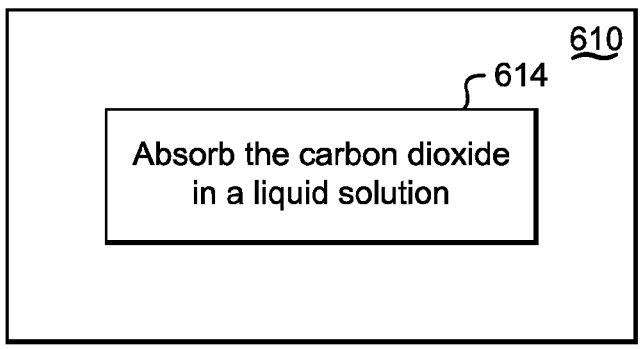
Figure 6F:
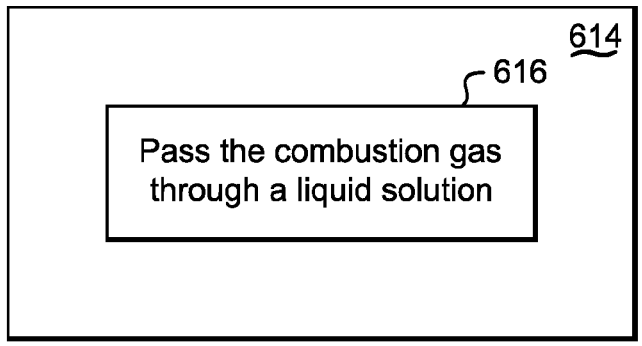

Referring now to FIG. 6E, in some embodiments removing carbon dioxide from the combustion gas at the block 610 may include absorbing the carbon dioxide in a liquid solution at a block 614. Details have been discussed above. In some embodiments absorbing the carbon dioxide in a liquid solution at the block 614 may include passing the combustion gas through a liquid solution 616. In some other embodiments and referring to FIG. 6F, absorbing the carbon dioxide in a liquid solution at the block 614 may include passing the combustion gas over a surface of a liquid solution 618.

Figure 6G:
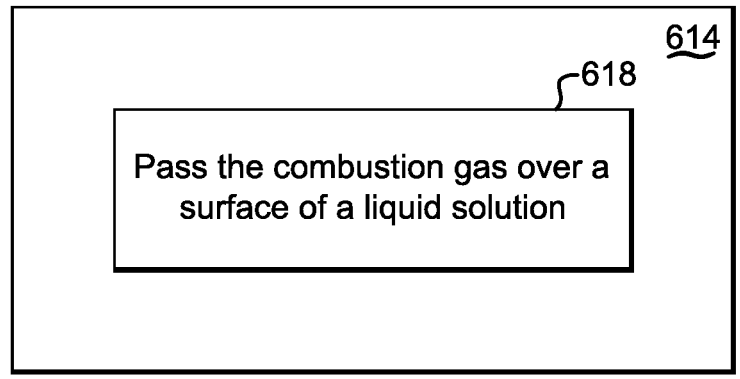
Figure 6H:
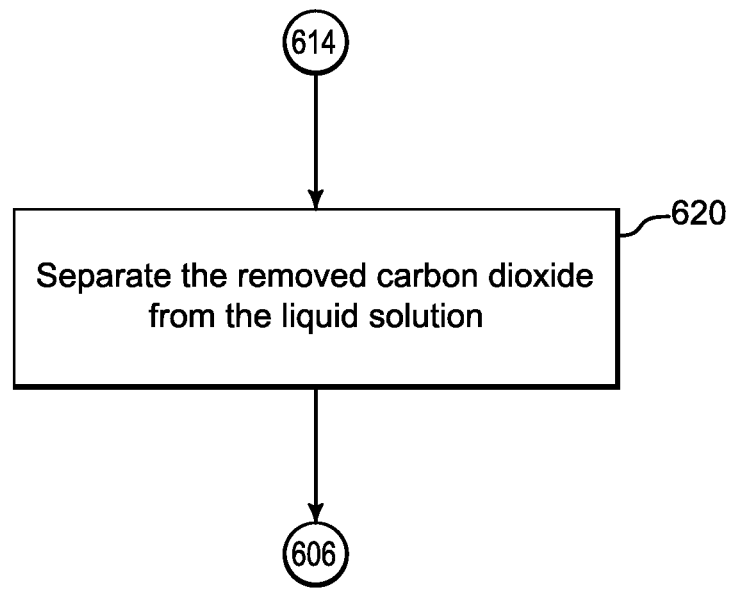
Figure 6I:
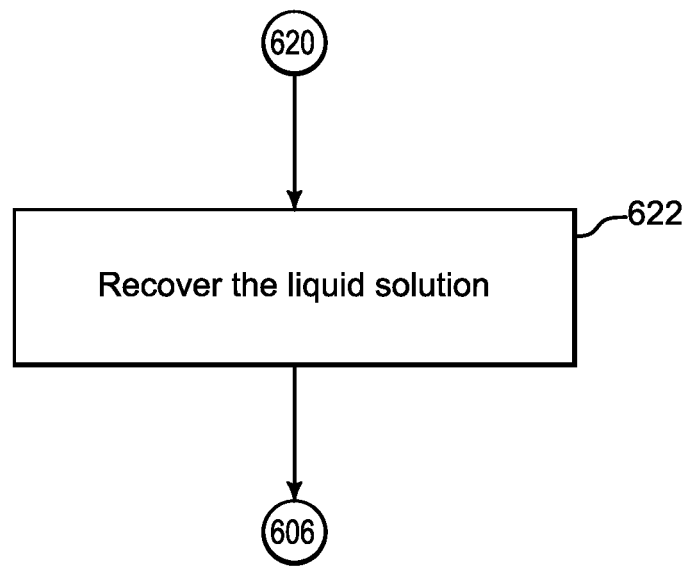

Referring to FIG. 6G, in some embodiments the removed carbon dioxide may be separated from the liquid solution at a block 620. Details of separation have been discussed above. Referring to FIG. 6I, in some embodiments the liquid solution may be recovered at a block 622. Details of recovery have been discussed above.

Figure 6J:
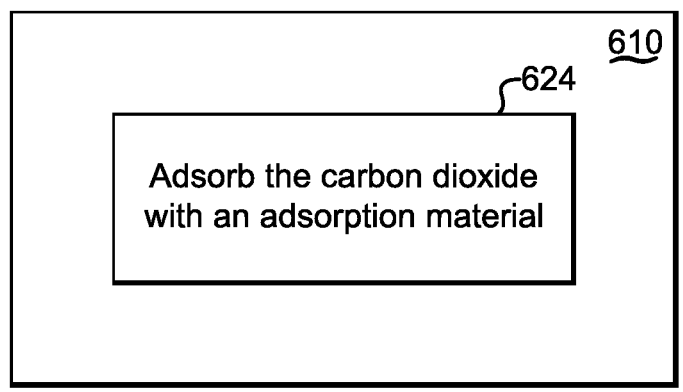

Referring now to FIG. 6J, in some other embodiments removing carbon dioxide from combustion gas from an engine of a vehicle at the block 610 may include adsorbing the carbon dioxide with an adsorption material. Details have been discussed above.

Figure 6K:
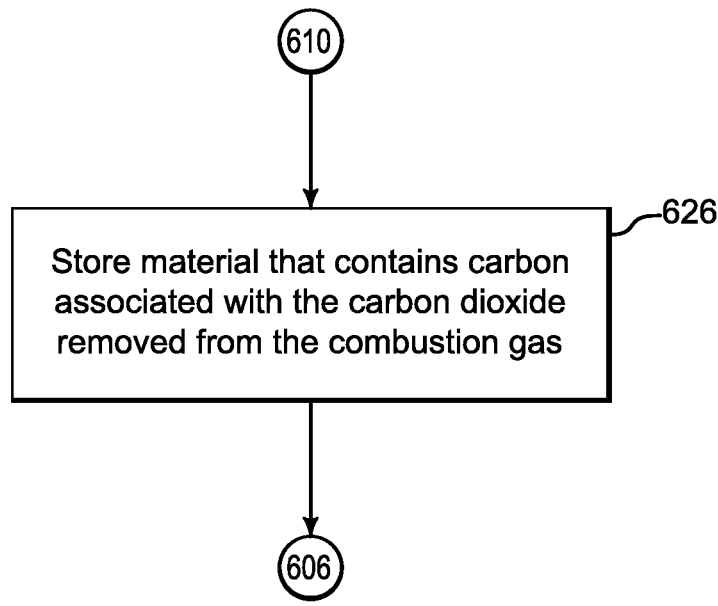

Referring now to FIG. 6K, in some embodiments material that contains carbon associated with the carbon dioxide removed from the combustion gas may be stored at a block 626.

It will be appreciated that various materials may contain carbon that is associated with the carbon dioxide removed from the combustion gas. For example, in applications in which no further processing is performed on the carbon dioxide removed from the combustion gas, the material that contains carbon associated with the carbon dioxide removed from the combustion gas may include carbon dioxide removed from the combustion gas. However, in other embodiments, the material that contains carbon associated with the carbon dioxide removed from the combustion gas may include at least one product of a chemical reaction. For example, in some embodiments the carbon dioxide may be reacted with sodium hydroxide to form sodium carbonate or sodium bicarbonate, as desired.

Figure 6L:
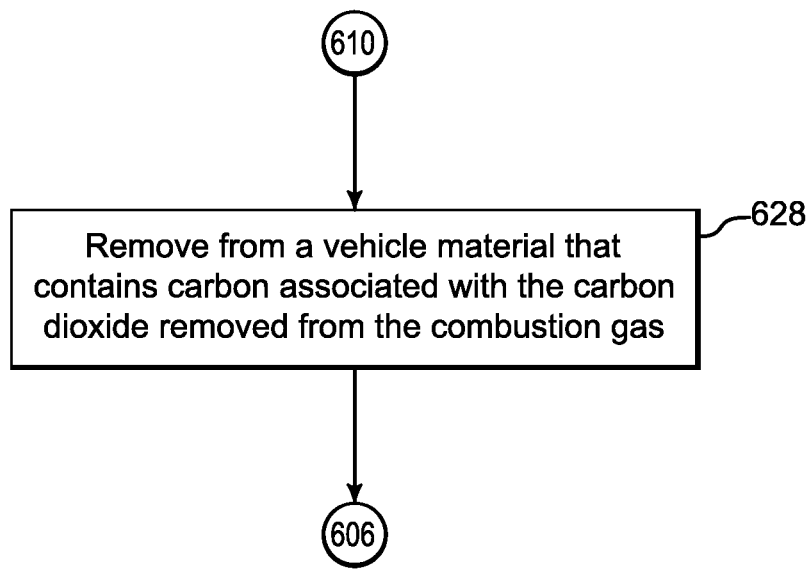
Figure 6M:
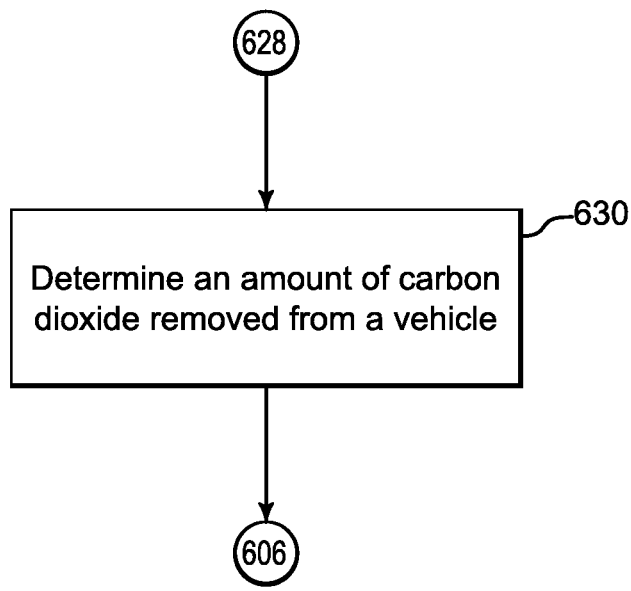

Referring now to FIGS. 6A, 6C, and 6L, at a block 628 material that contains carbon associated with the carbon dioxide removed from the combustion gas may be removed from a vehicle. If desired and referring additionally to FIG. 6M, in some cases an amount of carbon dioxide removed from a vehicle may be determined at a block 630.

Referring back to FIG. 6A, in some embodiments the attribute may include price payable for carbon dioxide removed from the combustion gas. The price payable for carbon dioxide removed from the combustion gas may be determined in various ways. Given by way of nonlimiting examples, in various embodiments the price payable for the removed carbon dioxide may be: based upon an amount of carbon dioxide removed; based upon an amount of carbon removed; proportional to a predetermined carbon valuation factor; based upon a value of at least one factor such as without limitation position of a vehicle where the carbon dioxide is removed from the combustion gas, time when the carbon dioxide is removed from the combustion gas, identity of a user, and identity of a vehicle; and/or based upon a form in which the material that contains carbon associated with the carbon dioxide removed from the combustion gas is stored, such as without limitation carbon dioxide, a carbonate, a bicarbonate, and/or carbonic acid.

Figure 6N:
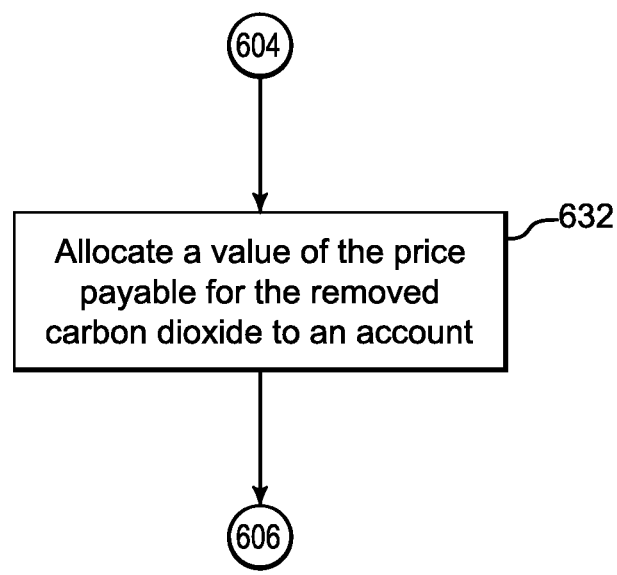

Referring additionally to FIG. 6N and in some embodiments in which the attribute includes price payable for carbon dioxide removed from the combustion gas, a value of the price payable for the removed carbon dioxide may be allocated to an account at a block 632. In some embodiments the value of the price payable for carbon dioxide removed from more than one vehicle may be allocatable to the account.

In some embodiments, the account may be one of two or more accounts. Given by way of nonlimiting examples, the accounts may include: an account based upon position of a vehicle where the carbon dioxide is removed from the combustion gas; an account based upon time when the carbon dioxide is removed from the combustion gas; an account based upon identity of a user; and/or an account based upon identity of a vehicle. In some embodiments the account may include a database.

Figure 6O:
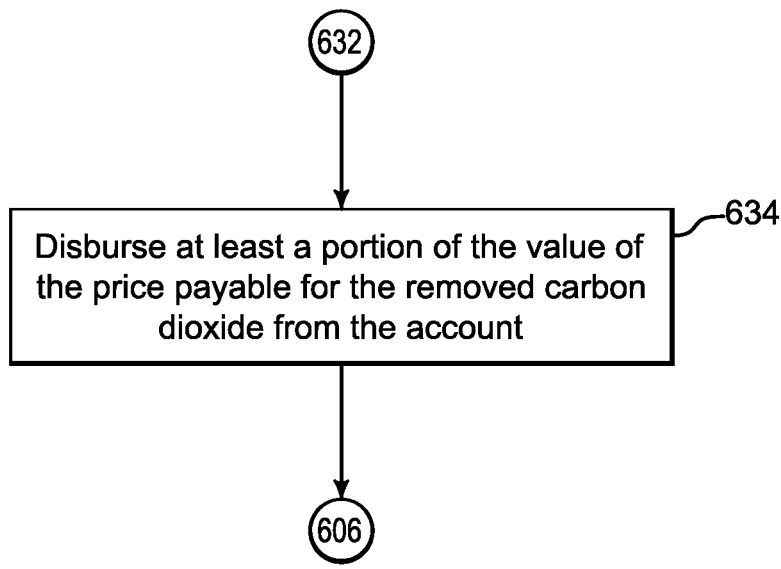

In some embodiments and referring additionally to FIG. 6O, at least a portion of the value of the price payable for the removed carbon dioxide may be disbursed from the account at a block 634.

Figure 6P:
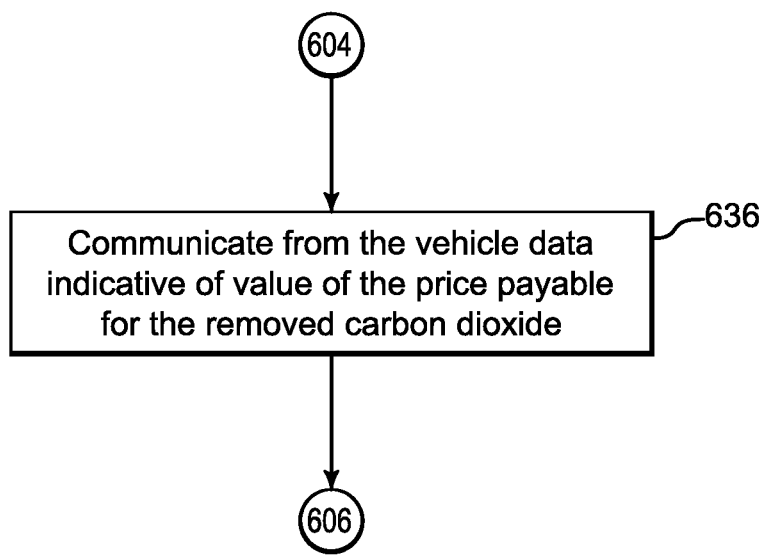

Referring now to FIGS. 6A and 6P and in some embodiments in which the attribute includes price payable for carbon dioxide removed from the combustion gas, data indicative of value of the price payable for the removed carbon dioxide may be communicated from the vehicle at a block 636.

Figure 6Q:
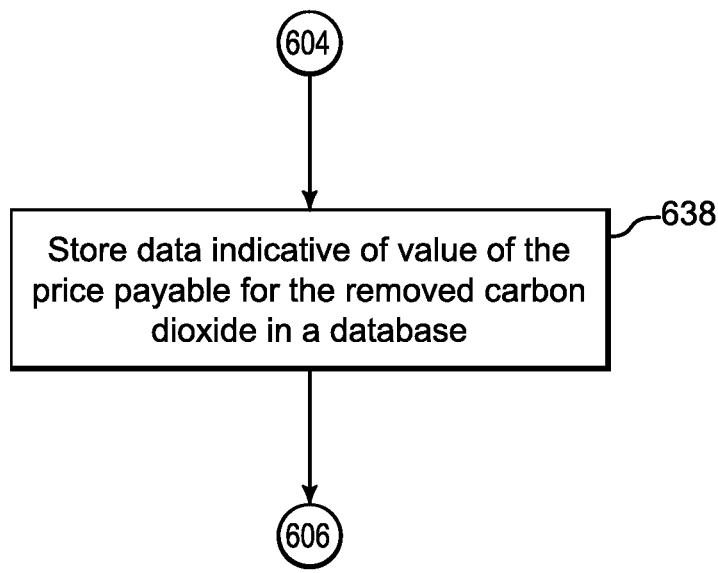
Figure 6R:
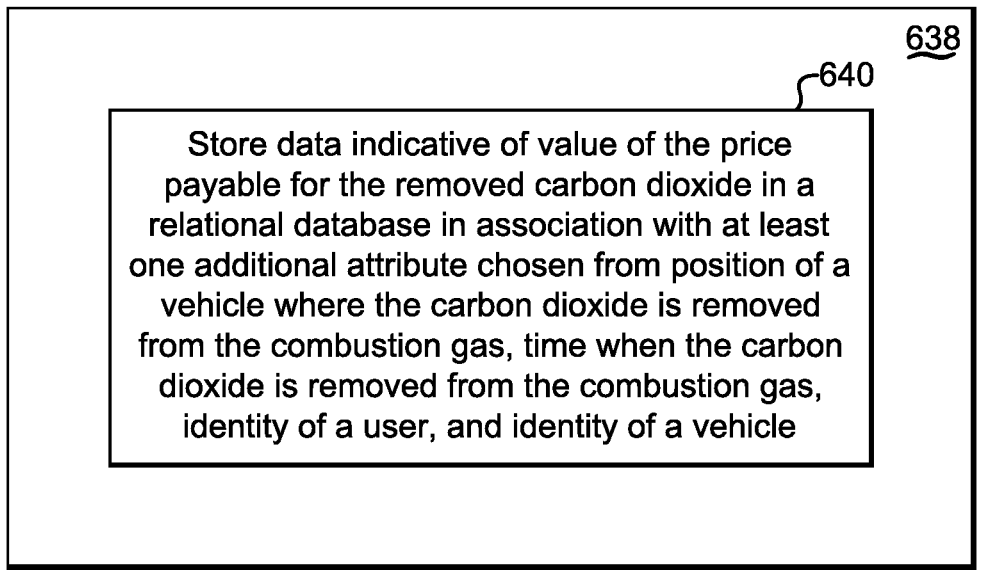

Referring now to FIGS. 6A and 6Q and in some embodiments in which the attribute includes price payable for carbon dioxide removed from the combustion gas, data indicative of value of the price payable for the removed carbon dioxide may be stored in a database at a block 638. Given by way of nonlimiting examples, in some embodiments storing data indicative of value of the price payable for the removed carbon dioxide in a database at the block 638 may include, at a block 640, storing data indicative of value of the price payable for the removed carbon dioxide in a relational database in association with at least one additional attribute such as position of a vehicle where the carbon dioxide is removed from the combustion gas; time when the carbon dioxide is removed from the combustion gas; identity of a user; and/or identity of a vehicle.

Figure 7A:
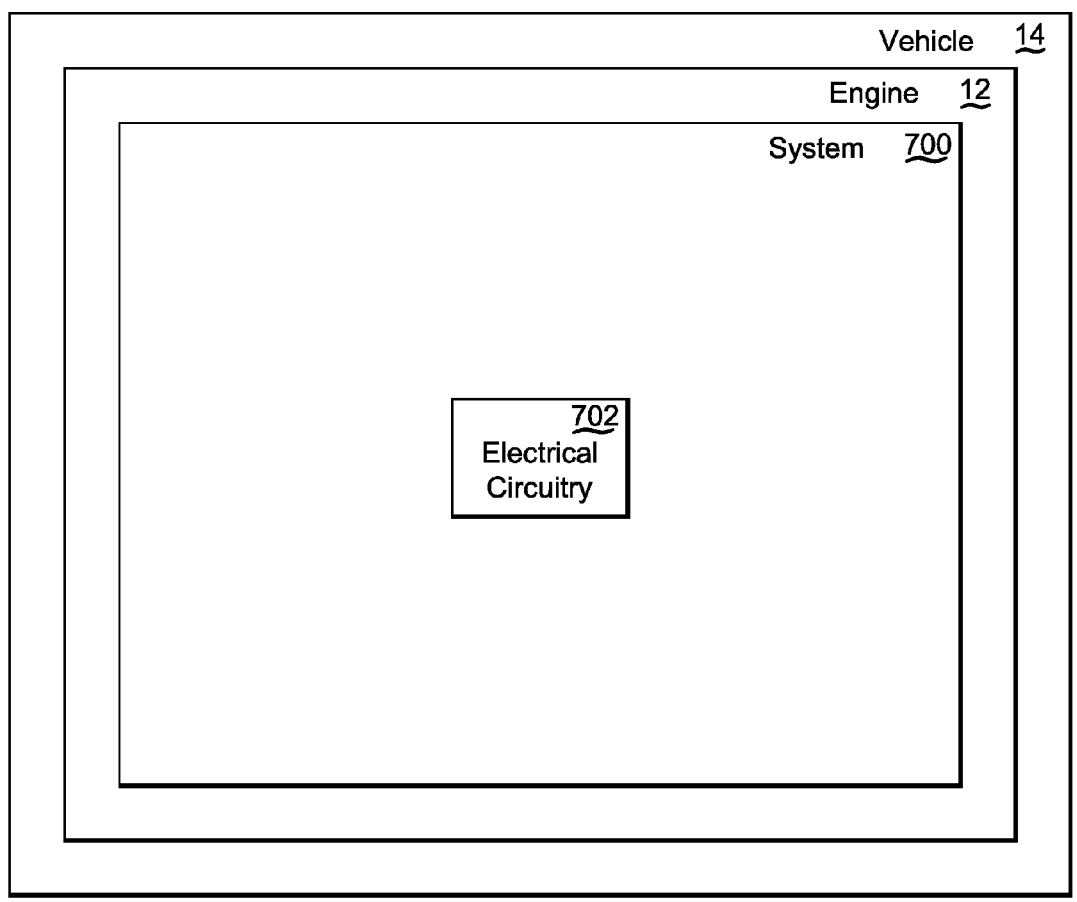
FIG. 7A is a block diagram of an illustrative system.

Referring now to FIG. 7A and given by way of overview, in some embodiments an illustrative system 700 includes electrical circuitry 702 configured to determine a value of at least one attribute regarding removal of carbon dioxide from combustion gas from an engine 12 of a vehicle 14.

In some embodiments, the system 700 and its components may be configured to perform process blocks of the method 600 (FIG. 6A). For example, the electrical circuitry 702 may be configured to perform operations at the block 604 (FIG. 6A). Process details need not be repeated.

Figure 7B:
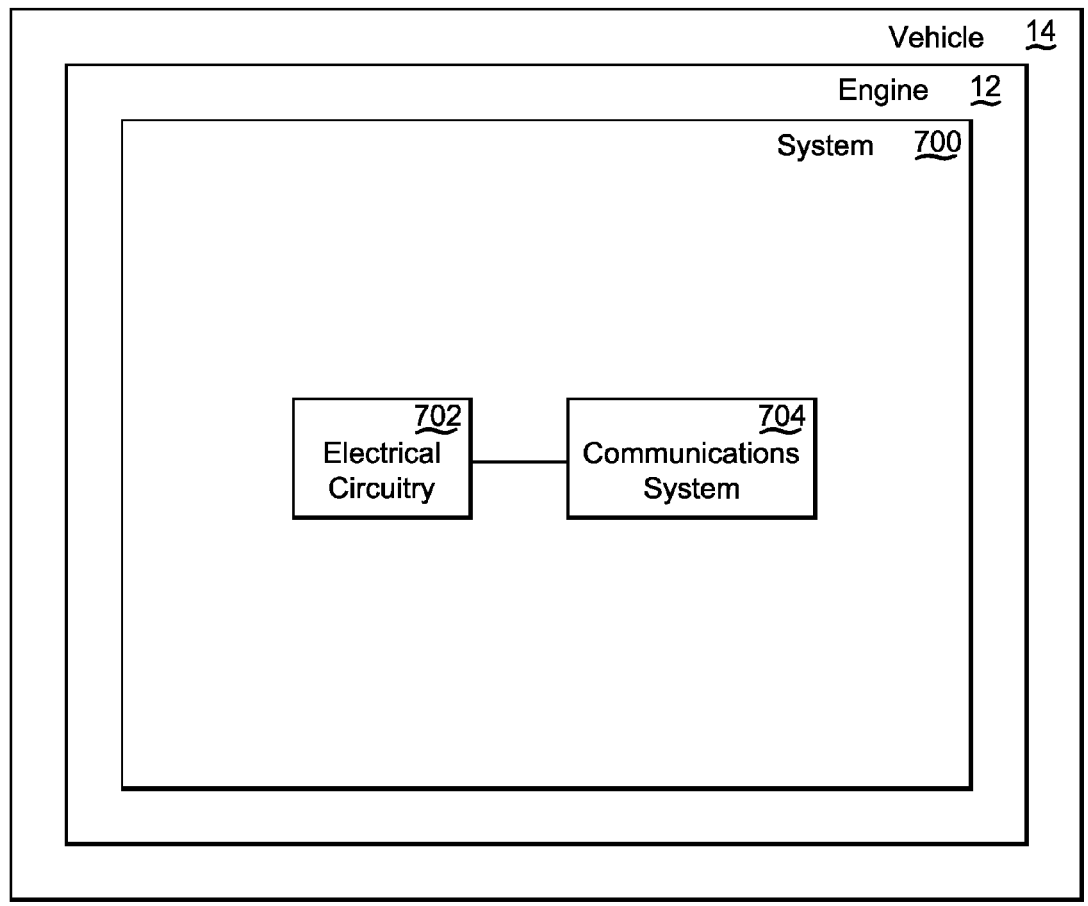
FIGS. 7B-7C are block diagrams of other illustrative systems.

Referring additionally to FIG. 7B, the system 700 may include a communications system 704 configured to communicate data indicative of the attribute. The communications system 704 may be any type of communications system as desired, such as a radiofrequency communications system, a visual communications system, an aural communications system, or the like. Nonlimiting examples of the at least one attribute will be discussed below.

Referring back to FIG. 7A, the attribute may be any attribute as desired regarding removal of carbon dioxide from the combustion gas. Given by way of examples only and not of limitation, in various embodiments the at least one attribute may include without limitation any one or more of the following attributes: position of a vehicle where the carbon dioxide is removed from the combustion gas; time when the carbon dioxide is removed from the combustion gas; governmental regulations regarding removing carbon dioxide from combustion gas from an engine of a vehicle; and/or an amount of pollution in air drawn into an engine from which the carbon dioxide is removed from the combustion gas.

Given by way of further examples only and not of limitation, in various embodiments the at least one attribute may include without limitation any one or more of the following attributes: monetary value of the removed carbon dioxide; and/or an amount of storage capacity available on the vehicle to store material that contains carbon associated with carbon dioxide removed from the combustion gas.

As a further nonlimiting example, in some embodiments the attribute may include a predetermined amount of material that contains carbon associated with carbon dioxide removed from the combustion gas that can be stored in a predetermined time period. For example, in some embodiments the predetermined time period may correspond to a time period for the vehicle to travel to a predetermined location configured for offloading material that contains carbon associated with carbon dioxide removed from the combustion gas.

As another nonlimiting example, in some embodiments the attribute may include a predetermined amount of material that contains carbon associated with carbon dioxide removed from the combustion gas that can be stored in a predetermined range of distance travelable by the vehicle. In some embodiments, the distance travelable may be associated with a distance to a predetermined location of a facility that is configured to receive the stored material that contains carbon associated with carbon dioxide removed from the combustion gas. In some other embodiments, the distance travelable may be associated with an amount of fuel remaining onboard the vehicle.

Given by way of further nonlimiting examples, in some embodiments the attribute may include without limitation form of stored material that contains carbon associated with carbon dioxide removed from the combustion gas.

Given by way of further nonlimiting examples, in some embodiments the attribute may include without limitation identity of a vehicle; an amount of carbon dioxide removed from the combustion gas; and/or an amount of stored material that contains carbon associated with carbon dioxide removed from the combustion gas.

Given by way of further nonlimiting examples, in some embodiments the attribute may include without limitation capacity of a facility to receive material that contains carbon associated with carbon dioxide removed from the combustion gas. For example, in some embodiments capacity of a facility may include storage capacity to store material that contains carbon associated with carbon dioxide removed from the combustion gas. In some other embodiments capacity of a facility may include electrical capacity to process material that contains carbon associated with carbon dioxide removed from the combustion gas.

Given by way of further nonlimiting examples, in various embodiments the attribute may include: identity of a user; at least one incentive factor selected to incentivize removal of carbon dioxide; an amount of carbon dioxide removed within a predetermined time period; an amount of carbon dioxide removed within a predetermined geographical region; an amount of carbon dioxide removed by a predetermined user; and/or an amount of carbon dioxide removed from a predetermined vehicle.

In some other embodiments, given by way of nonlimiting example the attribute may include a vehicle mode defined by at least one modifiable parameter. In some cases, the modifiable parameter may include at least one modifiable setting of an engine, such as without limitation richness of a fuel-air mixture. In some other cases, the modifiable parameter may include type of fuel. In other cases, the modifiable parameter may include a modifiable setting of a catalytic converter, such as without limitation temperature of the combustion gas.

In some embodiments, the attribute may include a characteristic of the combustion gas. For example, in some embodiments the characteristic of the combustion gas may include temperature and/or pressure of the combustion gas. In some other embodiments the characteristic of the combustion gas may include composition of the combustion gas.

In some embodiments the attribute may include a ratio of rate of removal of carbon dioxide to rate of generation of carbon dioxide.

Figure 7C:
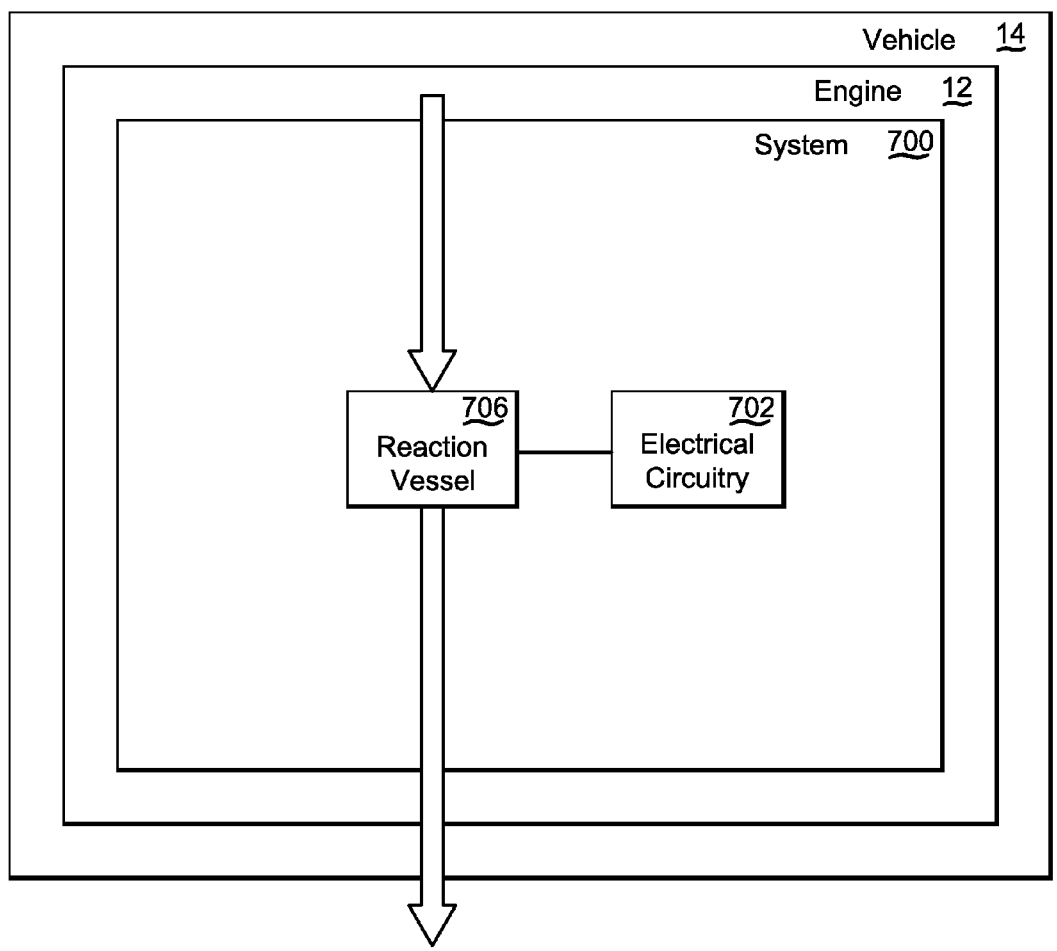

Referring now to FIG. 7C, in some embodiments the system 700 may include a reaction vessel 706 that is configured to remove carbon dioxide from the combustion gas when a value of at least one attribute regarding removal of carbon dioxide from the combustion gas meets a predetermined criterion. The reaction vessel 706 may include any type of vessel whatsoever as appropriate for temperature, pressure, and chemical parameters. In some embodiments the reaction vessel 706 may be configured to automatically remove carbon dioxide from the combustion gas when the value of the at least one attribute meets a predetermined criterion.

Figure 7D:
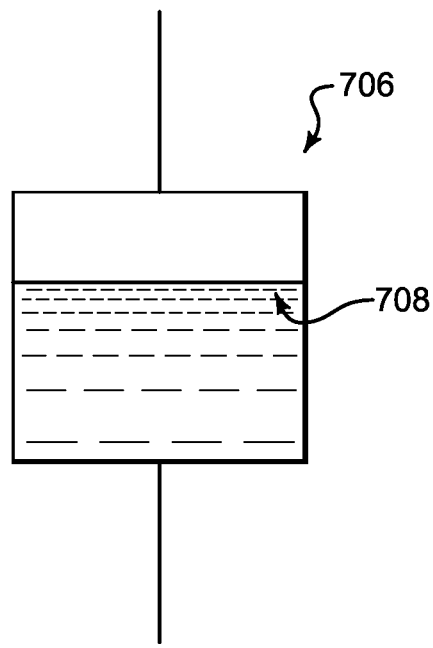
FIGS. 7D-7E are illustrations in partial schematic form of components of the system of FIG. 7A.
Figure 7E:
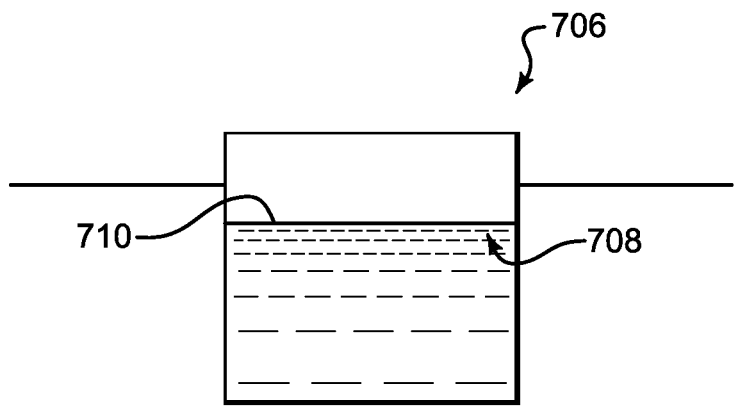

In some embodiments, the reaction vessel 706 may be configured to absorb the carbon dioxide in a liquid solution. Details of the liquid solution have been discussed above. Referring additionally to FIG. 7D, in some embodiments the reaction vessel 706 may be configured to pass the combustion gas through a liquid solution 708. Referring to FIG. 7E, in some other embodiments the reaction vessel 706 may be configured to pass the combustion gas over a surface 710 of the liquid solution 708.

Figure 7F:
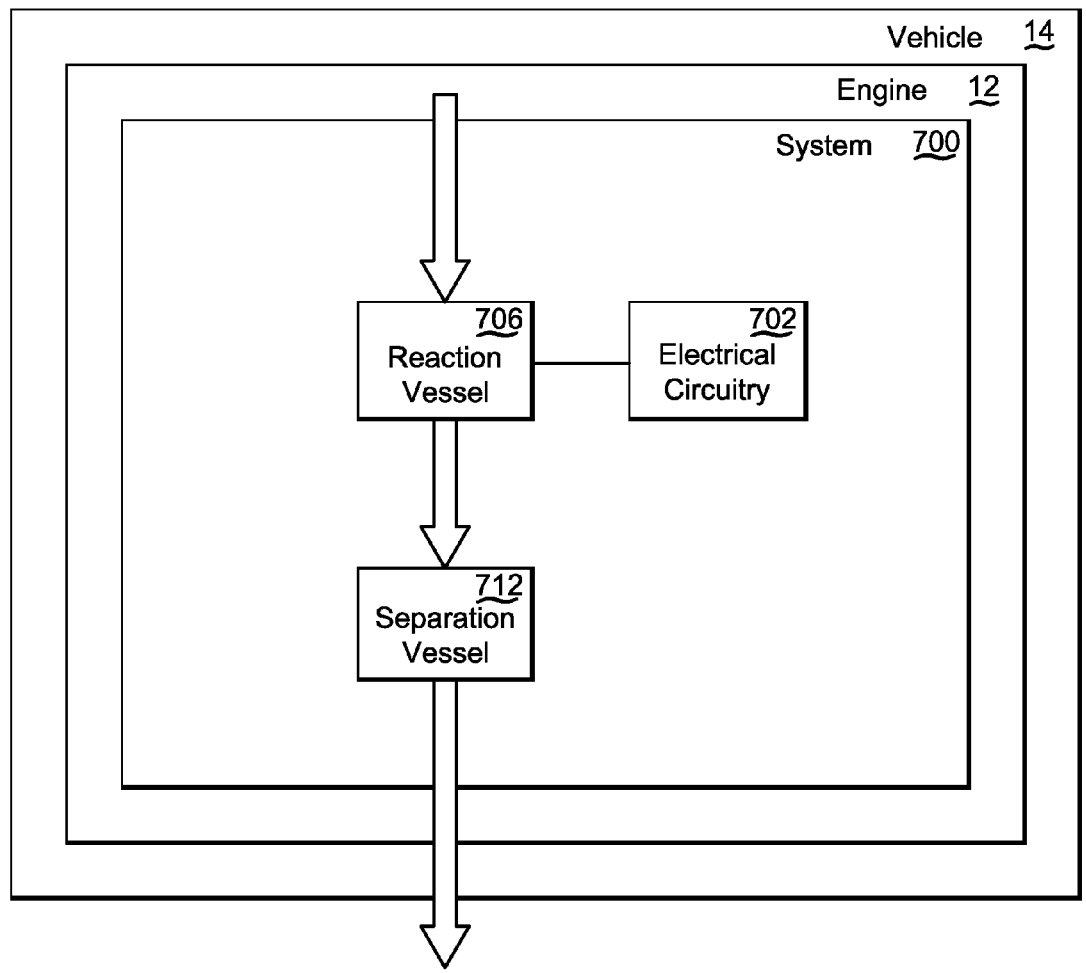
FIGS. 7F-7G are block diagrams of other illustrative systems.
Figure 7G:
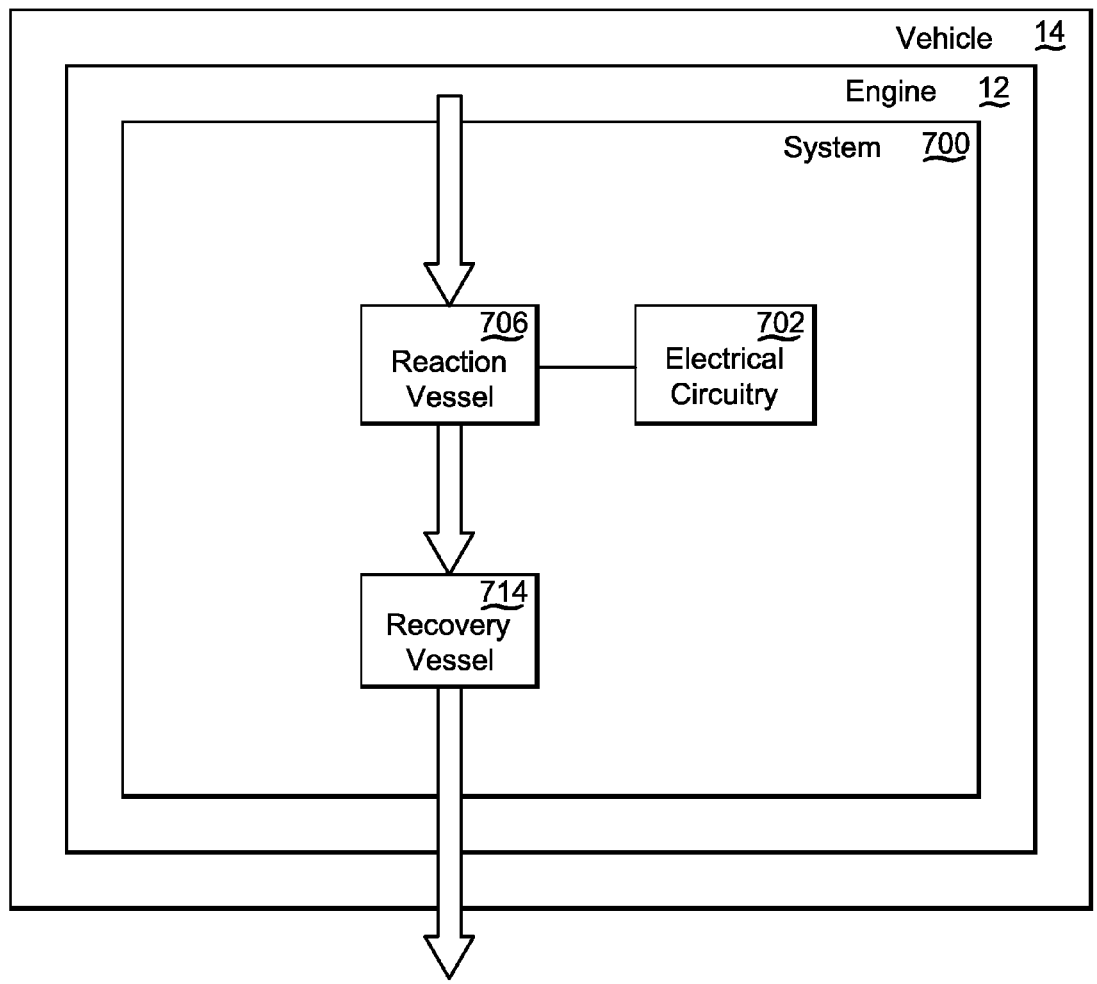

Referring now to FIG. 7F, in some embodiments the system 700 may include a separation vessel 712 that is configured to separate the removed carbon dioxide from the liquid solution. Separation details have been discussed above. In some other embodiments and referring now to FIG. 7G, the system 700 may include a recovery vessel 714 that is configured to recover the liquid solution. Recovery details have been discussed above.

Figure 7H:
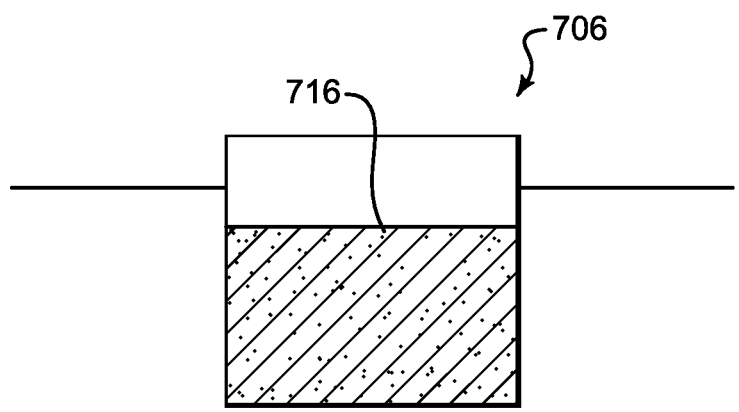
FIG. 7H is an illustration in partial schematic form of a component of the system of FIG. 7A.

Referring now to FIG. 7H, in some other embodiments the reaction vessel 706 may be configured to adsorb the carbon dioxide with an adsorption material 716. Details regarding the adsorption material have been discussed above.

Figure 7I:
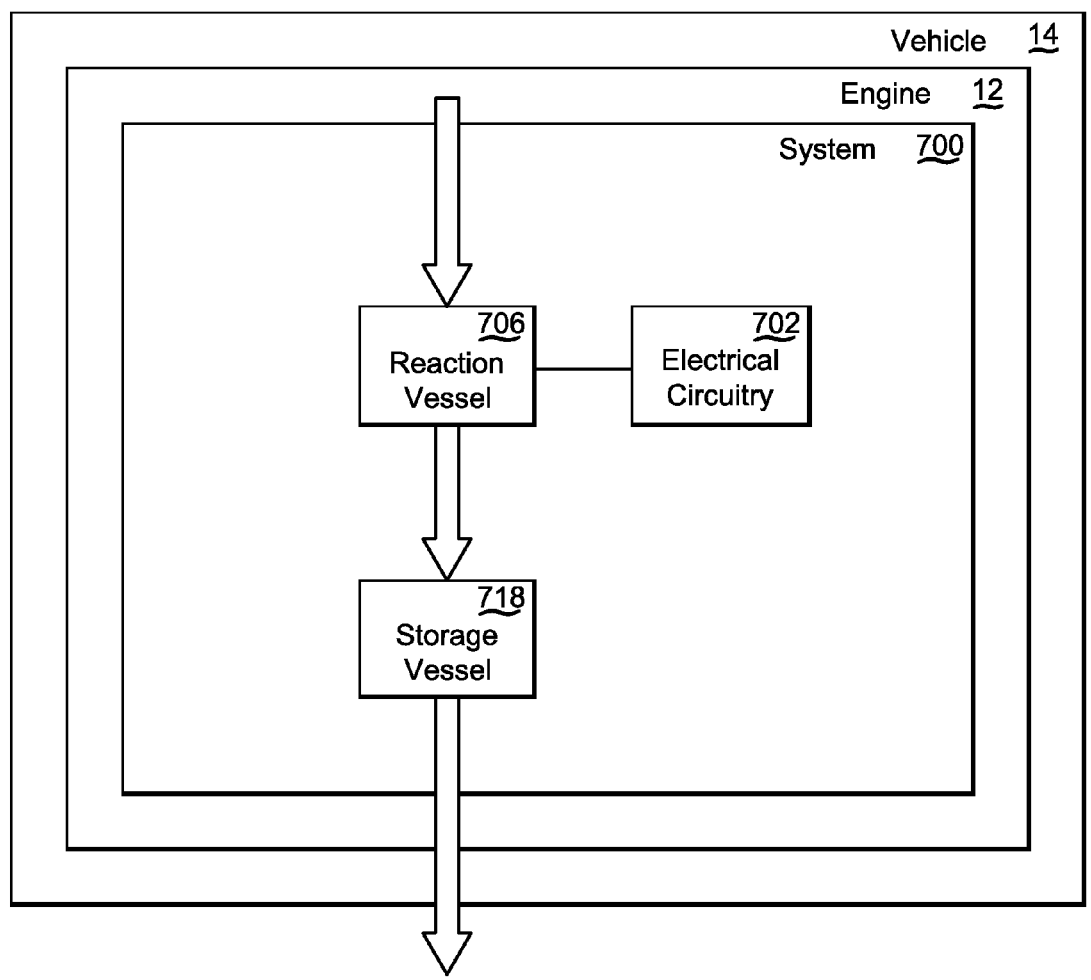
FIGS. 7I-7N are block diagrams of other illustrative systems.

Referring now to FIG. 7I, in some embodiments the system 700 may include a storage vessel 718 that is configured to store material that contains carbon associated with carbon dioxide removed from the combustion gas. Storage vessel details have been discussed above. In some embodiments the storage vessel 718 may be removable from the vehicle 14, and in some embodiments the storage vessel 718 may be removably replaceable on the vehicle 14. It will be appreciated that the storage vessel 718 may be any type of storage vessel as desired. Given by way of non-limiting examples, the storage vessel 718 may include without limitation a bottle, reservoir, tank, or the like. The storage vessel 718 may be sized as desired for a particular application. The storage vessel 718 may be made from any material as desired for a particular application.

Given by way of non-limiting example for illustration purposes only, in some embodiments the storage vessel 718 (that contains carbon associated with the carbon dioxide removed from the combustion gas) may be configured to be disposed off the vehicle 14. That is, in some cases the storage vessel 718 may be configured such that the storage vessel 718 may be removed from the vehicle 14 and brought to a collection or exchange facility that accepts containers (such as the storage vessel 718) that contain carbon associated with the carbon dioxide removed from the combustion gas. However, it will be appreciated that, in other applications, the storage vessel 718 need not be brought to such a collection or exchange facility.

It will be appreciated that various materials may contain carbon that is associated with the carbon dioxide removed from the combustion gas. For example, in applications in which no further processing is performed on the carbon dioxide removed from the combustion gas, the material that contains carbon associated with the carbon dioxide removed from the combustion gas may include carbon dioxide removed from the combustion gas. However, in other embodiments, the material that contains carbon associated with the carbon dioxide removed from the combustion gas may include at least one product of a chemical reaction (such as, without limitation sodium carbonate and sodium bicarbonate).

Figure 7J:
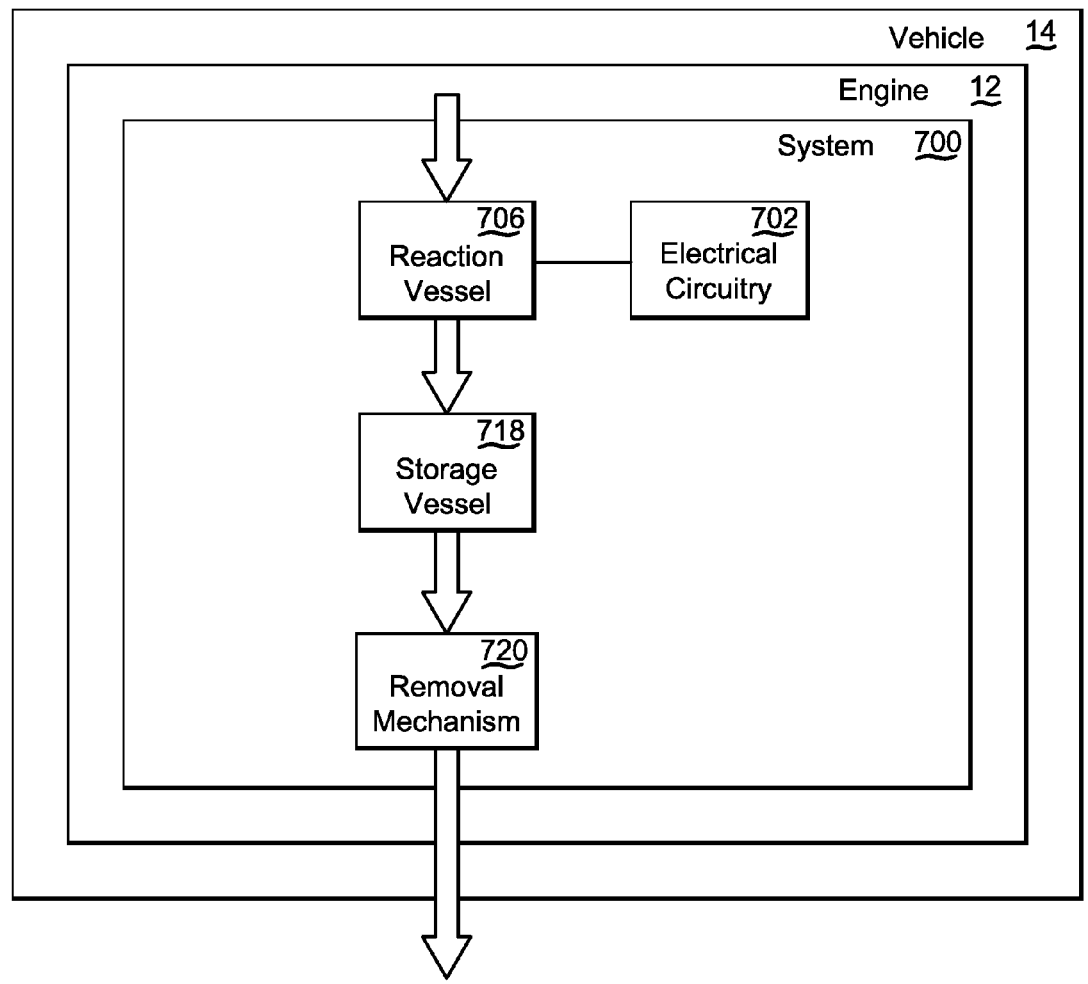

Referring now to FIG. 7J, in some embodiments the system 700 may include a removal mechanism 720 that is configured to remove the material that contains carbon associated with carbon dioxide removed from the combustion gas. In some embodiments, the removal mechanism 720 may include an outlet port. In some other embodiments, the removal mechanism may include a removably replaceable storage vessel configured to store the material that contains carbon associated with carbon dioxide removed from the combustion gas (such as removably replaceable embodiments of the storage vessel 718).

Figure 7K:
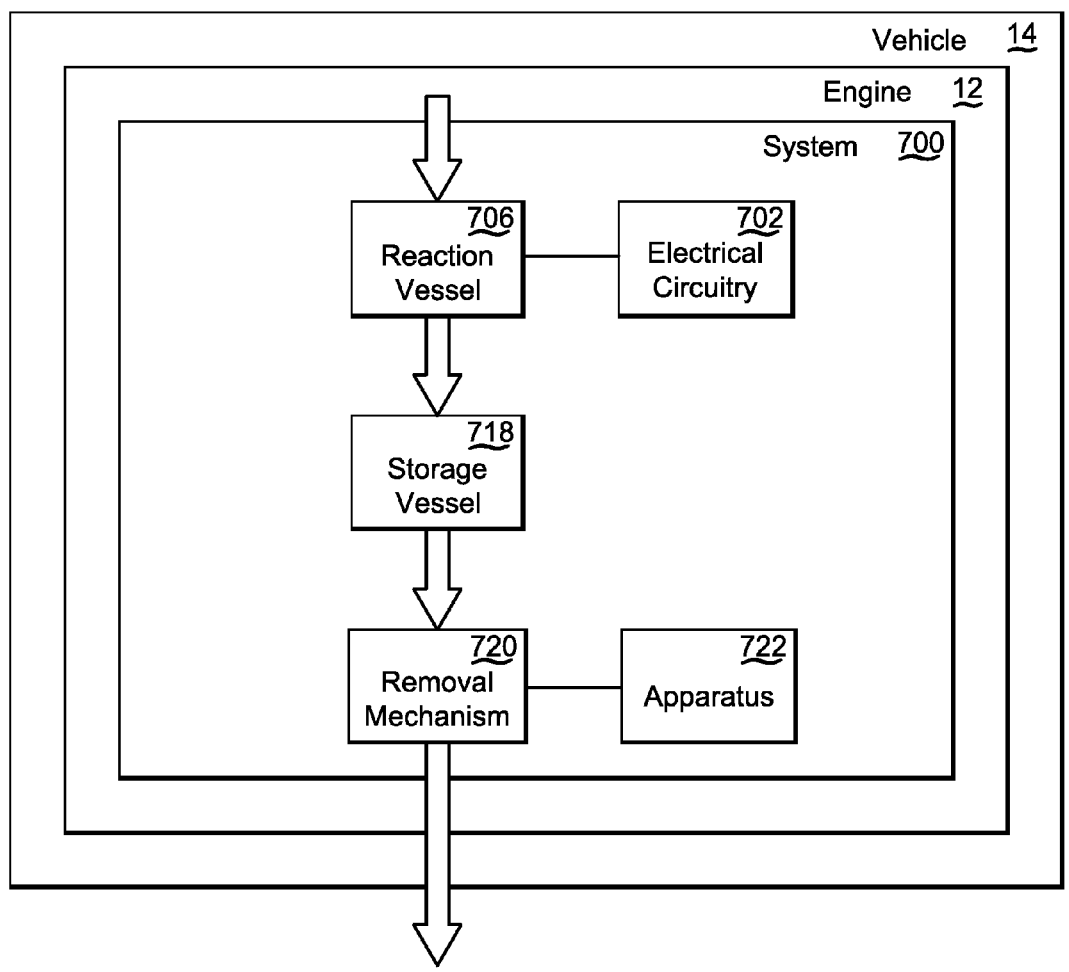

Referring now to FIG. 7K, in some embodiments the system 700 may include an apparatus 722 that is configured to determine an amount of carbon dioxide removed from the vehicle 14. For example, the apparatus 722 may be embodied as an electro-mechanical system having an appropriate sensor, such as a flow sensor or the like, associated with the removal mechanism 720 and electrical circuitry configured to determine an amount of carbon dioxide responsive to signals from the sensor.

Referring back to FIG. 7C, in some embodiments the at least one attribute may include price payable for carbon dioxide removed from the combustion gas. Given by way of nonlimiting examples, in various embodiments the price payable for the removed carbon dioxide may be: based upon an amount of carbon dioxide removed; based upon an amount of carbon removed; proportional to a predetermined carbon valuation factor; based upon a value of at least one factor such as position of a vehicle where the carbon dioxide is removed from the combustion gas, time when the carbon dioxide is removed from the combustion gas, identity of a user, and/or identity of a vehicle; and/or based upon a form in which material that contains carbon associated with carbon dioxide removed from the combustion gas is stored, such as without limitation carbon dioxide, a carbonate, a bicarbonate, and/or carbonic acid.

Figure 7L:
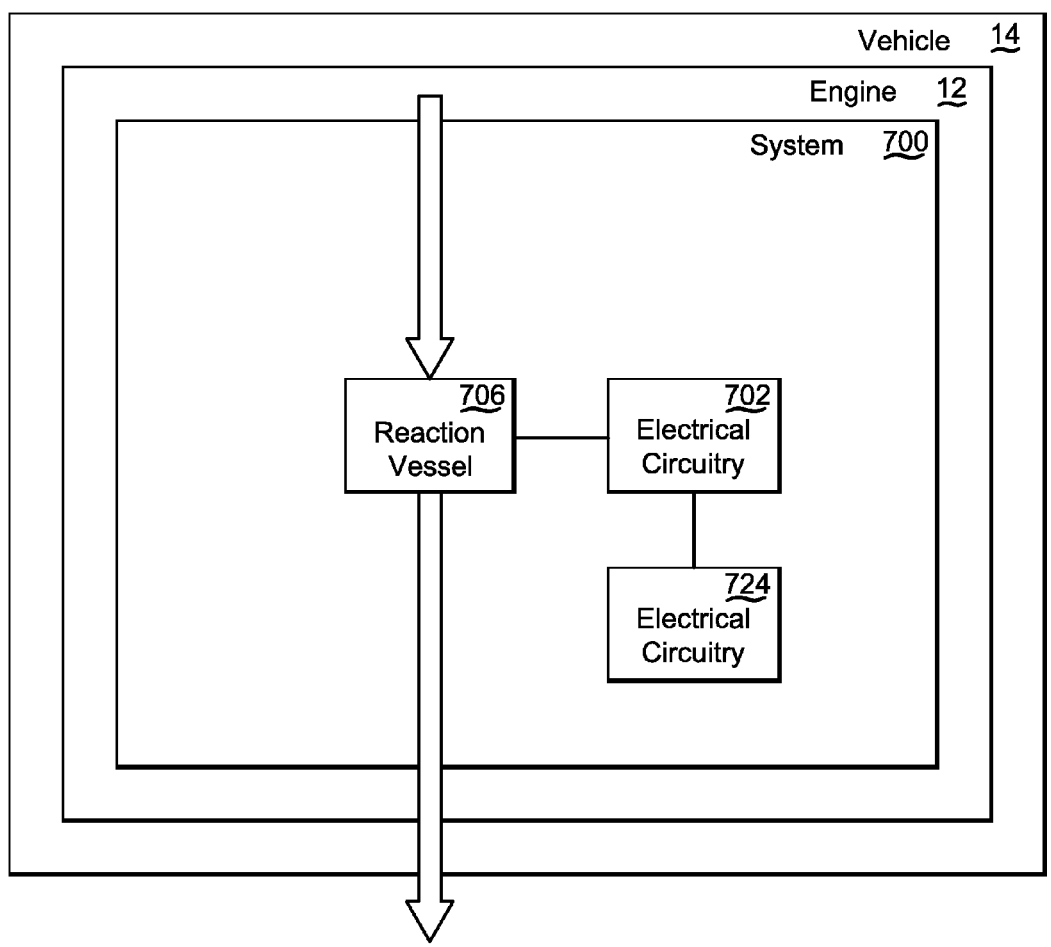

Referring now to FIG. 7L, in some embodiments the system 700 may include electrical circuitry 724 that is configured to allocate a value of the price payable for the removed carbon dioxide to an account. In some embodiments the account may be one of two or more accounts. Given by way of nonlimiting examples, the accounts may include: an account based upon position of a vehicle where the carbon dioxide is removed from the combustion gas; an account based upon time when the carbon dioxide is removed from the combustion gas; an account based upon identity of a user; and/or an account based upon identity of a vehicle. In some embodiments the account may include a database.

In some embodiments, the electrical circuitry 724 may be further configured to disburse at least a portion of the value of the price payable for the removed carbon dioxide from the account. In some other embodiments, the value of the price payable for carbon dioxide removed from two or more vehicles may be allocatable to the account.

Figure 7M:
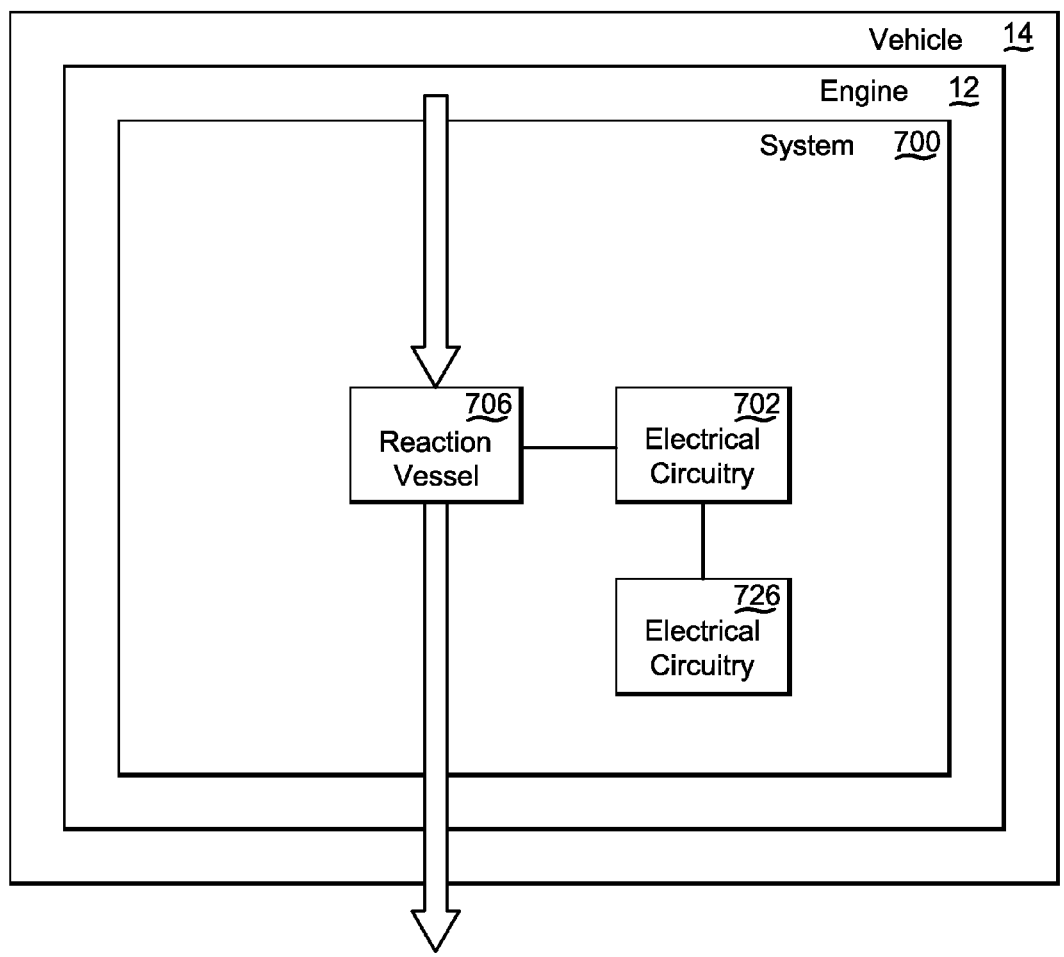

Referring now to FIG. 7M, in some embodiments the system 700 may include electrical circuitry 726 that is configured to communicate from the vehicle data indicative of value of the price payable for the removed carbon dioxide.

Figure 7N:
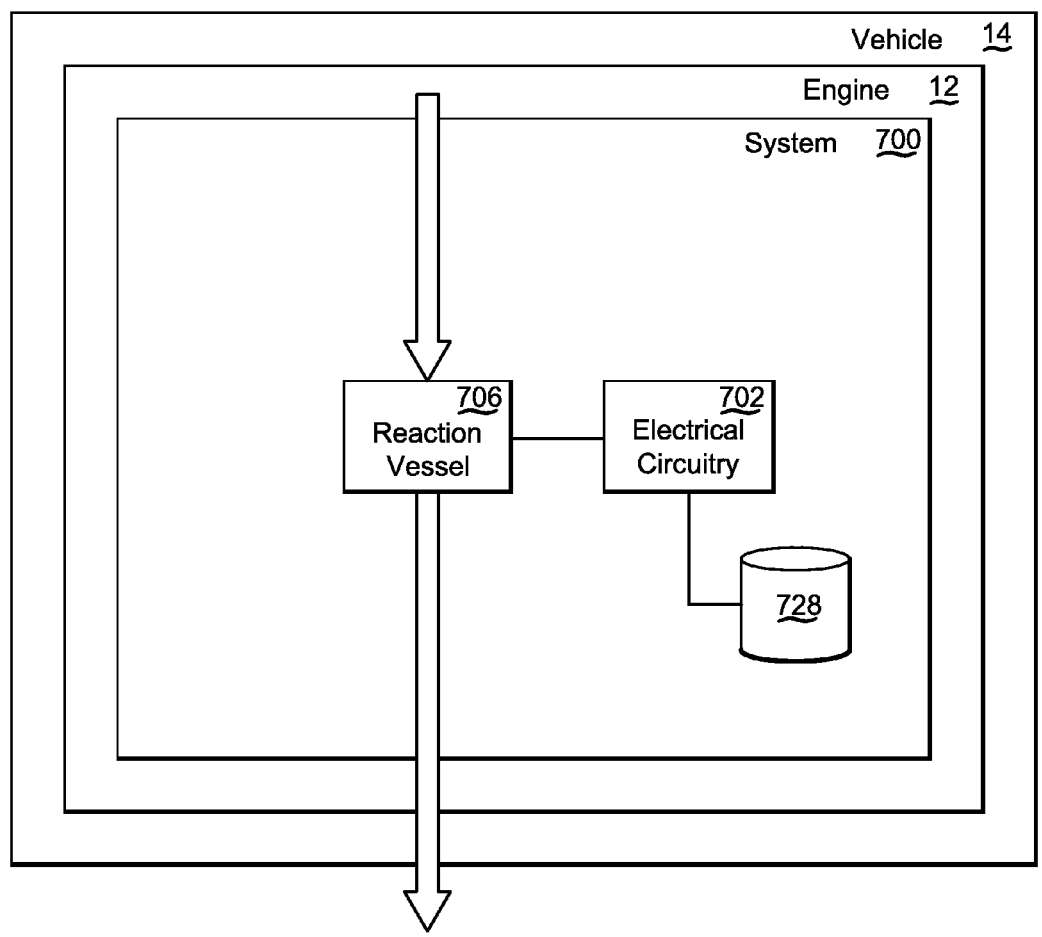

Referring now to FIG. 7N, in some embodiments the system 700 may include data storage 728 that is configured to store data indicative of value of the price payable for the removed carbon dioxide in a database. In some embodiments, the data storage 728 may include a relational database that is configured to store data indicative of value of the price payable for the removed carbon dioxide in association with at least one additional attribute such as position of a vehicle where the carbon dioxide is removed from the combustion gas, time when the carbon dioxide is removed from the combustion gas, identity of a user, and/or identity of a vehicle.

Figure 8A:
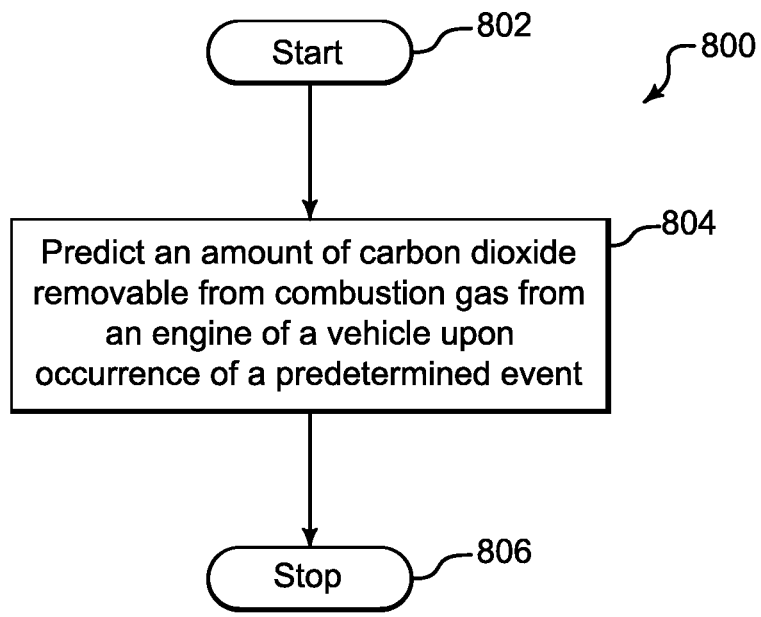
FIG. 8A is a flowchart of an illustrative method of managing carbon dioxide emissions from an engine of a vehicle.

Referring now to FIG. 8A, in some embodiments an illustrative method 800 is provided for managing carbon dioxide emissions from an engine of a vehicle. The method 800 starts at a block 802. An amount of carbon dioxide removable from combustion gas from an engine of a vehicle upon occurrence of a predetermined event is predicted at a block 804. The method 800 stops at a block 806.

Figure 8B:
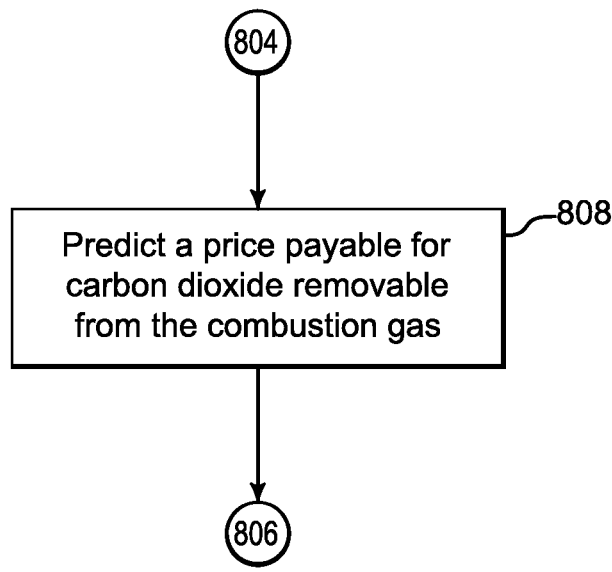
FIGS. 8B-8G are flowcharts of details of the method of FIG. 8A.

Referring additionally to FIG. 8B, in some embodiments a price payable for carbon dioxide removable from the combustion gas may be predicted at a block 808. In some embodiments the predetermined event may include a predetermined time. In some other embodiments the predetermined event may include arrival of the vehicle at a predetermined location.

Figure 8C:
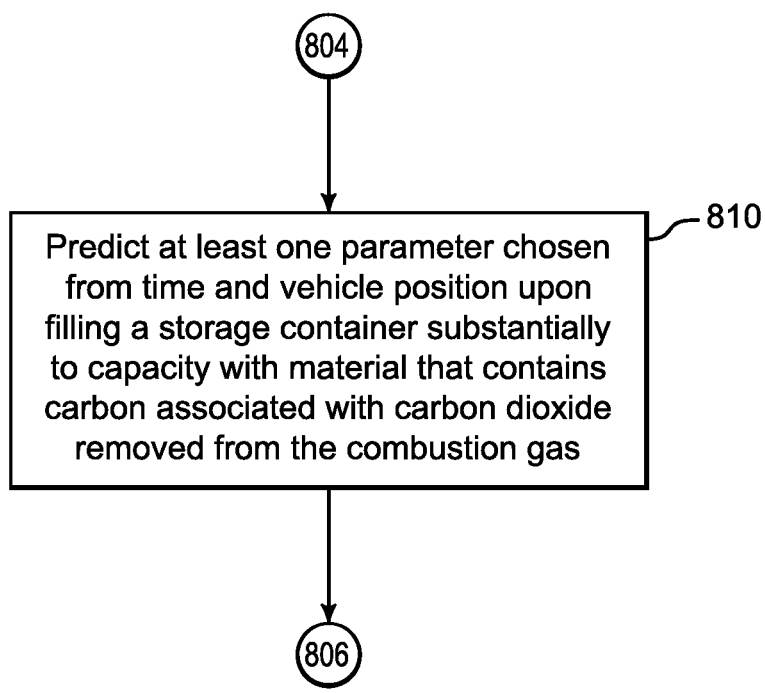

Referring now to FIGS. 8A and 8C, in some embodiments at least one parameter chosen from time and vehicle position upon filling a storage container substantially to capacity with material that contains carbon associated with carbon dioxide removed from the combustion gas may be predicted at a block 810.

Figure 8D:
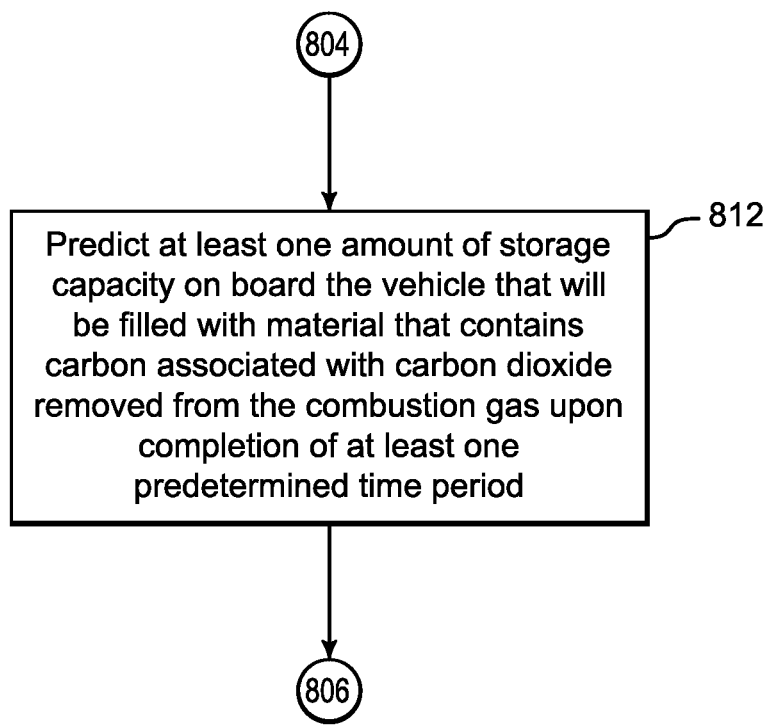
Figure 8E:
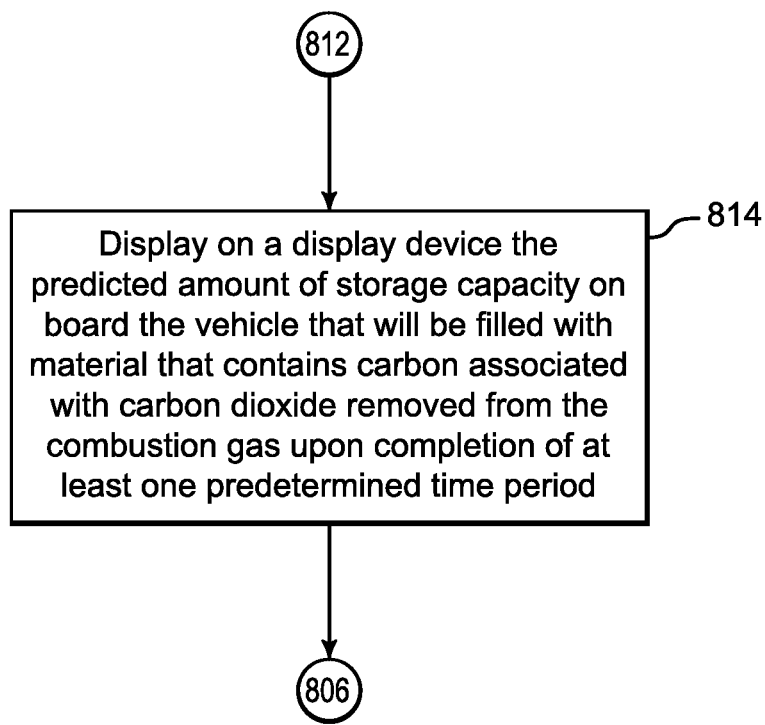

Referring now to FIGS. 8A and 8D, in some embodiments at least one amount of storage capacity on board the vehicle that will be filled with material that contains carbon associated with carbon dioxide removed from the combustion gas upon completion of at least one predetermined time period may be predicted at a block 812. Referring additionally to FIG. 8E, in some embodiments the predicted amount of storage capacity on board the vehicle that will be filled with material that contains carbon associated with carbon dioxide removed from the combustion gas upon completion of at least one predetermined time period may be displayed on a display device at a block 814.

Figure 8F:
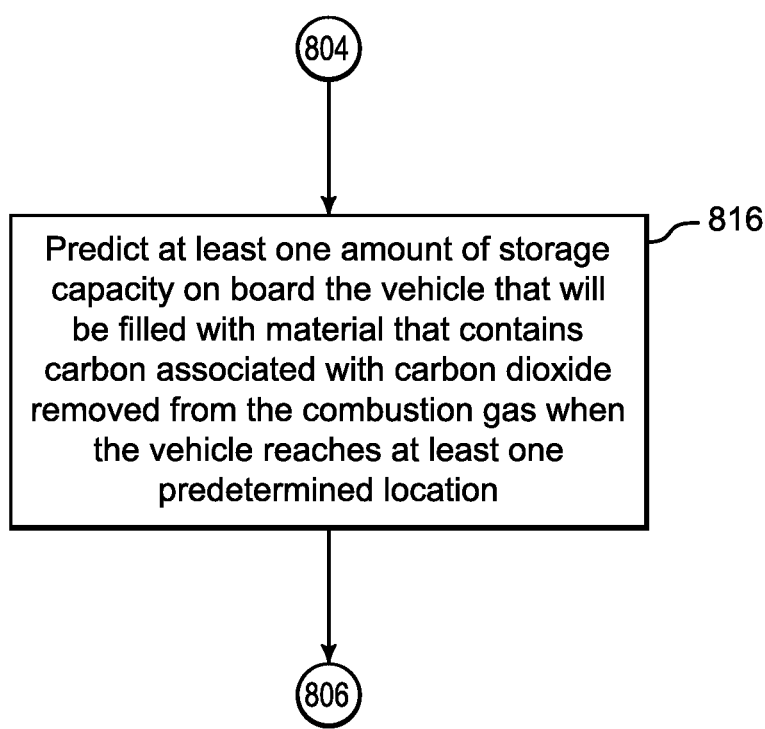
Figure 8G:
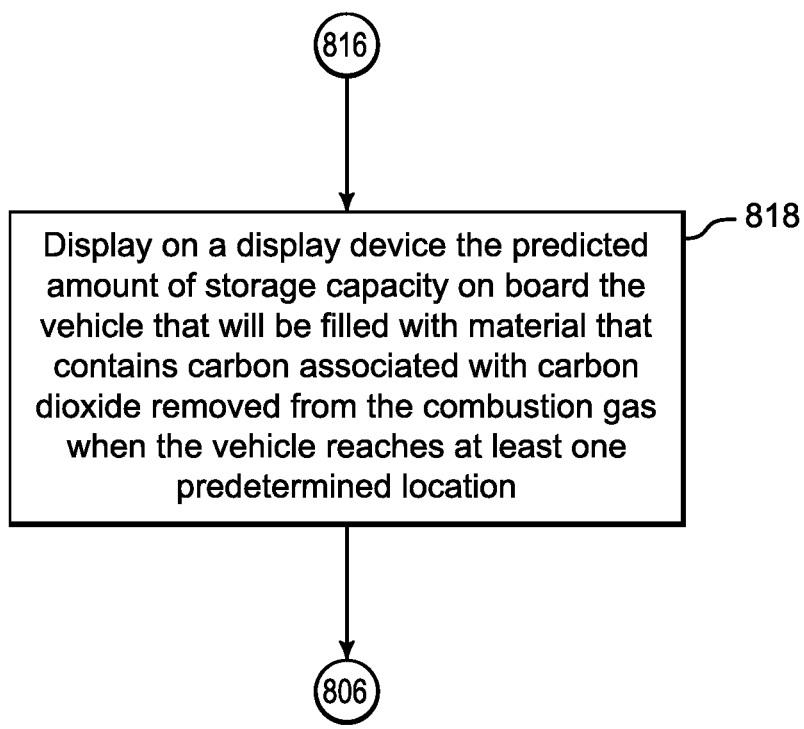

Referring now to FIGS. 8A and 8F, in some embodiments at least one amount of storage capacity on board the vehicle that will be filled with material that contains carbon associated with carbon dioxide removed from the combustion gas when the vehicle reaches at least one predetermined location may be predicted at a block 816. Referring additionally to FIG. 8G, the predicted amount of storage capacity on board the vehicle that will be filled with material that contains carbon associated with carbon dioxide removed from the combustion gas when the vehicle reaches at least one predetermined location may be displayed on a display device at a block 818.

Figure 9A:
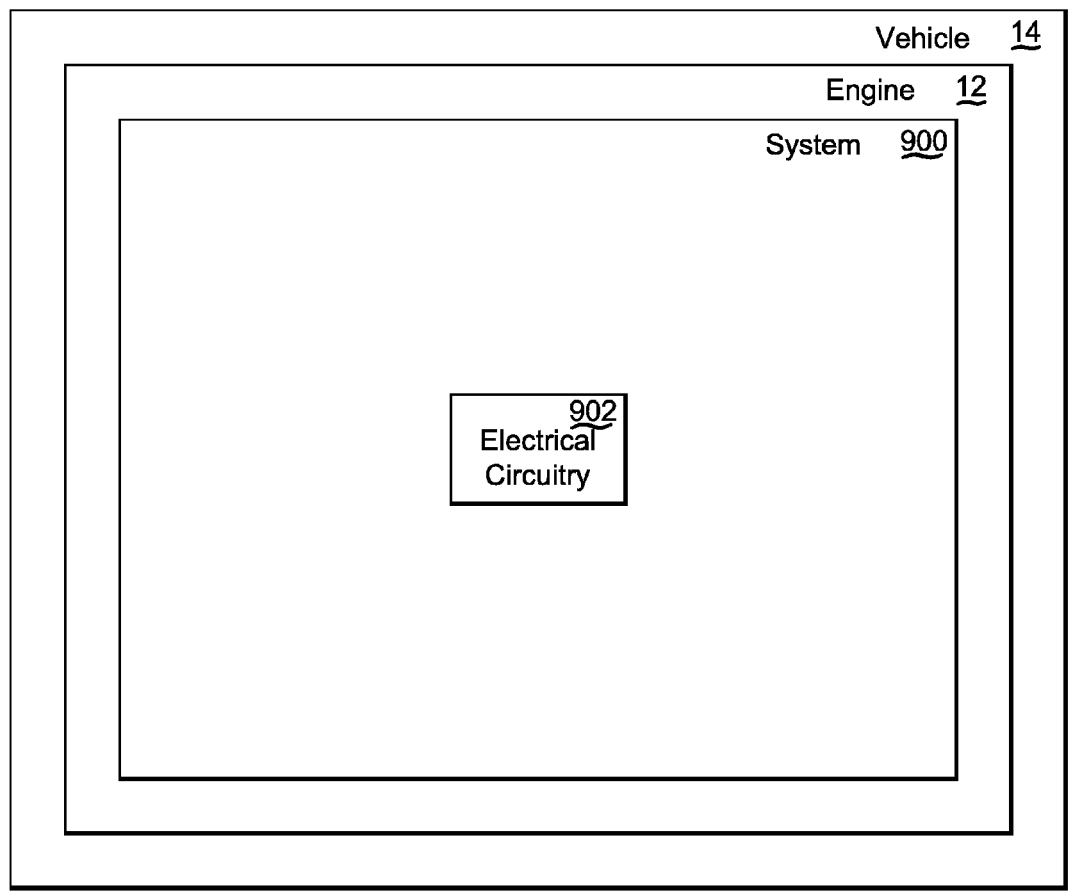
FIG. 9A is a block diagram of an illustrative system for managing carbon dioxide emissions from an engine of a vehicle.

Referring now to FIG. 9A, in some embodiments an illustrative system 900 is provided for managing carbon dioxide emissions from an engine of a vehicle. The system 900 includes electrical circuitry 902 that is configured to predict an amount of carbon dioxide removable from combustion gas from an engine 12 of a vehicle 14 upon occurrence of a predetermined event. In some embodiments the predetermined event may include a predetermined time. In some other embodiments the predetermined event may include arrival of the vehicle at a predetermined location.

Figure 9B:
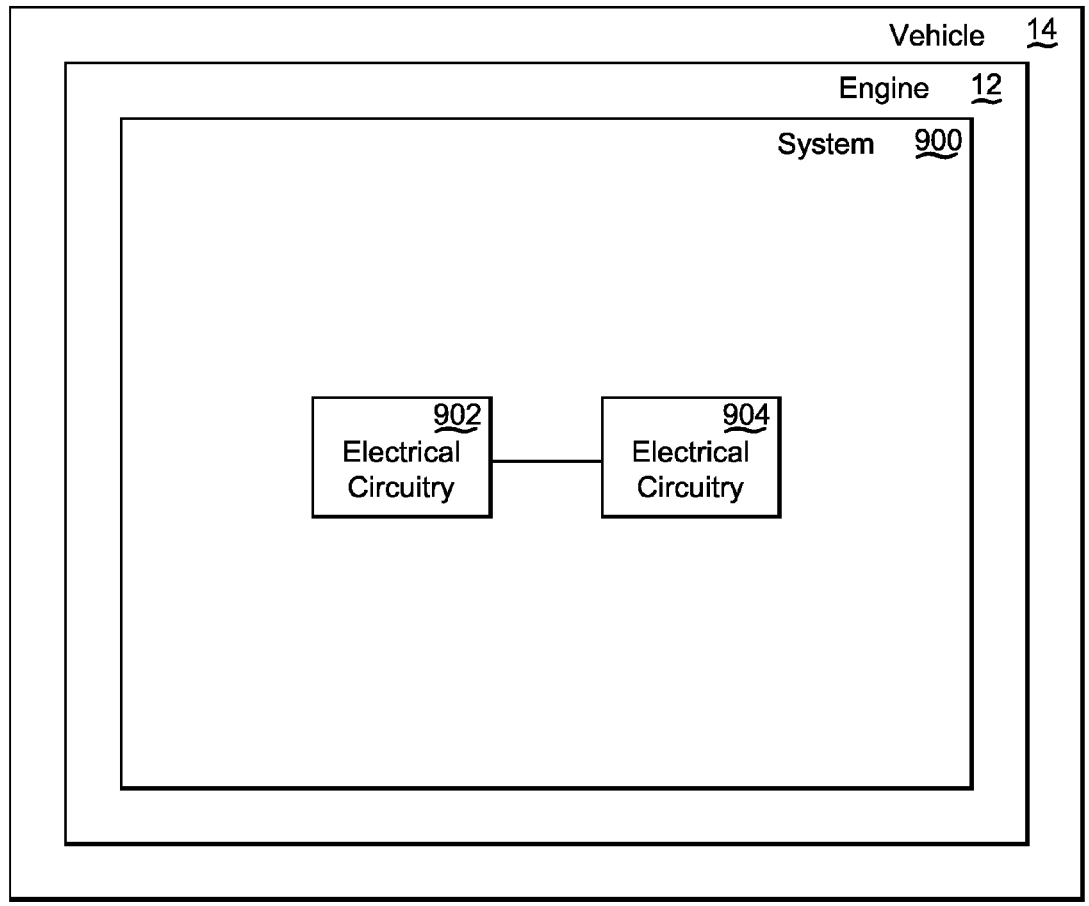
FIGS. 9B-9G are block diagrams of other illustrative systems for managing carbon dioxide emissions from an engine of a vehicle.

Referring additionally to FIG. 9B, in some embodiments the system 900 may include electrical circuitry 904 that is configured to predict a price payable for carbon dioxide removable from the combustion gas.

Figure 9C:
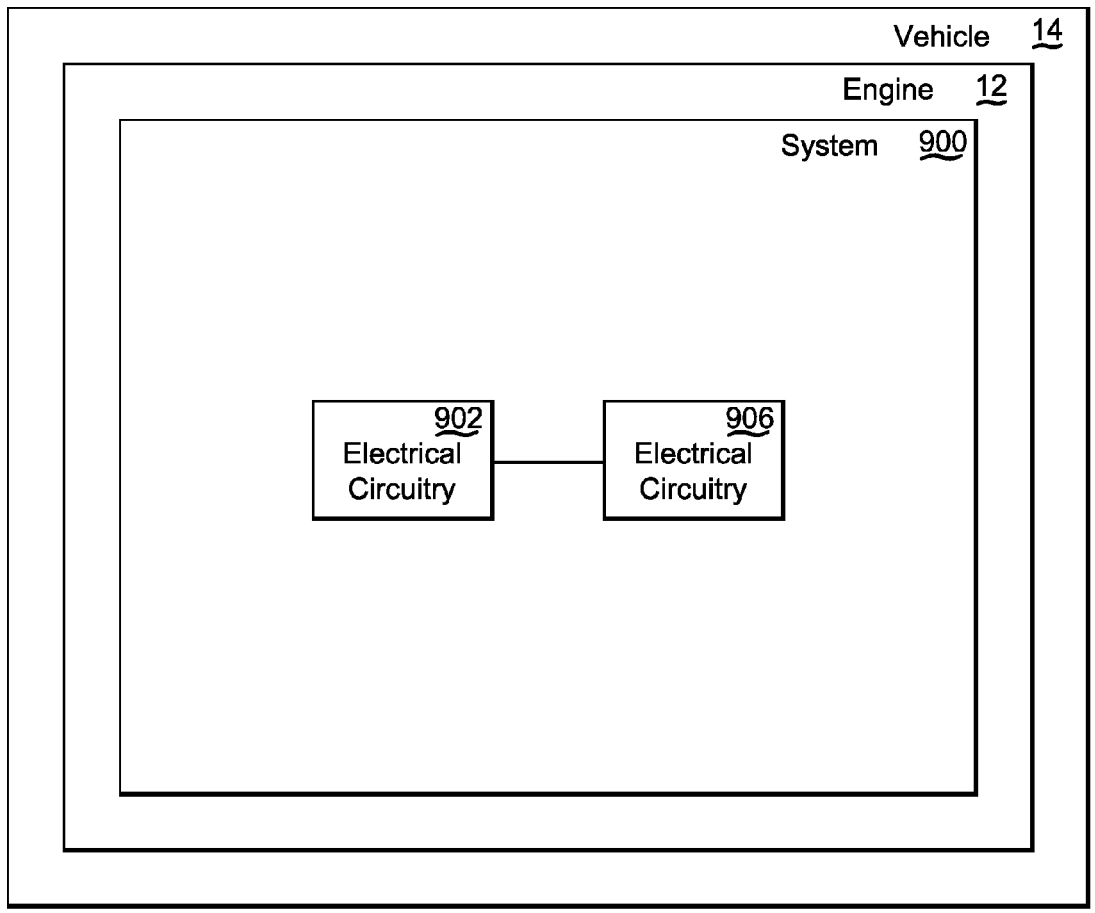

Referring now to FIGS. 9A and 9C, in some embodiments the system 900 may include electrical circuitry 906 that is configured to predict at least one parameter chosen from time and vehicle position upon filling a storage container substantially to capacity with material that contains carbon associated with carbon dioxide removed from the combustion gas.

Figure 9D:
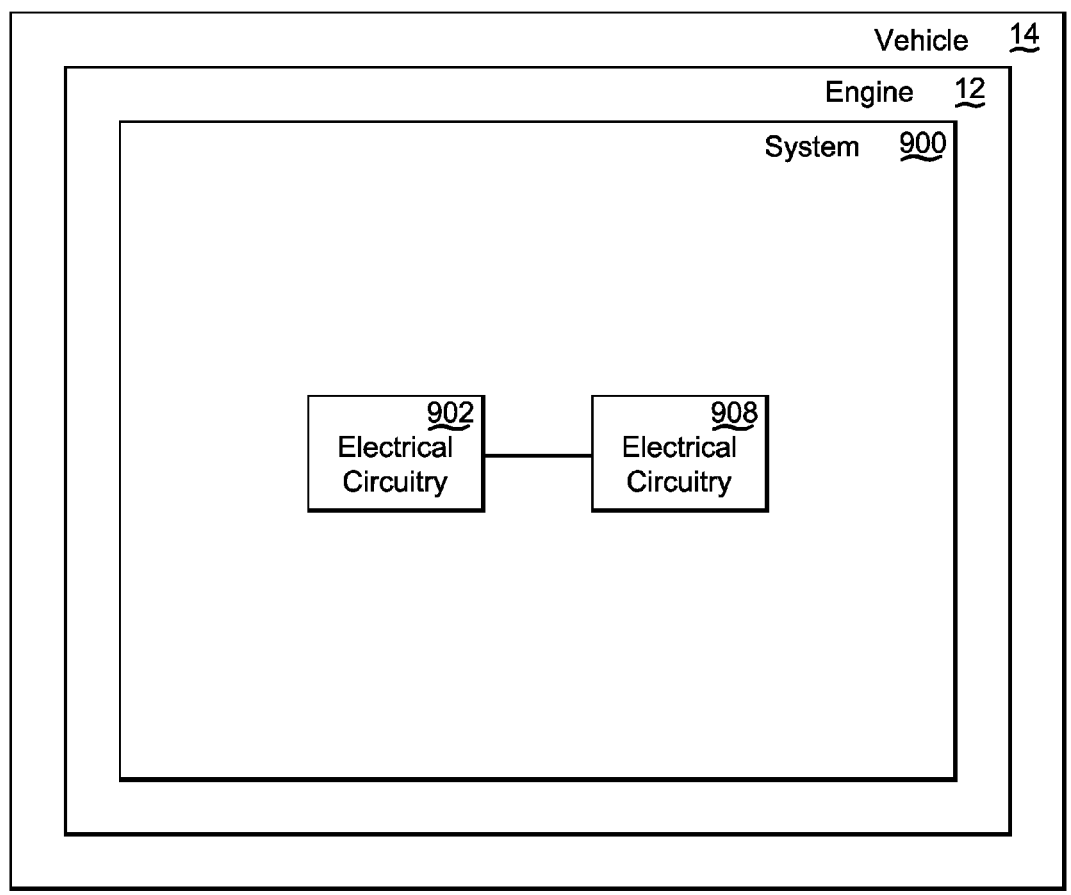

Referring now to FIGS. 9A and 9D, in some embodiments the system 900 may include electrical circuitry 908 that is configured to predict at least one amount of storage capacity on board the vehicle that will be filled with material that contains carbon associated with carbon dioxide removed from the combustion gas upon completion of at least one predetermined time period.

Figure 9E:
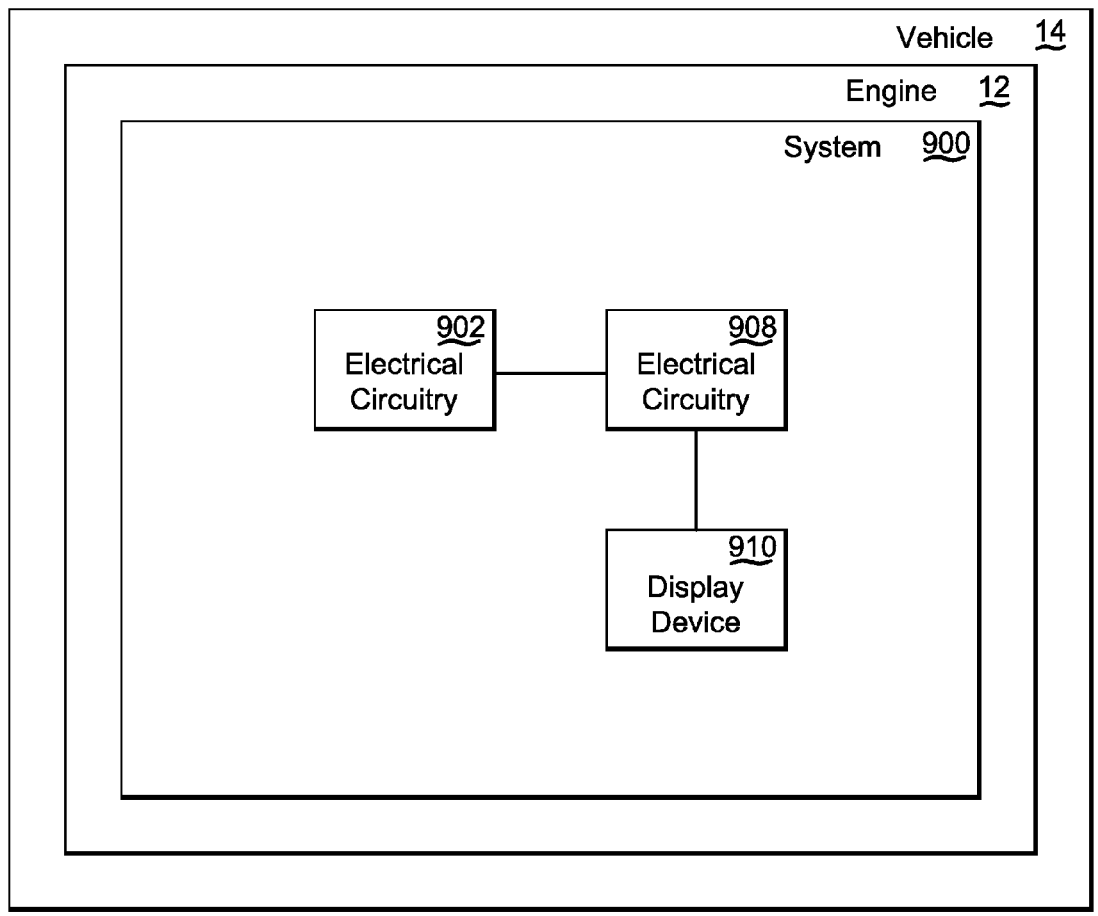

Referring additionally to FIG. 9E, in some embodiments a display device 910 may be configured to display the predicted amount of storage capacity on board the vehicle that will be filled with material that contains carbon associated with carbon dioxide removed from the combustion gas upon completion of at least one predetermined time period.

Figure 9F:
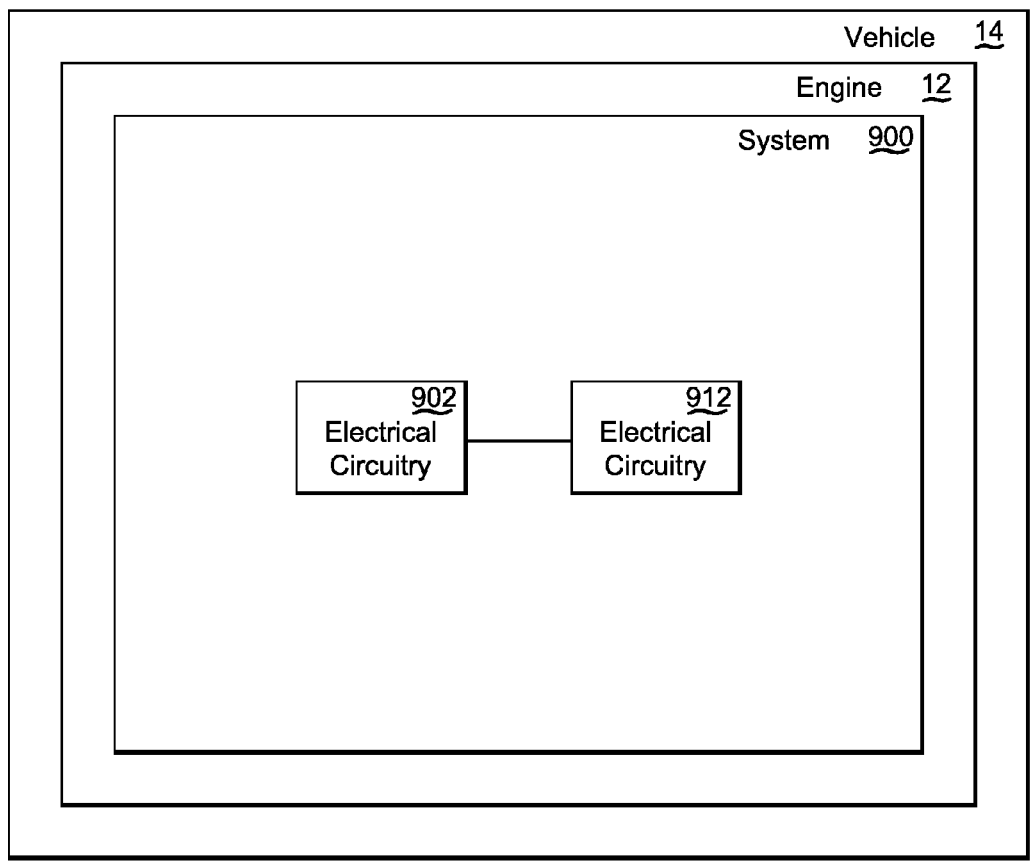

Referring now to FIGS. 9A and 9F, in some embodiments the system 900 may include electrical circuitry 912 that is configured to predict at least one amount of storage capacity on board the vehicle that will be filled with material that contains carbon associated with carbon dioxide removed from the combustion gas when the vehicle reaches at least one predetermined location.

Figure 9G:
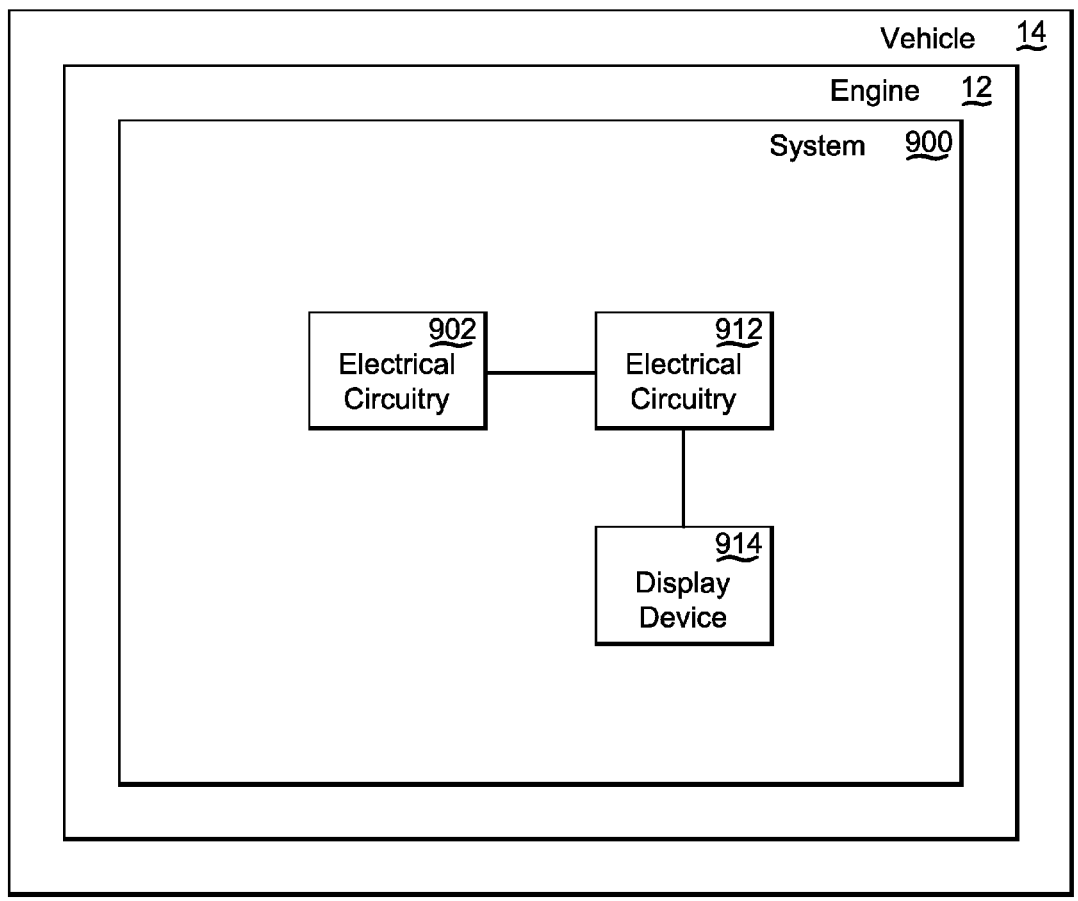

Referring additionally to FIG. 9G, in some embodiments a display device 914 may be configured to display the predicted amount of storage capacity on board the vehicle that will be filled with material that contains carbon associated with carbon dioxide removed from the combustion gas when the vehicle reaches at least one predetermined location.

Figure 10A:
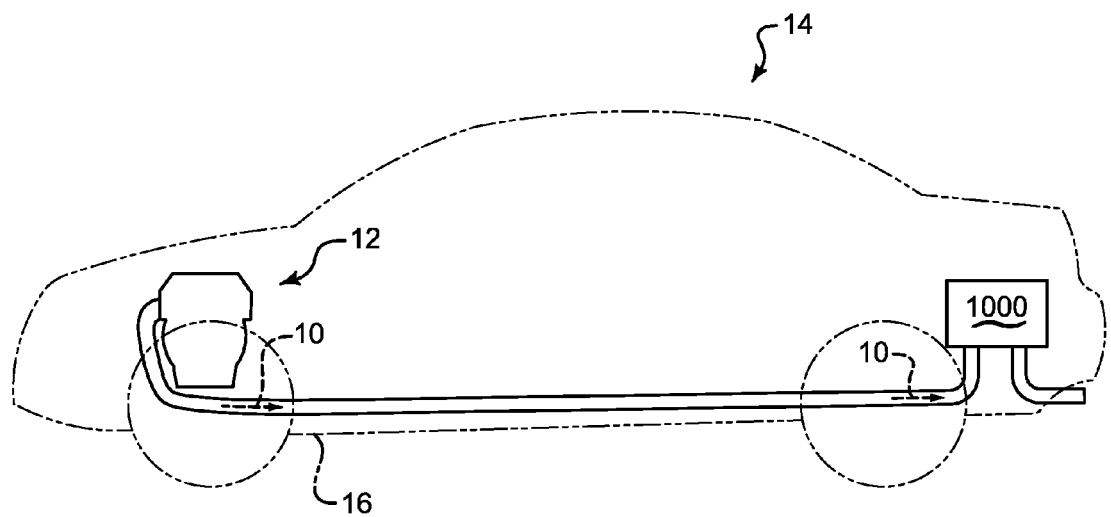
FIG. 10A is an illustration in partial schematic form of another illustrative vehicle.
Figure 10B:
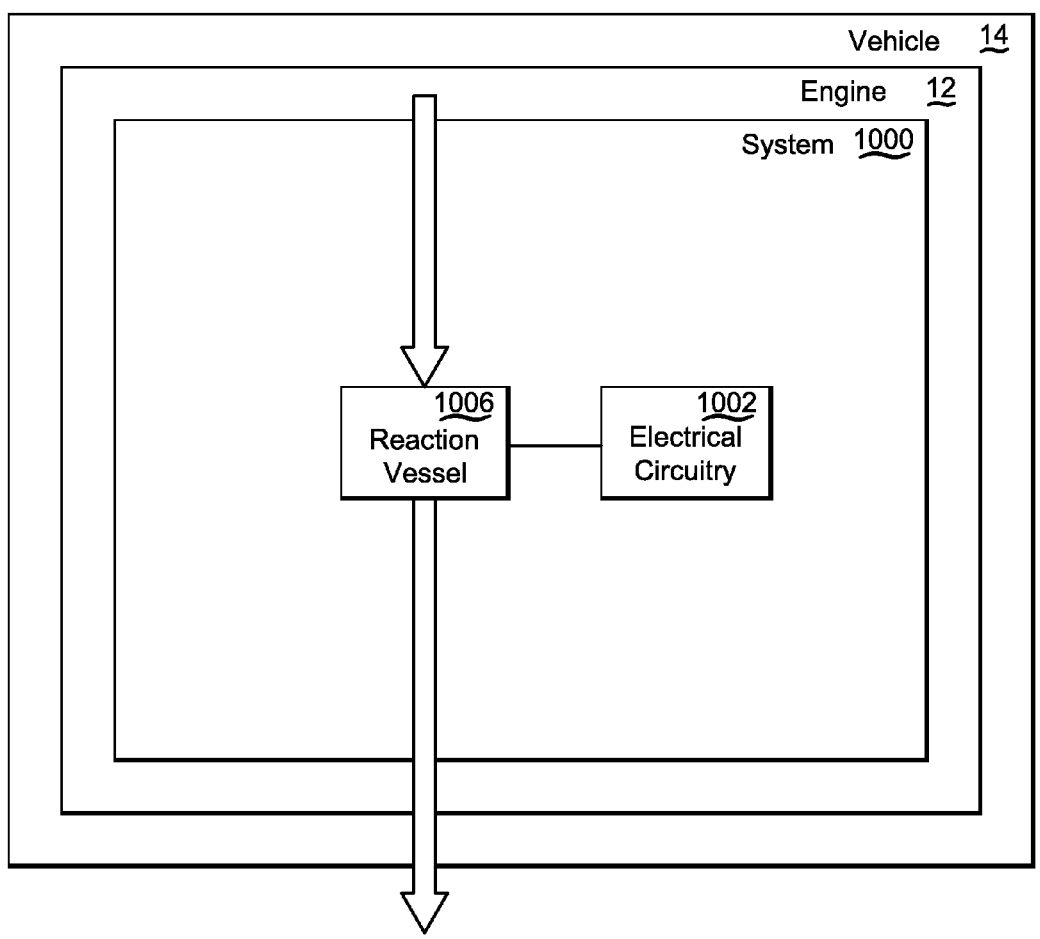
FIG. 10B is a block diagram of an illustrative system for managing carbon dioxide emissions from an engine of the vehicle of FIG. 10A.

Referring now to FIGS. 10A and 10B, in some embodiments an illustrative vehicle 14 is provided. The vehicle 14 includes a vehicle frame 16. An engine 12 is disposed on the vehicle frame 16. Details of the engine 12 and vehicle types have been discussed above.

A system 1000 is provided for managing carbon dioxide emissions from the engine 12. The system 1000 includes electrical circuitry 1002 that is configured to determine a value of at least one attribute regarding removal of carbon dioxide from combustion gas from the engine 12. The system 1000 also includes a reaction vessel 1006 that is configured to remove carbon dioxide from the combustion gas when the value of the at least one attribute meets a predetermined criterion.

In various embodiments the at least one attribute may include any one or more attributes as desired, such as without limitation: position of a vehicle where the carbon dioxide is removed from the combustion gas; time when the carbon dioxide is removed from the combustion gas; governmental regulations regarding removing carbon dioxide from combustion gas from an engine of a vehicle; an amount of pollution in air drawn into the engine; monetary value of the removed carbon dioxide; and/or an amount of storage capacity available on the vehicle to store material that contains carbon associated with carbon dioxide removed from the combustion gas.

In various other embodiments, the attribute may include a predetermined amount of material that contains carbon associated with carbon dioxide removed from the combustion gas that can be stored in a predetermined time period. For example, in some embodiments the predetermined time period may correspond to a time period for the vehicle to travel to a predetermined location configured for offloading material that contains carbon associated with carbon dioxide removed from the combustion gas.

In other embodiments the attribute may include a predetermined amount of material that contains carbon associated with carbon dioxide removed from the combustion gas that can be stored in a predetermined range of distance travelable by the vehicle. For example, the distance travelable may be associated with a distance to a predetermined location of a facility that is configured to receive the stored material that contains carbon associated with carbon dioxide removed from the combustion gas. As another example, the distance travelable may be associated with an amount of fuel remaining onboard the vehicle.

In various other embodiments, the attribute may include: identity of the vehicle; an amount of carbon dioxide removed from the combustion gas; an amount of stored material that contains carbon associated with carbon dioxide removed from the combustion gas; and/or form of stored material that contains carbon associated with carbon dioxide removed from the combustion gas.

In some embodiments, the attribute may include capacity of a facility to receive material that contains carbon associated with carbon dioxide removed from the combustion gas. For example, in some applications capacity of a facility may include storage capacity to store material that contains carbon associated with carbon dioxide removed from the combustion gas. In some other applications, capacity of a facility may include electrical capacity to process material that contains carbon associated with carbon dioxide removed from the combustion gas.

In some embodiments, the attribute may include: identity of a user; at least one incentive factor selected to incentivize removal of carbon dioxide; an amount of carbon dioxide removed within a predetermined time period; an amount of carbon dioxide removed within a predetermined geographic region; an amount of carbon dioxide removed by a predetermined user; and/or an amount of carbon dioxide removed from the vehicle.

In various embodiments, the attribute may include a vehicle mode defined by at least one modifiable parameter. For example, the modifiable parameter may include at least one modifiable setting of the engine, such as without limitation richness of a fuel-air mixture. As further examples, the modifiable parameter may include type of fuel and/or a modifiable setting of a catalytic converter, such as without limitation temperature of the combustion gas.

In some embodiments, the attribute may include a characteristic of the combustion gas, such as without limitation temperature and/or pressure of the combustion gas and/or composition of the combustion gas. In some other embodiments the attribute may include a ratio of rate of removal of carbon dioxide to rate of generation of carbon dioxide.

In some embodiments, the reaction vessel 1006 may be configured to automatically remove carbon dioxide from the combustion gas responsive to the electrical circuitry 1002 when the value of the attribute meets a predetermined criterion.

Figure 10C:
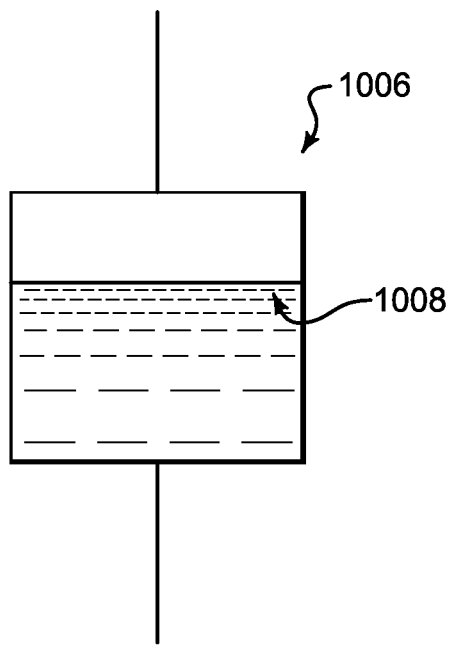
FIGS. 10C-10D are illustrations in partial schematic form of components of the system of FIG. 10B.
Figure 10D:
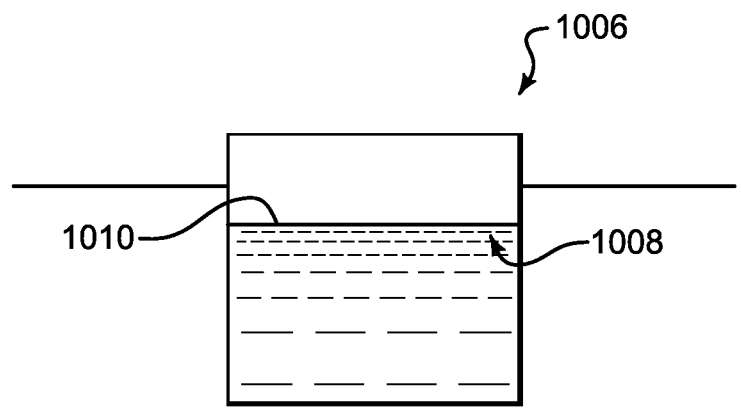

Referring additionally to FIGS. 10C and 10D, in some embodiments the reaction vessel 1006 may be configured to absorb the carbon dioxide in a liquid solution 1008. In some embodiments and as shown in FIG. 10C, the reaction vessel 1006 may be configured to pass the combustion gas through the liquid solution 1008. In some other embodiments and as shown in FIG. 10D, the reaction vessel 1006 may be configured to pass the combustion gas over a surface 1010 of the liquid solution 1008.

Figure 10E:
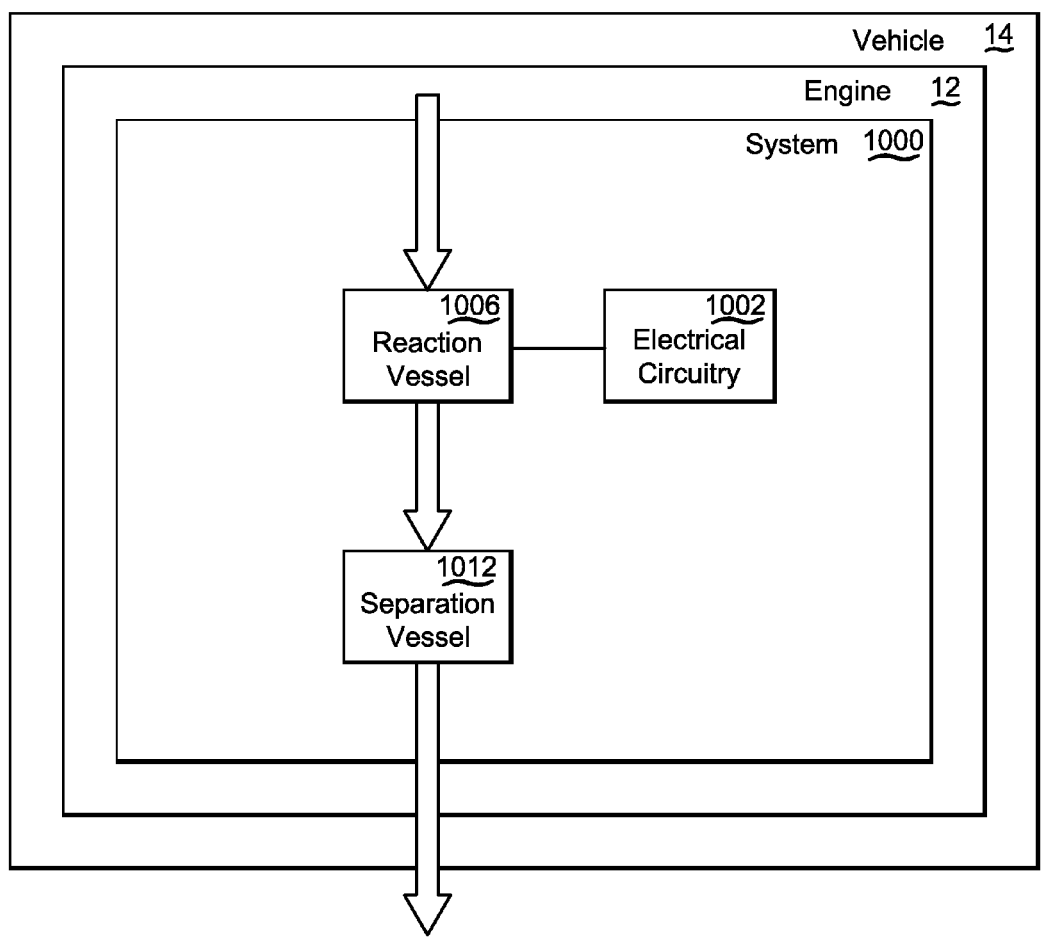
FIGS. 10E-10F are block diagrams of other illustrative systems for managing carbon dioxide emissions from an engine of the vehicle of FIG. 10A.
Figure 10F:
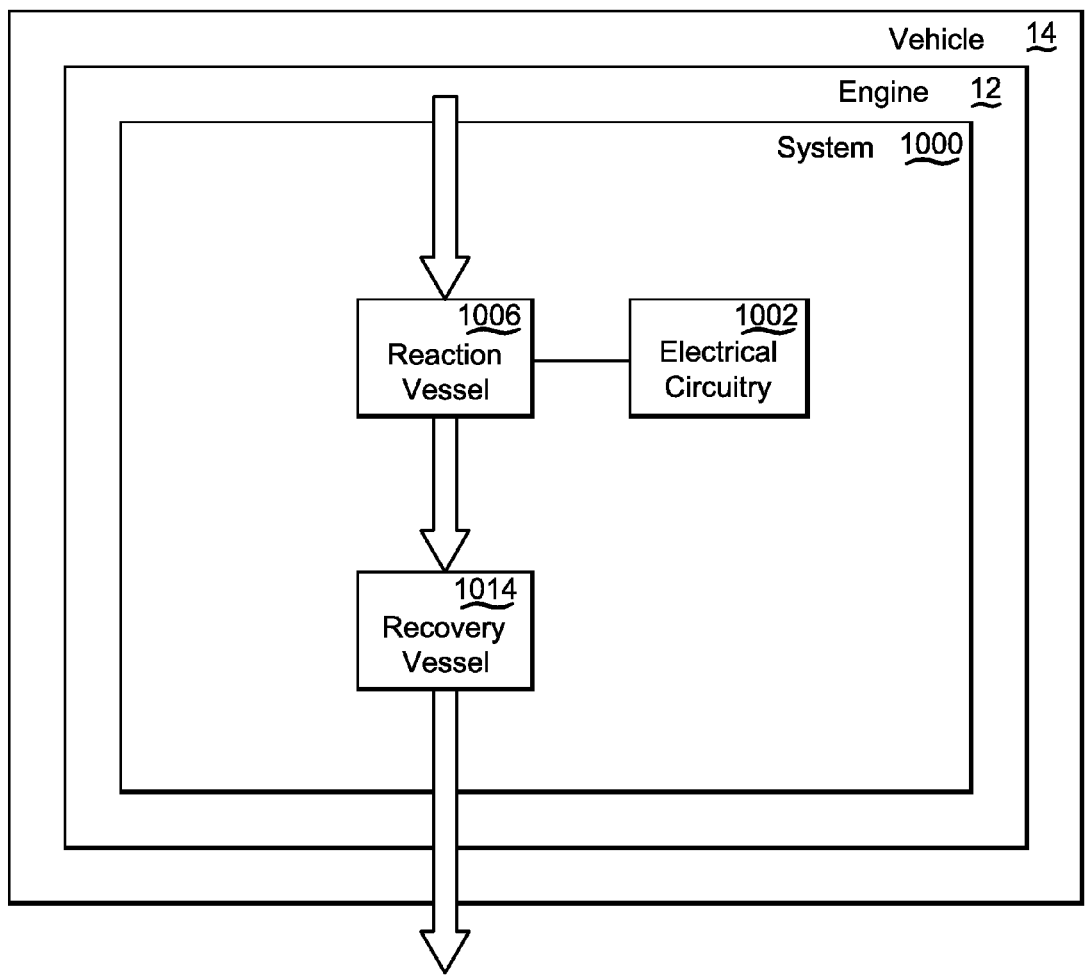

Referring now to FIG. 10E, in some embodiments the system 1000 may include a separation vessel 1012 that is configured to separate the removed carbon dioxide from the liquid solution. Referring now to FIG. 10F, in some embodiments the system 1000 may include a recovery vessel 1014 that is configured to recover the liquid solution.

Figure 10G:
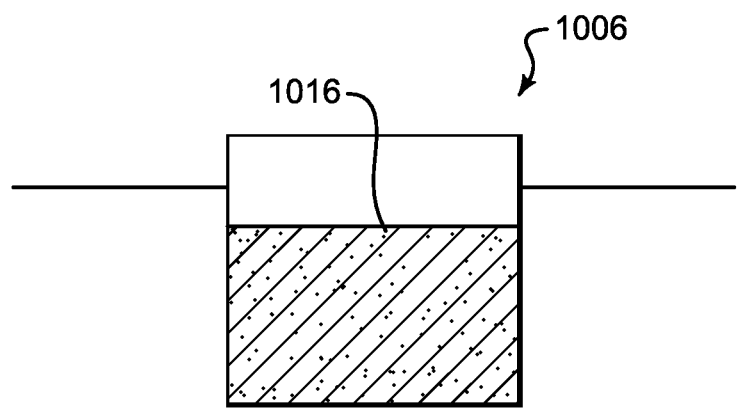
FIG. 10G is an illustration in partial schematic form of a component of the system of FIG. 10B.

Referring now to FIG. 10G, in some embodiments the reaction vessel 1006 may be configured to adsorb the carbon dioxide with an adsorption material 1016.

Figure 10H:
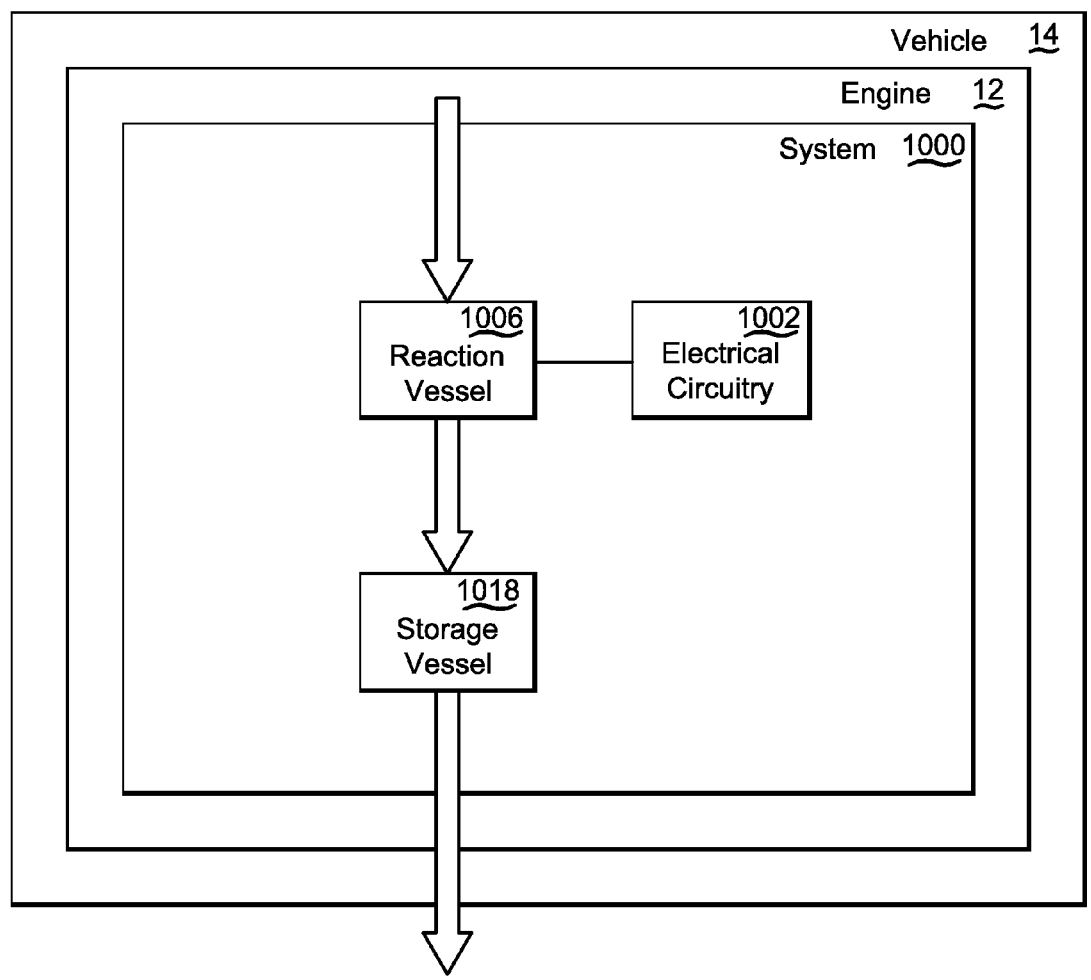
FIGS. 10H-10M are block diagrams of other illustrative systems for managing carbon dioxide emissions from an engine of the vehicle of FIG. 10A.

Referring now to FIG. 10H, in some embodiments the system 1000 may include a storage vessel 1018 that is configured to store material that contains carbon associated with carbon dioxide removed from the combustion gas.

In some embodiments, the material that contains carbon associated with carbon dioxide removed from the combustion gas includes carbon dioxide removed from the combustion. However, in some other embodiments the material that contains carbon associated with carbon dioxide removed from the combustion gas may include at least one product of a chemical reaction.

In some embodiments, the storage vessel 1018 may be removably replaceable.

Figure 10I:
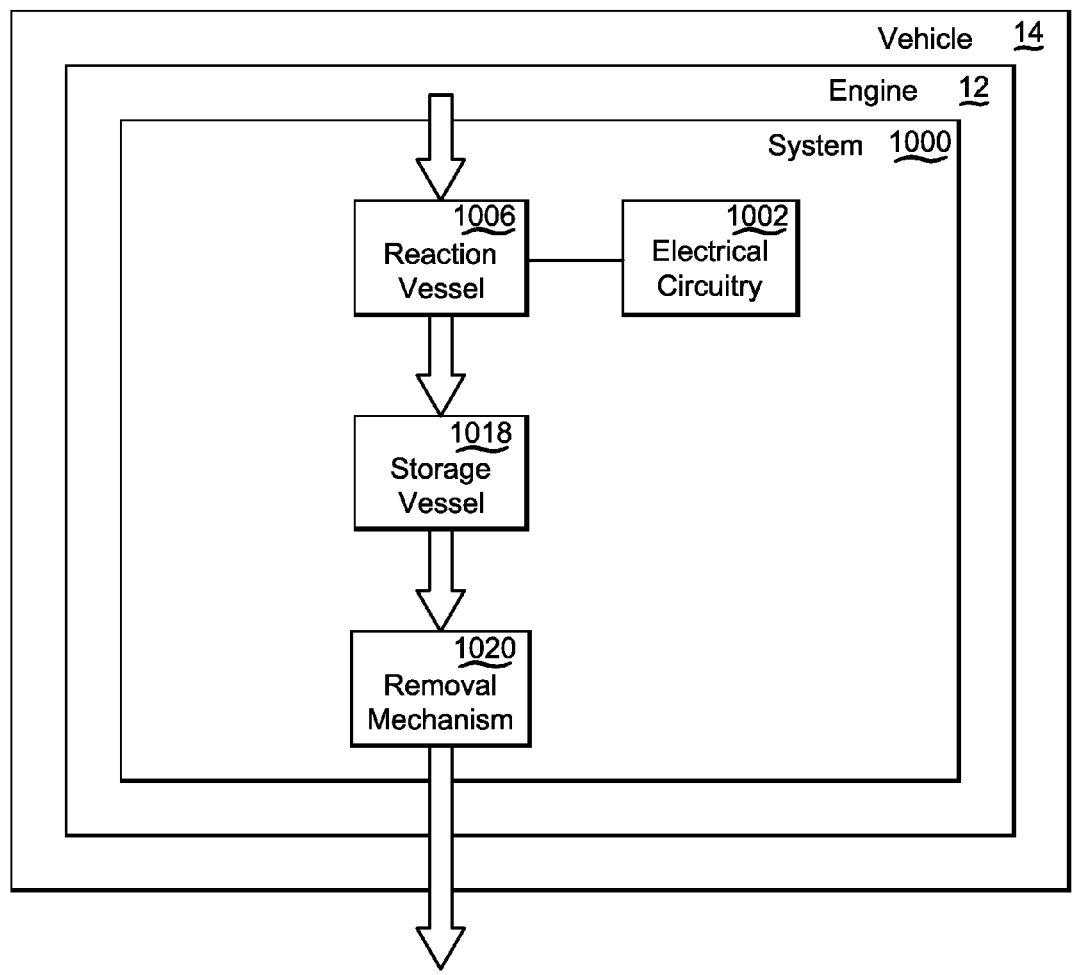

Referring now to FIG. 10I, in some embodiments the system 1000 may include a removal mechanism 1020 that is configured for removing from the vehicle material that contains carbon associated with carbon dioxide removed from the combustion gas. In some embodiments the removal mechanism 1020 may include an outlet port. In some other embodiments the removal mechanism 1020 may include the storage vessel 1018 when the storage vessel 1018 is removably replaceable.

Figure 10J:
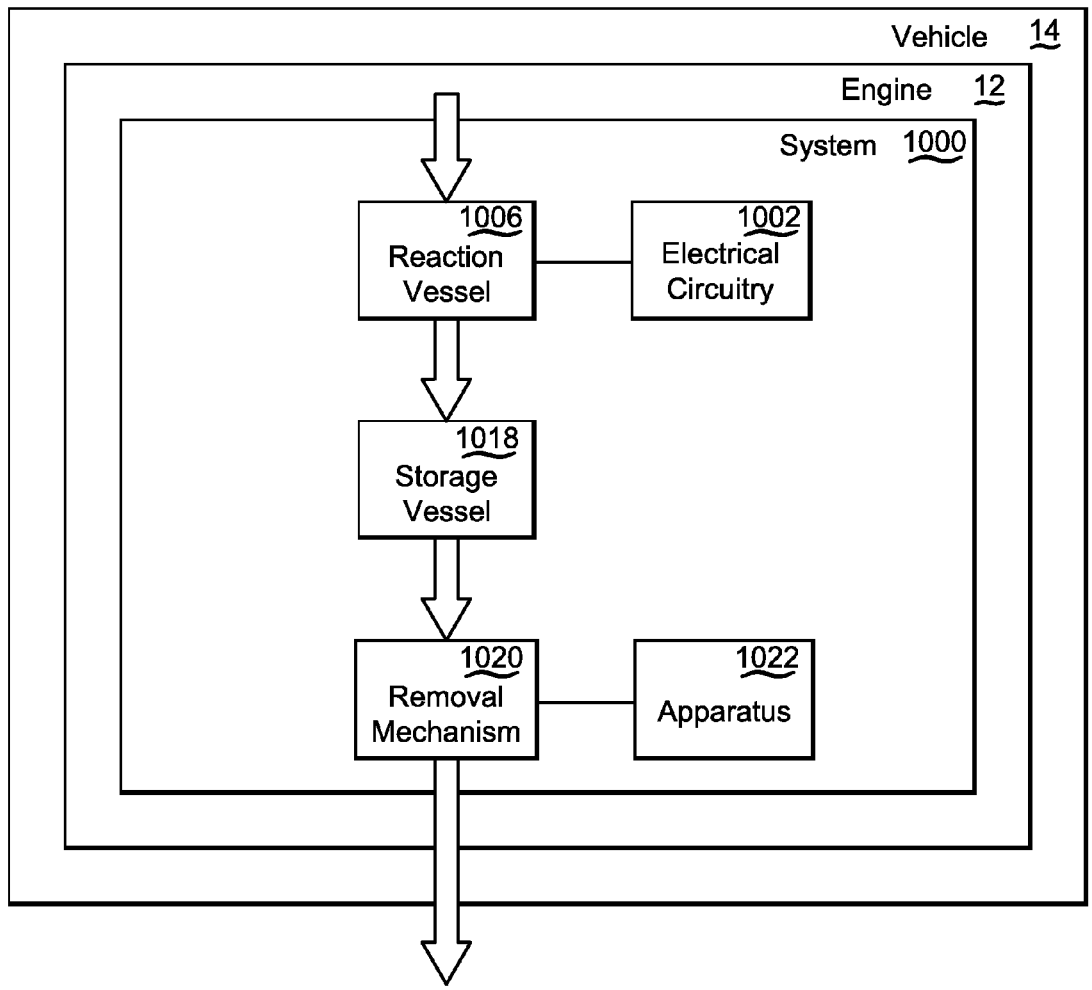

Referring now to FIG. 10J, in some embodiments the system 1000 may include an apparatus 1022 that is configured to determine an amount of carbon dioxide removed from the vehicle. In such embodiments, the attribute may include price payable for carbon dioxide removed from the combustion gas. In such cases, the price payable for the removed carbon dioxide may be: based upon an amount of carbon dioxide removed; based upon an amount of carbon removed; proportional to a predetermined carbon valuation factor; based upon a value of at least one factor chosen from position of the vehicle where the carbon dioxide is removed from the combustion gas, time when the carbon dioxide is removed from the combustion gas, identity of a user, and identity of the vehicle; and/or based upon a form in which material that contains carbon associated with carbon dioxide removed from the combustion gas is stored, such as without limitation carbon dioxide, a carbonate, a bicarbonate, and/or carbonic acid.

Figure 10K:
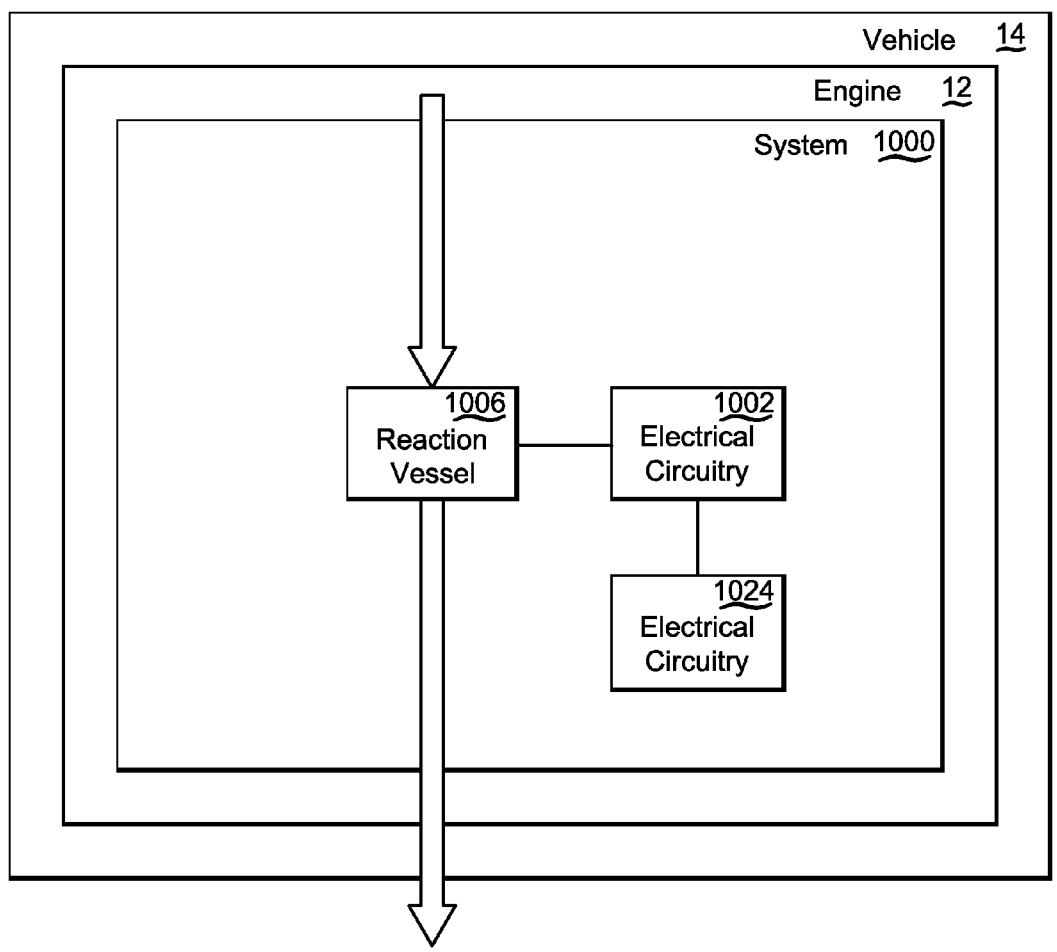

Referring now to FIG. 10K, in some embodiments the system 1000 may include electrical circuitry 1024 that is configured to allocate a value of the price payable for the removed carbon dioxide to an account. In some embodiments, the value of the price payable for carbon dioxide removed from two or more vehicles may be allocatable to the account. In some embodiments, the account may be one of two or more accounts. For example, the accounts may include: an account based upon position of the vehicle where the carbon dioxide is removed from the combustion gas; an account based upon time when the carbon dioxide is removed from the combustion gas; an account based upon identity of a user; and/or an account based upon identity of the vehicle. In some embodiments, the account may include a database. In some embodiments, the electrical circuitry 1024 may be configured to disburse at least a portion of the value of the price payable for the removed carbon dioxide from the account.

Figure 10L:
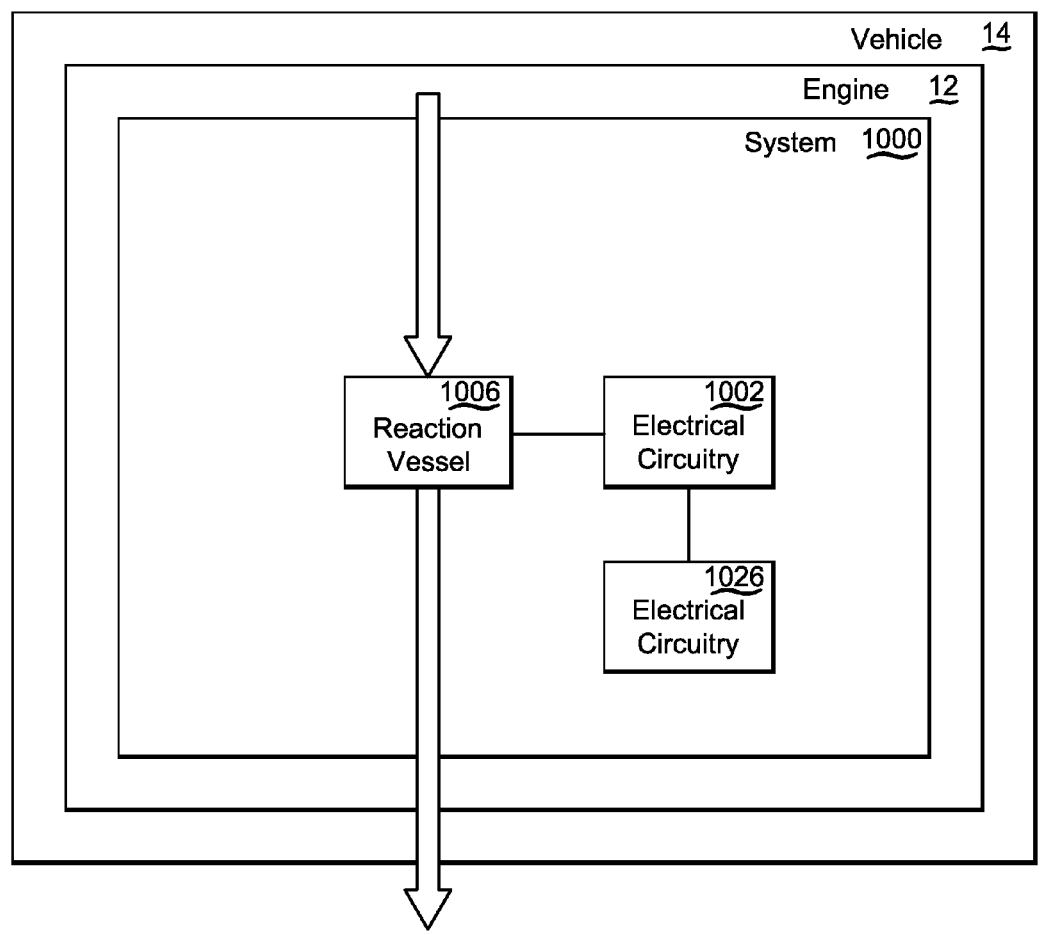

Referring now to FIG. 10L, in some embodiments the system 1000 may include electrical circuitry 1026 that is configured to communicate from the vehicle data indicative of value of the price payable for the removed carbon dioxide.

Figure 10M:
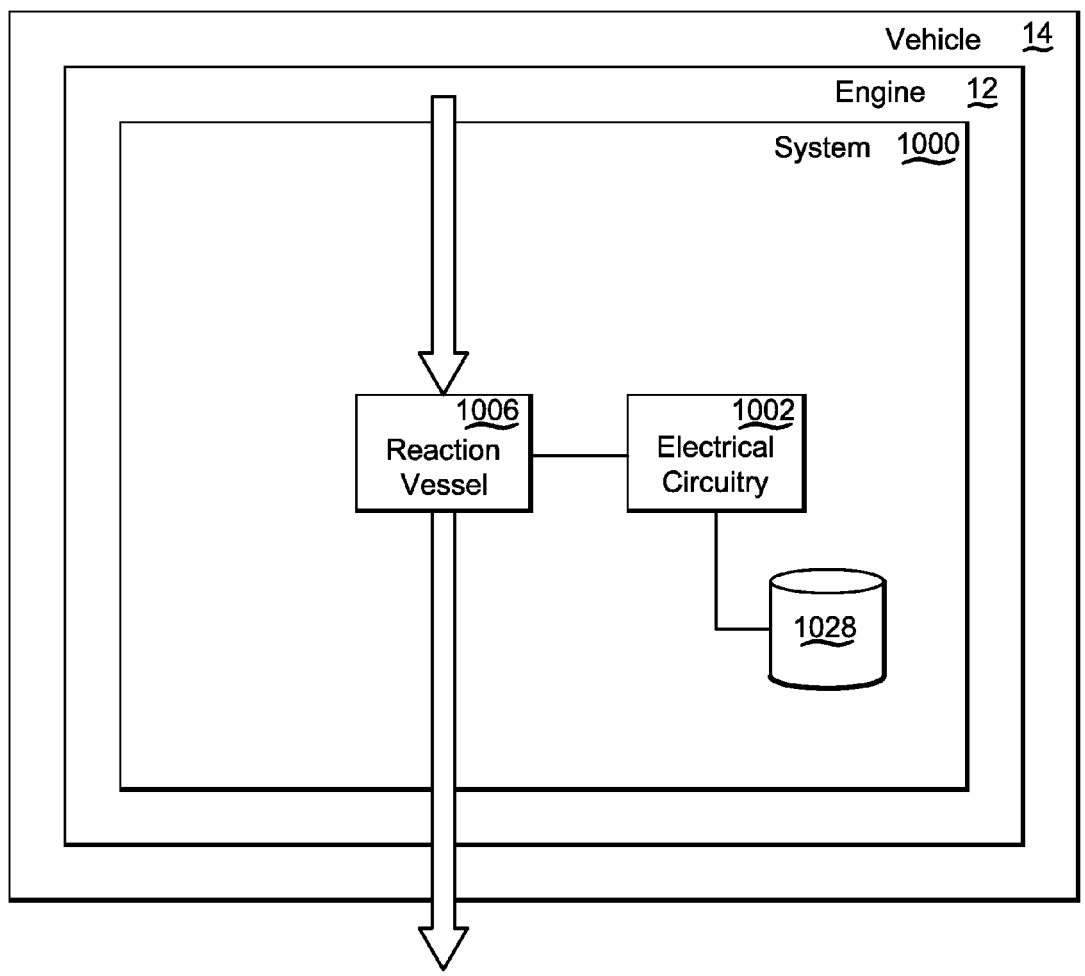

Referring now to FIG. 10M, in some embodiments the system 1000 may include data storage 1028 that is configured to store data indicative of value of the price payable for the removed carbon dioxide in a database. Given by way of nonlimiting example, in some embodiments the data storage 1028 may include a relational database configured to store data indicative of value of the price payable for the removed carbon dioxide in association with at least one additional attribute chosen from position of the vehicle where the carbon dioxide is removed from the combustion gas, time when the carbon dioxide is removed from the combustion gas, identity of a user, and identity of the vehicle.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise. While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of managing carbon dioxide emissions from an engine of a vehicle, the method comprising:
   determining a value of at least one attribute regarding removal of carbon dioxide from combustion gas from an engine of a vehicle.
2. The method of claim 1 further comprising:
   communicating data indicative of the at least one attribute.
3. The method of claim 1, wherein
   the at least one attribute includes at least one attribute chosen from position of a vehicle where the carbon dioxide is removed from the combustion gas, time when the carbon dioxide is removed from the combustion gas, governmental regulations regarding removing carbon dioxide from combustion gas from an engine of a vehicle, an amount of pollution in air drawn into an engine from which the carbon dioxide is removed from the combustion gas, monetary value of the removed carbon dioxide, an amount of storage capacity available on the vehicle to store material that contains carbon associated with carbon dioxide removed from the combustion gas, a predetermined amount of material that contains carbon associated with carbon dioxide removed from the combustion gas that can be stored in a predetermined time period, a predetermined amount of material that contains carbon associated with carbon dioxide removed from the combustion gas that can be stored in a predetermined range of distance travelable by the vehicle, identity of a vehicle, an amount of carbon dioxide removed from the combustion gas, an amount of stored material that contains carbon associated with carbon dioxide removed from the combustion gas, form of stored material that contains carbon associated with carbon dioxide removed from the combustion gas, capacity of a facility to receive from the vehicle material that contains carbon associated with carbon dioxide removed from the combustion gas, identity of a user, at least one incentive factor selected to incentivize removal of carbon dioxide, an amount of carbon dioxide removed within a predetermined time period, an amount of carbon dioxide removed within a predetermined geographical region, an amount of carbon dioxide removed by a predetermined user, an amount of carbon dioxide removed from a predetermined vehicle, a vehicle mode defined by at least one modifiable parameter, at least one modifiable setting of an engine, a characteristic of the combustion gas, a ratio of rate of removal of carbon dioxide to rate of generation of carbon dioxide, and price payable for carbon dioxide removed from the combustion gas.
4. The method of claim 1, further comprising:
   removing carbon dioxide from the combustion gas when a value of at least one attribute regarding removal of carbon dioxide from the combustion gas meets a predetermined criterion.
5. The method of claim 4, wherein removing carbon dioxide from the combustion gas when a value of at least one attribute meets a predetermined criterion includes automatically removing carbon dioxide from the combustion gas when a value of at least one attribute meets a predetermined criterion.
6. The method of claim 4, wherein removing carbon dioxide from the combustion gas includes at least one process chosen from absorbing the carbon dioxide in a liquid solution and adsorbing the carbon dioxide with an adsorption material.
7. The method of claim 4, further comprising:
   storing material that contains carbon associated with the carbon dioxide removed from the combustion gas.
8. The method of claim 7, wherein
   the material that contains carbon associated with the carbon dioxide removed from the combustion gas includes at least one material chosen from carbon dioxide removed from the combustion gas and at least one product of a chemical reaction.
9. The method of claim 4, further comprising:
   removing from a vehicle material that contains carbon associated with the carbon dioxide removed from the combustion gas.
10. The method of claim 9, further comprising:
    determining an amount of carbon dioxide removed from a vehicle.
11. The method of claim 1, further comprising:
    allocating a value of price payable for removed carbon dioxide to an account.
12. A system comprising:
    first electrical circuitry configured to determine a value of at least one attribute regarding removal of carbon dioxide from combustion gas from an engine of a vehicle.
13. The system of claim 12, further comprising:
    a communications system configured to communicate data indicative of the at least one attribute.
14. The system of claim 12, wherein the at least one attribute includes at least one attribute chosen from position of a vehicle where the carbon dioxide is removed from the combustion gas, time when the carbon dioxide is removed from the combustion gas, governmental regulations regarding removing carbon dioxide from combustion gas from an engine of a vehicle, an amount of pollution in air drawn into an engine from which the carbon dioxide is removed from the combustion gas, monetary value of the removed carbon dioxide, an amount of storage capacity available on the vehicle to store material that contains carbon associated with carbon dioxide removed from the combustion gas, a predetermined amount of material that contains carbon associated with carbon dioxide removed from the combustion gas that can be stored in a predetermined time period, a predetermined amount of material that contains carbon associated with carbon dioxide removed from the combustion gas that can be stored in a predetermined range of distance travelable by the vehicle, identity of a vehicle, an amount of carbon dioxide removed from the combustion gas, an amount of stored material that contains carbon associated with carbon dioxide removed from the combustion gas, form of stored material that contain carbon associated with carbon dioxide removed from the combustion gas, capacity of a facility to receive material that contains carbon associated with carbon dioxide removed from the combustion gas, identity of a user, at least one incentive factor selected to incentivize removal of carbon dioxide, an amount of carbon dioxide removed within a predetermined time period, an amount of carbon dioxide removed within a predetermined geographical region, an amount of carbon dioxide removed by a predetermined user, an amount of carbon dioxide removed from a predetermined vehicle, a vehicle mode defined by at least one modifiable parameter, a ratio of rate of removal of carbon dioxide to rate of generation of carbon dioxide, and price payable for carbon dioxide removed from the combustion gas.

15. The system of claim 12, further comprising:
a reaction vessel configured to remove carbon dioxide from the combustion gas when a value of at least one attribute regarding removal of carbon dioxide from the combustion gas meets a predetermined criterion.

16. The system of claim 15, wherein the reaction vessel is further configured to automatically remove carbon dioxide from the combustion gas when the value of the at least one attribute meets a predetermined criterion.

17. The system of claim 15, wherein the reaction vessel is further configured to perform at least one process chosen from absorbing the carbon dioxide in a liquid solution and adsorbing the carbon dioxide with an adsorption material.

18. The system of claim 15, further comprising:
a storage vessel configured to store material that contains carbon associated with carbon dioxide removed from the combustion gas.

19. The system of claim 18, wherein the material that contains carbon associated with carbon dioxide removed from the combustion gas includes at least one material chosen from carbon dioxide removed from the combustion gas and at least one product of a chemical reaction.

20. The system of claim 18, further comprising:
a removal mechanism configured to remove the material that contains carbon associated with carbon dioxide removed from the combustion gas.

21. The system of claim 20, further comprising:
an apparatus configured to determine an amount of carbon dioxide removed from a vehicle.

22. The system of claim 12, further comprising:
second electrical circuitry configured to allocate a value of price payable for removed carbon dioxide to an account.

23. A computer software program product for managing carbon dioxide emissions from an engine of a vehicle, the computer software program product comprising:
first computer software program code configured to determine a value of at least one attribute regarding removal of carbon dioxide from combustion gas from an engine of a vehicle.

24. The computer software program product of claim 23, further comprising:
second computer software program code configured to cause data indicative of the at least one attribute to be communicated.

25. The computer software program product of claim 23, wherein the at least one attribute includes at least one attribute chosen from position of a vehicle where the carbon dioxide is removed from the combustion gas, time when the carbon dioxide is removed from the combustion gas, governmental regulations regarding removing carbon dioxide from combustion gas from an engine of a vehicle, an amount of pollution in air drawn into an engine from which the carbon dioxide is removed from the combustion gas, monetary value of the removed carbon dioxide, an amount of storage capacity available on the vehicle to store material that contains carbon associated with carbon dioxide removed from the combustion gas, a predetermined amount of material that contains carbon associated with carbon dioxide removed from the combustion gas that can be stored in a predetermined time period, a predetermined amount of material that contains carbon associated with carbon dioxide removed from the combustion gas that can be stored in a predetermined range of distance travelable by the vehicle, an amount of stored material that contains carbon associated with carbon dioxide removed from the combustion gas, form of stored material that contains carbon associated with carbon dioxide removed from the combustion gas, capacity of a facility to receive material that contains carbon associated with carbon dioxide removed from the combustion gas, identity of a user, at least one incentive factor selected to incentivize removal of carbon dioxide, an amount of carbon dioxide removed within a predetermined time period, an amount of carbon dioxide removed within a predetermined geographic region, an amount of carbon dioxide removed by a predetermined user, an amount of carbon dioxide removed from a predetermined vehicle, a vehicle mode defined by at least one modifiable parameter, a characteristic of the combustion gas, a ratio of rate of removal of carbon dioxide to rate of generation of carbon dioxide, and price payable for carbon dioxide removed from the combustion gas.

26. The computer software program product of claim 23, further comprising:
third computer software program code configured to cause removal of carbon dioxide from the combustion gas when the value of the at least one attribute meets a predetermined criterion.

27. The computer software program product of claim 26, wherein the third computer software program code is further configured to configured to automatically cause removal of carbon dioxide from the combustion gas when the value of the at least one attribute meets a predetermined criterion responsive to the first computer software program code.

28. The computer software program product of claim 26, further comprising:
fourth computer software program code configured to cause storage of material that contains carbon associated with carbon dioxide removed from the combustion gas.

29. The computer software program product of claim 26, further comprising:
fifth computer software program code configured to allocate a value of price payable for removed carbon dioxide to an account.

30. The computer software program product of claim 26, further comprising:
sixth computer software program code configured to cause data indicative of value of the price payable for the removed carbon dioxide to be communicated from the vehicle.

31. A vehicle comprising:
a vehicle frame;
an engine disposed on the vehicle frame; and
a system for managing carbon dioxide emissions from the engine, the system including:
first electrical circuitry configured to determine a value of at least one attribute regarding removal of carbon dioxide from combustion gas from the engine; and
a reaction vessel configured to remove carbon dioxide from the combustion gas when the value of the at least one attribute meets a predetermined criterion.

32. The vehicle of claim 31, wherein the at least one attribute includes at least one attribute chosen from position of a vehicle where the carbon dioxide is removed from the combustion gas, time when the carbon dioxide is removed from the combustion gas, governmental regulations regarding removing carbon dioxide from combustion gas from an engine of a vehicle, an amount of pollution in air drawn into the engine, monetary value of the removed carbon dioxide, an amount of storage capacity available on the vehicle to store material that contains carbon associated with carbon dioxide removed from the combustion gas, a predetermined amount of material that contains carbon associated with carbon dioxide removed from the combustion gas that can be stored in a predetermined time period, a predetermined amount of material that contains carbon associated with carbon dioxide removed from the combustion gas that can be stored in a predetermined range of distance travelable by the vehicle, identity of the vehicle, an amount of carbon dioxide removed from the combustion gas, an amount of stored material that contains carbon associated with carbon dioxide removed from the combustion gas, for of stored material that contains carbon associated with carbon dioxide removed from the combustion gas, capacity of a facility to receive material that contains carbon associated with carbon dioxide removed from the combustion gas, identity of a user, at least on incentive factor selected to incentivize removal of carbon dioxide, an amount of carbon dioxide removed within a predetermined time period, an amount of carbon dioxide removed within a predetermined geographic region, an amount of carbon dioxide removed by a predetermined user, an amount of carbon dioxide removed from the vehicle, a vehicle mode defined by at least one modifiable parameter, a characteristic of the combustion gas, a ratio of rate of removal of carbon dioxide to rate of generation of carbon dioxide, and price payable for carbon dioxide removed from the combustion gas.

33. The vehicle of claim 31, wherein the reaction vessel is further configured to automatically remove carbon dioxide from the combustion gas responsive to the first electrical circuitry when the value of the at least one attribute meets a predetermined criterion.

34. The vehicle of claim 31, wherein the reaction vessel is further configured to remove carbon dioxide via at least one process chosen from absorbing the carbon dioxide in a liquid solution and adsorbing the carbon dioxide with an adsorption material.

35. The vehicle of claim 31, further comprising:
a storage vessel configured to store material that contains carbon associated with carbon dioxide removed from the combustion gas.

36. The vehicle of claim 35, wherein the material that contains carbon associated with carbon dioxide removed from the combustion gas includes at least one material chosen from carbon dioxide removed from the combustion and at least one product of a chemical reaction.

37. The vehicle of claim 35, wherein the storage vessel is removably replaceable.

38. The vehicle of claim 35, further comprising:
a removal mechanism configured for removing from the vehicle material that contains carbon associated with carbon dioxide removed from the combustion gas.

39. The vehicle of claim 38, further comprising:
an apparatus configured to determine an amount of carbon dioxide removed from the vehicle.

40. The vehicle of claim 31, further comprising:
second electrical circuitry configured to allocate a value of price payable for removed carbon dioxide to an account.

41. The vehicle of claim 31, further comprising:
third electrical circuitry configured to communicate from the vehicle data indicative of value of price payable for removed carbon dioxide.

\* \* \* \* \*

UNITED STATES PATENT AND TRADEMARK OFFICE
CERTIFICATE OF CORRECTION

PATENT NO. : 8,660,672 B1  
APPLICATION NO. : 13/729317  
DATED : February 25, 2014  
INVENTOR(S) : Roderick A. Hyde et al.

Page 1 of 1

It is certified that error appears in the above-identified patent and that said Letters Patent is hereby corrected as shown below:

In the Claims:

Column 39, Line 18, Claim 32:

"at least on" should read --at least one--

Signed and Sealed this  
Sixth Day of May, 2014

Michelle K. Lee  
*Deputy Director of the United States Patent and Trademark Office*